(12) United States Patent
Largman et al.

(10) Patent No.: US 7,392,541 B2
(45) Date of Patent: Jun. 24, 2008

(54) COMPUTER SYSTEM ARCHITECTURE AND METHOD PROVIDING OPERATING-SYSTEM INDEPENDENT VIRUS-, HACKER-, AND CYBER-TERROR-IMMUNE PROCESSING ENVIRONMENTS

(75) Inventors: Kenneth Largman, San Francisco, CA (US); Anthony B. More, Sebastopol, CA (US); Jeffrey Blair, San Francisco, CA (US)

(73) Assignee: Vir2us, Inc., Sausalito, CA (US)

( * ) Notice: Subject to any disclaimer, the term of this patent is extended or adjusted under 35 U.S.C. 154(b) by 589 days.

(21) Appl. No.: 10/760,131

(22) Filed: Jan. 15, 2004

(65) Prior Publication Data
US 2004/0236874 A1    Nov. 25, 2004

Related U.S. Application Data

(63) Continuation-in-part of application No. 10/484,051, filed as application No. PCT/US02/37125 on Nov. 19, 2002.

(60) Provisional application No. 60/393,719, filed on Jul. 3, 2002.

(51) Int. Cl.
  G06F 21/02    (2006.01)
  G06F 9/00     (2006.01)
  G06F 13/00    (2006.01)
(52) U.S. Cl. ................... 726/17; 726/4; 726/21; 726/26
(58) Field of Classification Search ............... None
  See application file for complete search history.

(56) References Cited

U.S. PATENT DOCUMENTS

| 4,464,747 A | 8/1984 | Groudan et al. |
| 4,939,694 A | 7/1990 | Eaton et al. |
| 5,434,562 A | 7/1995 | Reardon |
| 5,655,069 A | 8/1997 | Ogawara et al. |
| 5,704,031 A | 12/1997 | Mikami et al. |
| 5,732,268 A | 3/1998 | Bizzarri |
| 5,737,118 A | 4/1998 | Sugaya et al. |
| 5,764,878 A | 6/1998 | Kablanian et al. |
| 5,826,012 A | 10/1998 | Lettvin |

(Continued)

FOREIGN PATENT DOCUMENTS

CA    2197502 A1    8/1998

(Continued)

OTHER PUBLICATIONS

Unknown Author, "Bulletin Board," Laptop Magazine, p. 14, Jul. 2001.

(Continued)

*Primary Examiner*—Christopher Revak
(74) *Attorney, Agent, or Firm*—Perkins Coie LLP

(57) ABSTRACT

Information appliance, computing device, or other processor or microprocessor based device or system provides security and anti-viral, anti-hacker, and anti-cyber terror features, and can automatically create multiple sequentially or concurrently and intermittently isolated and/or restricted computing environments to prevent viruses, malicious or other computer hacking, computer or device corruption and failure by using these computing environments in conjunction with restricted and controlled methods of moving and copying data, combined with a process that destroys malicious code located in computing environments and data stores.

18 Claims, 23 Drawing Sheets

U.S. PATENT DOCUMENTS

| | | | |
|---|---|---|---|
| 5,841,712 A | 11/1998 | Wendell et al. | |
| 5,842,002 A * | 11/1998 | Schnurer et al. | 703/21 |
| 5,860,001 A | 1/1999 | Cromer et al. | |
| 5,889,943 A * | 3/1999 | Ji et al. | 726/22 |
| 5,894,551 A | 4/1999 | Huggins et al. | |
| 5,920,515 A | 7/1999 | Shaik et al. | |
| 5,969,632 A * | 10/1999 | Diamant et al. | 340/5.3 |
| 5,974,549 A * | 10/1999 | Golan | 726/23 |
| 6,009,518 A | 12/1999 | Shiakallis | |
| 6,016,553 A | 1/2000 | Schneider et al. | |
| 6,067,618 A | 5/2000 | Weber | |
| 6,088,794 A | 7/2000 | Yoon et al. | |
| 6,178,452 B1 | 1/2001 | Miyamoto | |
| 6,199,178 B1 | 3/2001 | Schneider et al. | |
| 6,202,153 B1 * | 3/2001 | Diamant et al. | 726/35 |
| 6,205,527 B1 | 3/2001 | Goshey et al. | |
| 6,268,789 B1 * | 7/2001 | Diamant et al. | 340/5.74 |
| 6,289,426 B1 | 9/2001 | Maffezzoni et al. | |
| 6,301,657 B1 | 10/2001 | Jones et al. | |
| 6,317,845 B1 | 11/2001 | Meyer et al. | |
| 6,327,653 B1 | 12/2001 | Lee | |
| 6,347,375 B1 | 2/2002 | Reinert et al. | |
| 6,367,042 B1 | 4/2002 | Phan et al. | |
| 6,374,366 B1 | 4/2002 | Maffezzoni | |
| 6,381,694 B1 | 4/2002 | Yen | |
| 6,421,792 B1 | 7/2002 | Cromer et al. | |
| 6,457,069 B1 | 9/2002 | Stanley | |
| 6,477,629 B1 | 11/2002 | Goshey et al. | |
| 6,577,920 B1 | 6/2003 | Hypponen et al. | |
| 6,591,366 B1 * | 7/2003 | Munker et al. | 726/28 |
| 6,640,317 B1 | 10/2003 | Snow | |
| 6,691,230 B1 * | 2/2004 | Bardon | 726/27 |
| 6,697,950 B1 | 2/2004 | Ko | |
| 6,754,818 B1 | 6/2004 | Lee et al. | |
| 6,880,110 B2 * | 4/2005 | Largman et al. | 714/38 |
| 6,938,164 B1 * | 8/2005 | England et al. | 713/193 |
| 7,073,173 B1 * | 7/2006 | Willman | 718/1 |
| 7,096,381 B2 | 8/2006 | Largman et al. | |
| 7,100,075 B2 | 8/2006 | Largman et al. | |
| 7,107,463 B2 * | 9/2006 | England et al. | 713/193 |
| 7,111,201 B2 | 9/2006 | Largman et al. | |
| 7,137,004 B2 * | 11/2006 | England et al. | 713/176 |
| 7,137,034 B2 | 11/2006 | Largman et al. | |
| 7,159,240 B2 * | 1/2007 | England et al. | 726/6 |
| 7,243,230 B2 * | 7/2007 | England et al. | 713/168 |
| 2002/0004908 A1 | 1/2002 | Galea | |
| 2002/0053044 A1 | 5/2002 | Gold et al. | |
| 2002/0078366 A1 | 6/2002 | Raice | |
| 2002/0087855 A1 | 7/2002 | Dykes et al. | |
| 2002/0095557 A1 | 7/2002 | Constable et al. | |
| 2002/0169998 A1 | 11/2002 | Largman et al. | |
| 2002/0174137 A1 | 11/2002 | Wolff et al. | |
| 2003/0105973 A1 | 6/2003 | Liang et al. | |
| 2004/0083369 A1 | 4/2004 | Erlingsson et al. | |
| 2004/0210796 A1 | 10/2004 | Largman et al. | |
| 2004/0236874 A1 | 11/2004 | Largman et al. | |
| 2004/0255165 A1 | 12/2004 | Szor | |
| 2004/0268361 A1 | 12/2004 | Schaefer | |
| 2005/0010670 A1 | 1/2005 | Greschler et al. | |
| 2005/0060722 A1 | 3/2005 | Rochette et al. | |
| 2005/0149512 A1 | 7/2005 | Joshi et al. | |
| 2006/0020858 A1 | 1/2006 | Schaefer | |
| 2006/0020937 A1 | 1/2006 | Schaefer | |
| 2006/0137013 A1 * | 6/2006 | Lok | 726/24 |
| 2006/0143514 A1 | 6/2006 | Largman et al. | |

FOREIGN PATENT DOCUMENTS

| | | | |
|---|---|---|---|
| EP | 0 978 785 A1 | 2/2000 | |
| WO | WO 95/22794 | 8/1995 | |
| WO | WO 95/22794 A1 | 8/1995 | |
| WO | WO 01/11449 A1 | 2/2001 | |
| WO | WO 02/21274 | 3/2002 | |
| WO | WO 02/099642 | 12/2002 | |
| WO | WO 03/073208 A2 | 9/2003 | |
| WO | WO 03/075158 A2 | 9/2003 | |
| WO | WO 03/075158 A3 | 9/2003 | |
| WO | WO 03/073208 A3 | 11/2003 | |
| WO | WO 03/096169 A2 | 11/2003 | |
| WO | WO 03/104954 A2 | 12/2003 | |
| WO | WO 2004/012416 A2 | 2/2004 | |
| WO | WO 2004/012416 A3 | 2/2004 | |
| WO | WO 2005/043360 A1 | 5/2005 | |

OTHER PUBLICATIONS

Collection of printouts from GreenBorder website, © 2004-2006 GreenBorder Technologies, Inc., www.greenborder.com, Jan. 27, 2006, 36 pgs.

Whitepaper: iSolation Server v.2, 2005, Avinti, Inc., Lindon, UT, 15 pgs.

"iSolation Server FAQ," © 2003-2006 Avinti, Inc., www.avinti.com/downloads/isolation-server-faq.html, Jan. 27, 2006, 4 pgs.

Avinti, iSolation Server v.2 Whitepaper, © 2003-2006 Avinti, Inc., www.avinti.com/downloads/isolation-server-whitepaper.html, Jan. 27, 2005, 15 pgs.

Elrad, Tzilla et al., "Developing Secure Applications Through Aspect-Oriented Programming," Nov. 18, 2004, 27.1 Introduction, 27.2 The Domain of Application-Level Security, 27.3 An Experience Report, 27.4 Discussion, 27.5 Related Work, 27.6 Conclusion, Acknowledgements, References, © 2003-2006 Pearson Education, Addison-Wesley Professional, Sample Chapter begins at www.awprofessional.com/articles/article.asp?p=340869&seqNum=1, 29 pgs.

"Server and Domain Isolation Using Ipsec and Group Policy," Mar. 17, 2005, © 2006 Microsoft Corporation, www.Microsoft.com/technet/security/topics/architectureanddesign/ipsec/default.mspx, 4 pgs.

Grizzard, Julian B. et al. "Towards an Approach for Automatically Repairing Compromised Network Systems," Jun. 2004 or later, 4 pgs.

Zeichick, Alan, Isolation and Protection: Intel's LaGrande Vision for Trusted Virtualization, Nov. 22, 2005, www.devx.com/Intel/Article/30008, Jan. 27, 2006, 4 pgs.

Sapuntzakis, Constantine and Monica S. Lam, "Virtual Appliances in the Collective: A Road to Hassle-Free Computing," May 2003 or later, 6 pgs.

Chandra, Ramesh et al., "The Collective: A Cache-Based System Management Architecture," Presented at the 2nd Symposium on Networked Systems Design and Implementation, May 2-4, 2005, Boston MA, 14 pgs.

Chow, Jim et al., "Understanding Data Lifetime via Whole System Simulation," Aug. 2003 or later, 16 pgs.

Ruwase, Olatunji and Monica S. Lam, "A Practical Dynamic Buffer Overflow Detector," Jun. 2003 or later 11 pgs.

Garfinkel, Tal et al., "Ostia: A Delegating Architecture for Secure System Call Interposition," Aug. 2003 or later, 15 pgs.

Sapuntzakis, Constantine et al., "Virtual Appliances for Deploying and Maintaining Software," Jun. 2003 or later, 15 pgs.

Brumley, David and Dan Boneh, "Remote Timing Attacks are Practical," 2003 or later, 13 pgs.

Li Ninghui et al. "Obvious Signature-Based Envelope," PODC'03, Jul. 13-16, 2003, Boston, MA, p. 182-19, © ACM, 8 pgs.

Garfinkel, Tal et al., "Flexible OS Support and Applications for Trusted Computing," Feb. 2003 or later; 6 pgs.

Garfinkel, Tal and Mendel Rosenblum, "A Virtual Machine Introspection Based Architecture for Intrusion Detection," Dec. 2002 or later, 16 pgs.

Garfinkel, Tal, "Traps and Pitfalls: Practical Problems in System Call Interposition Based Security Tools," Nov. 2002 or later, 14 pgs.

Sapuntzakis, Constantine et al., "Optimizing the Migration of Virtual Computers," Dec. 2002 or newer, 14 pgs.

Garfinkel, Tal et al., "Terra: A Virtual Machine-Based Platform for Trusted Computing," SOSP'03, Oct. 19-22, 2003, Bolton Landing, NY, © 2003 ACM, 14 pgs.

Lam, Monica et al., "The Collective: A Virtual Appliance Computing Infrastructure," http://suif.Stanford.edu/collective/index.html, Jan. 27, 2006, 3 pgs.

Messmer, Ellen, "GreenBorder offers security 'barrier' for IE, Outlook," Mar. 23, 2005, Computerworld, © 2005 Network World, Inc., www.computerworld.com/securitytopics/security/story/0,10801,100579,00.html, Jan. 27, 2006, 4 pgs.

Schmidt, Brian K. et al., "The Interactive Performance of SLIM: a Stateless, Thin-Client Architecture," 17th ACM Symposium on Operating Systems Principles (SOSP'99), Published as *Operating Systems Review*, 34(5):3247, Dec. 1999, SOSP-17, Dec. 1999, Kiawah Island, SC, © 1999 ACM, 16 pgs.

Schmidt, Brian K. et al., "Supporting Ubiquitous Computing with Stateless Consoles and Computation Caches," Aug. 2000, 140 pgs.

Microsoft Corporation Microsoft Windows 95 Resource Kit, 1995, Microsoft Press, pp. 650-651.

The International Search report for PCT application PCT/US06/013343 Search Report dated Nov. 7, 2007.

\* cited by examiner

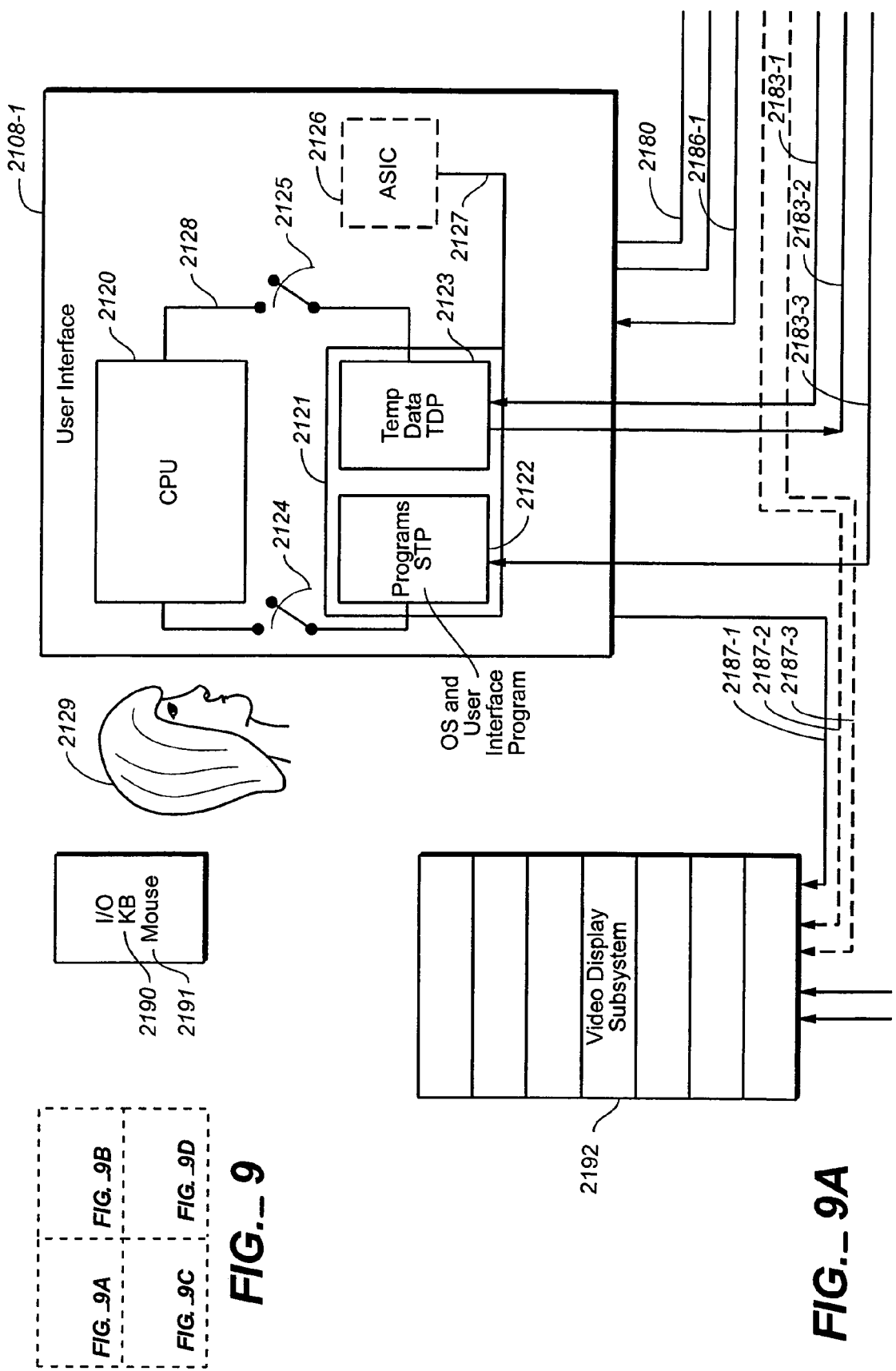

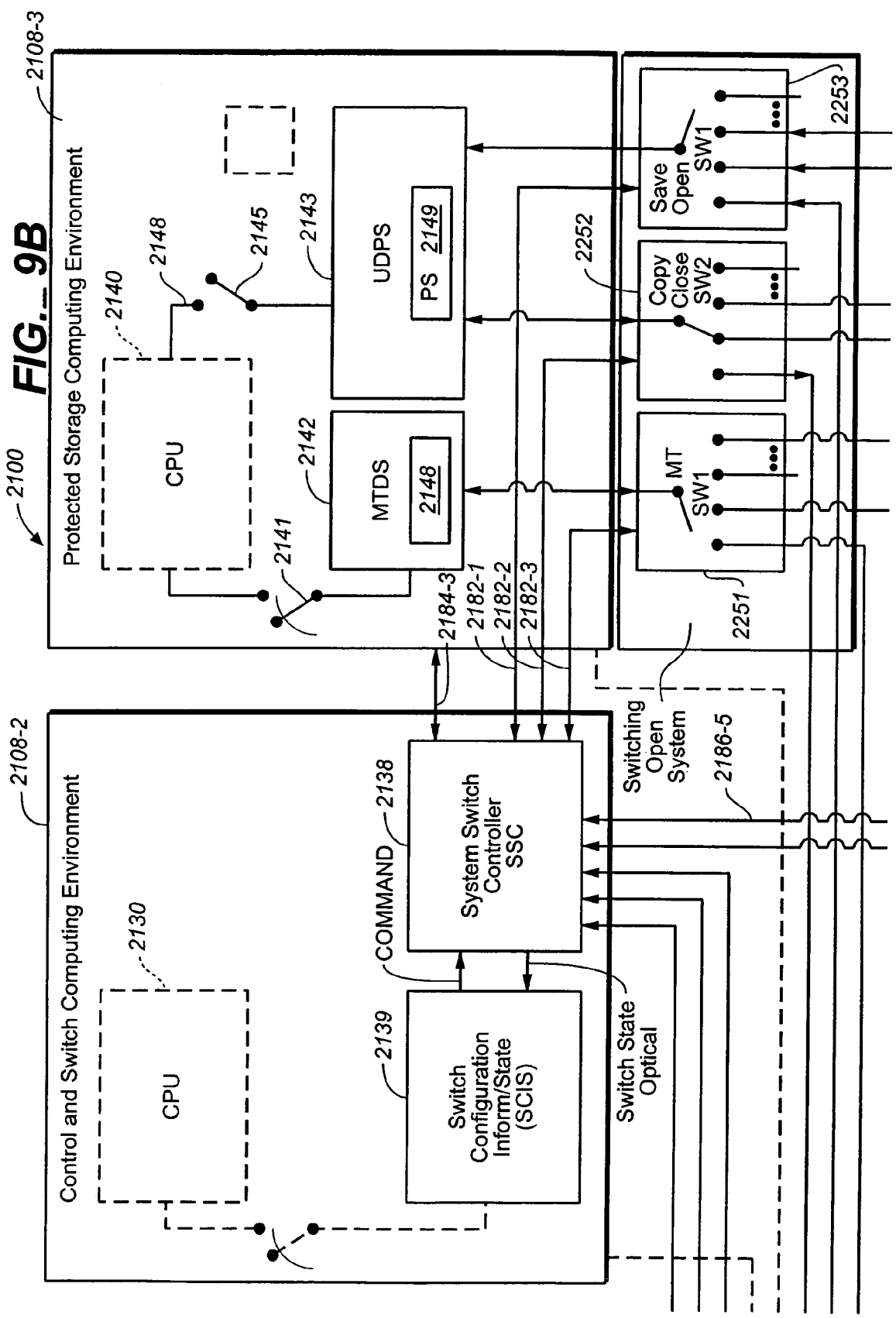
FIG._9B

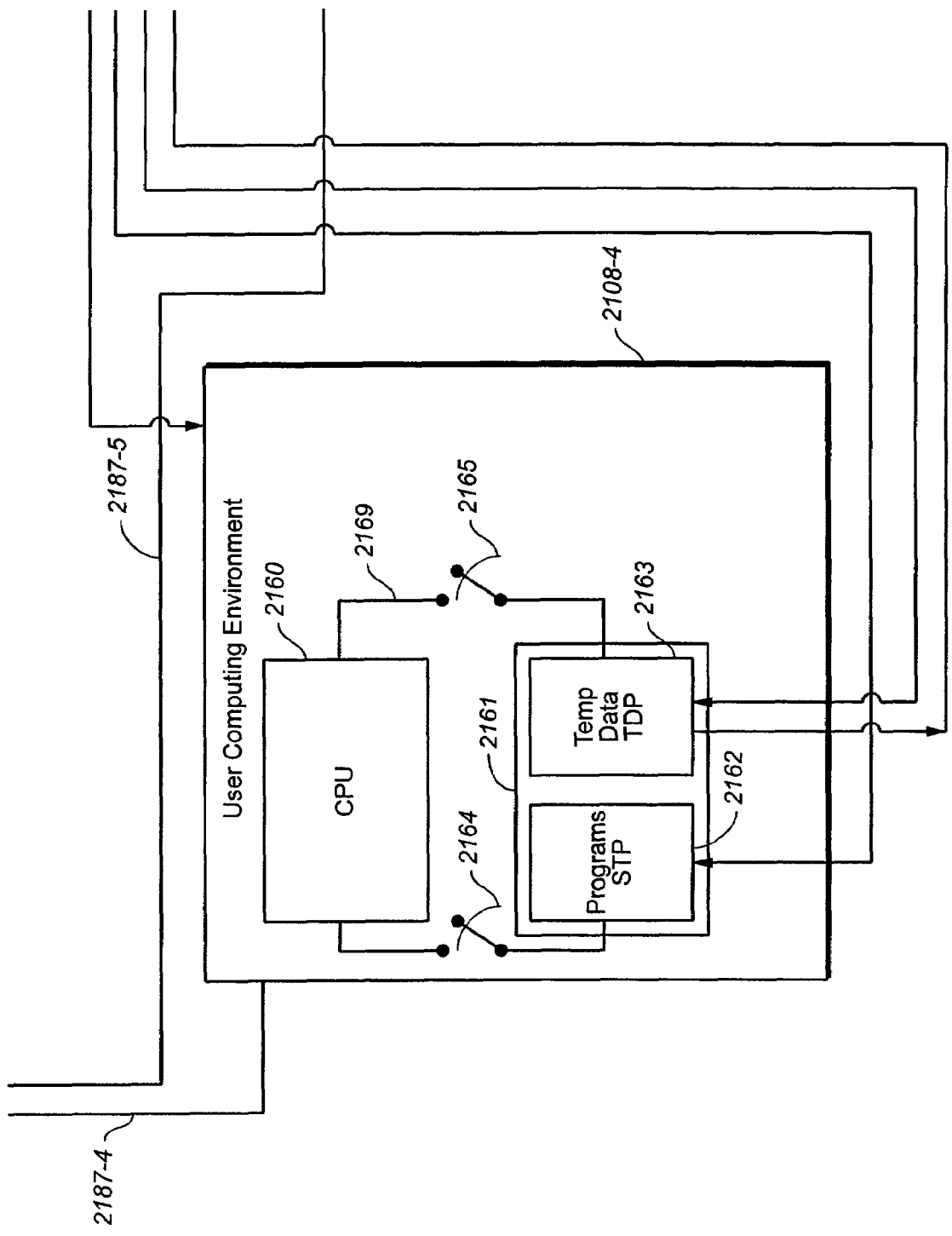
FIG._9C

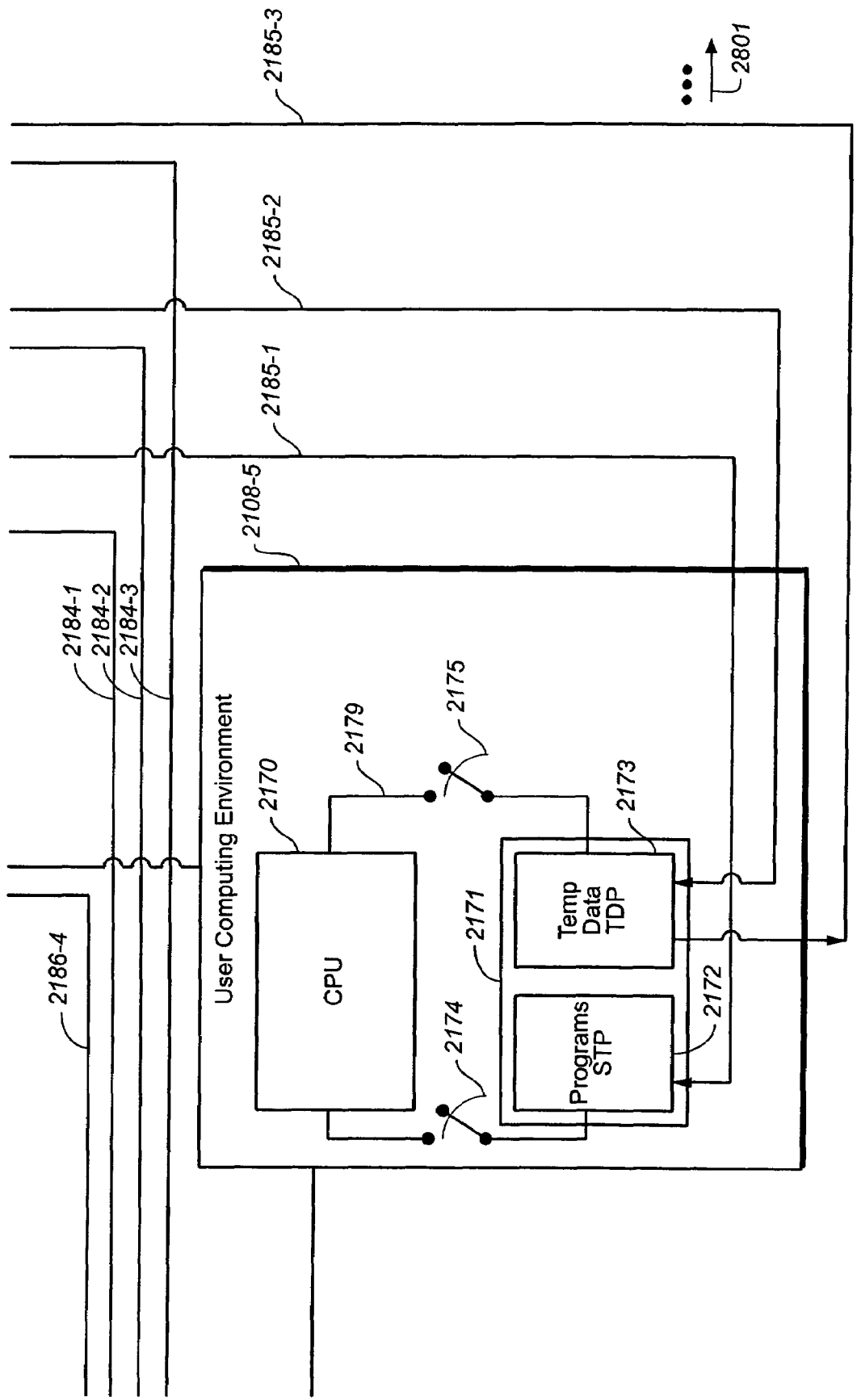
FIG._9D

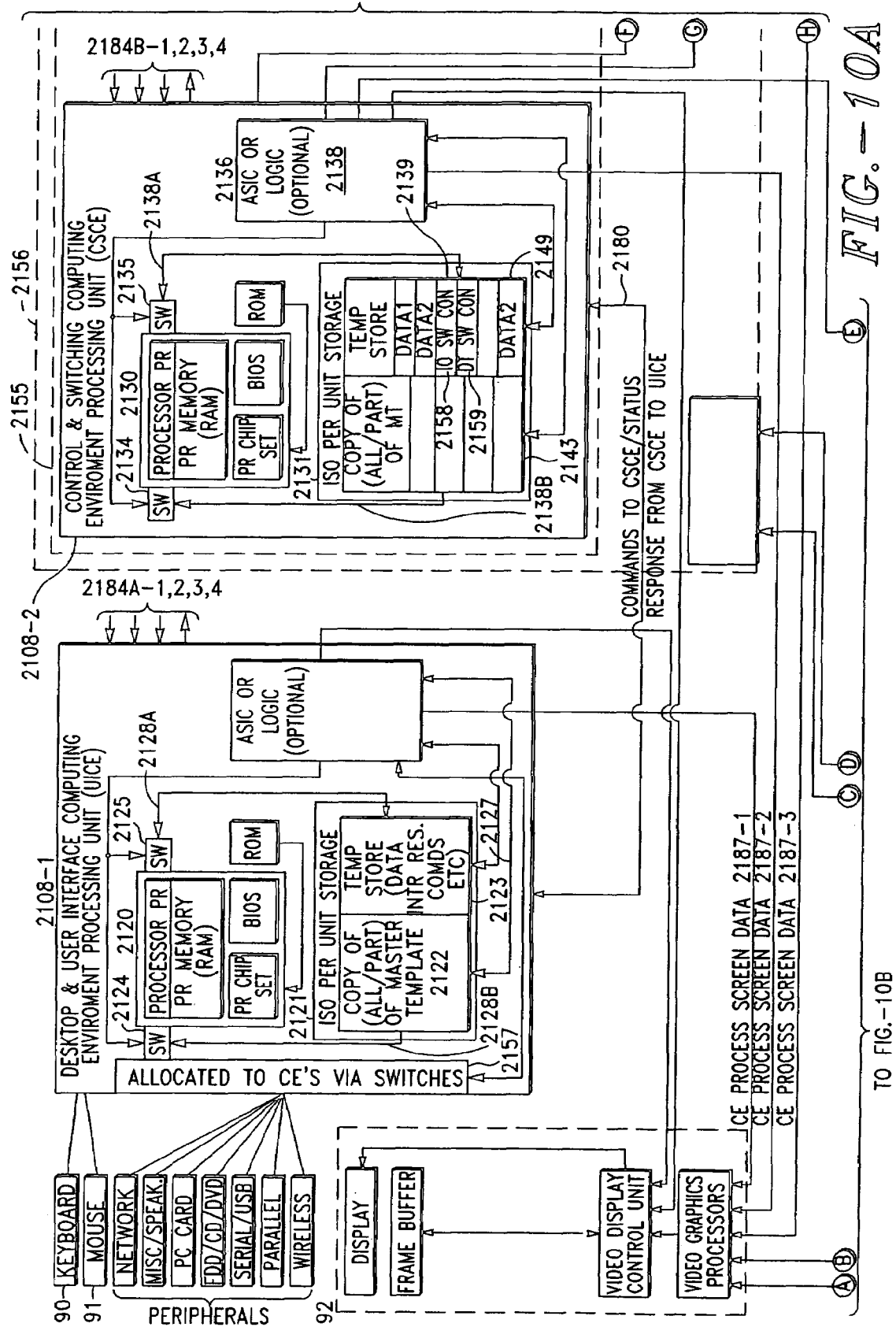

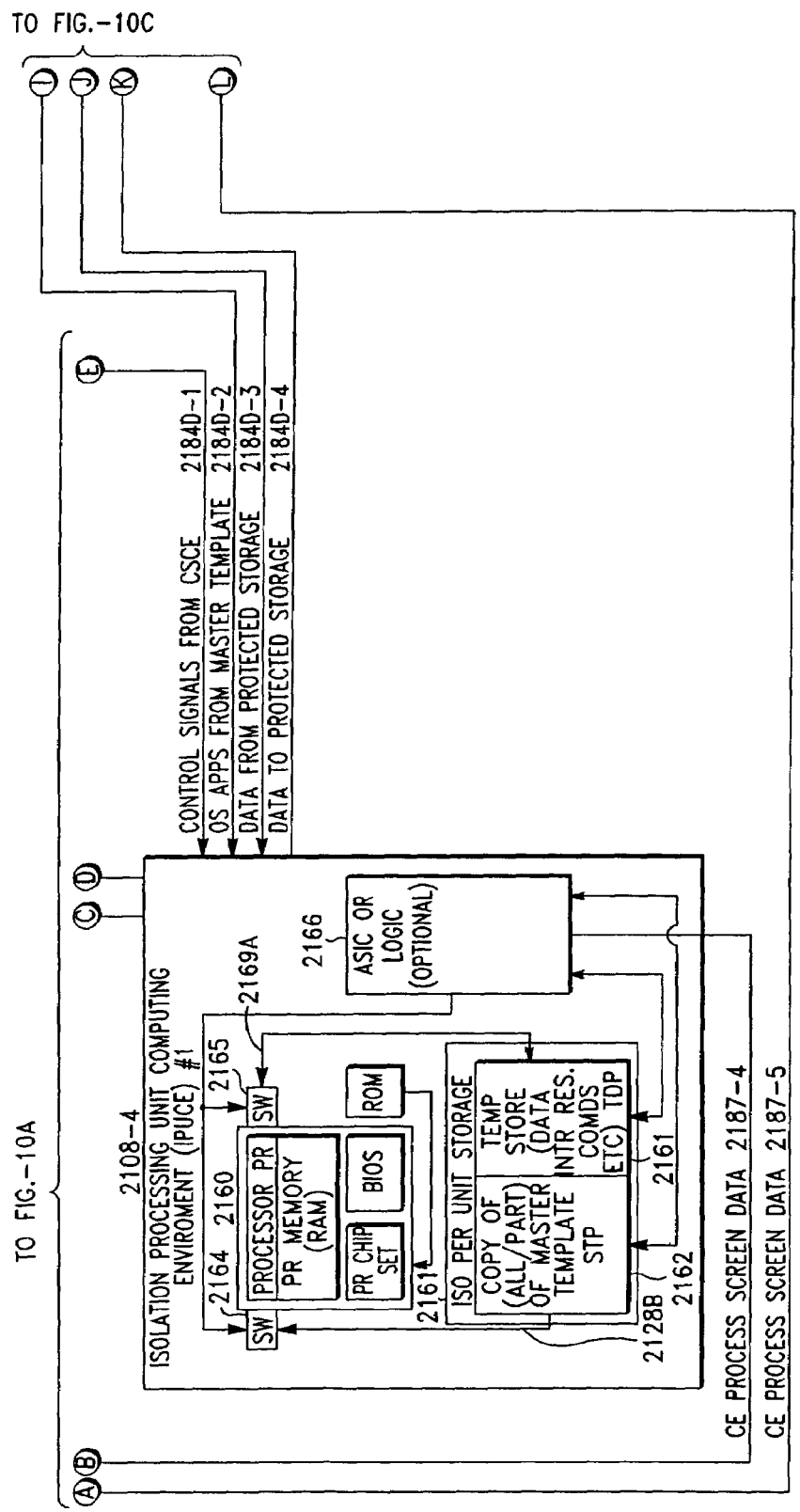

COMPUTER SYSTEM ARCHITECTURE AND METHOD PROVIDING OPERATING-SYSTEM INDEPENDENT VIRUS-, HACKER-, AND CYBER-TERROR-IMMUNE PROCESSING ENVIRONMENTS

RELATED APPLICATIONS

This application claims the benefit of priority under one or more of 35 U.S.C. 119(e), 35 U.S.C. 120, or other applicable statutes or rules and is a continuation-in-part of U.S. Utility patent application Ser. No. 10/484,051, entitled, "Computer System Capable of Supporting a Plurality of Independent Computer Environments," filed 15 Jan. 2004, anming naming Kenneth Largman, Anthony B. More and Jeffrey Blair as inventors; which is a U.S. National Phase application from PCT Application No. PCT/US02/37125, entitled "Computer System Capable of Supporting a Plurality of Independent Computer Environments", filed 19 Nov. 2002, naming Kenneth Largman, Anthony B. More and Jeffrey Blair as inventors; each of which applications is herein incorporated by reference.

This application also related to and claims benefit of priority under one or more of 35 U.S.C. 119(e), 35 U.S.C. 120, or other applicable statutes or rules to the following:

U.S. Pat. No. 7,096,381, issued Aug. 22, 2006, entitled, "On-The-Fly Repair Of a Computer," filed Nov. 19, 2001, naming Kenneth Largman, Anthony B. More and Jeffrey Blair as inventors;

U.S. Pat. No. 7,100,075, issued Aug. 29, 2006, entitled, "External Repair Of A Computer," filed Feb. 11, 2002, naming Kenneth Largman, Anthony B. More and Jeffrey Blair as inventors;

U.S. Pat. No. 7,11,201, issued Sep. 19, 2006, entitled, "Backup Of A Computer," filed Feb. 27, 2002, naming Kenneth Largman, Anthony B. More and Jeffrey Blair as inventors;

U.S. Pat. No. 7,137,034, issued Nov. 14, 2006, entitled, "Computer With Special-Purpose Sub-Systems," filed Mar. 6, 2002, naming Kenneth Largman, Anthony B. More and Jeffrey Blair as inventors; and U.S. Provisional Patent Application No. 60/393,719 entitled, "Computers That Defend Against Viruses, Hacking, Spy Software, Cyber-Terrorism, Theft, and Make Malicious Code Irrelevant," filed Jul. 3, 2002, naming Kenneth Largman, Anthony B. More and Jeffrey Blair as inventors; each of which applications is hereby incorporated by reference.

FIELD OF INVENTION

This invention relates generally to security and anti-viral, anti-hacker, and anti-cyber terror features for computers, information appliances, mobile communication devices, and to other electronic devices; and more particularly to computers, information appliances, mobile communication devices and other electronic and computing devices supporting security and anti-viral, anti-hacker, and anti-cyber terror features that generate multiple concurrent or sequential temporal processing environments and procedures and programs that prevent malicious code that may be present within the device from affecting the system or other user or program data.

BACKGROUND

When based on the prior art, computers, cell phones, and a wide spectrum of devices that use computer or processor technology are vulnerable to computer hackers, viruses, cyber-terrorists, spy-ware, and/or other malicious or harmful computer program code. While anti-virus software is known, such anti-virus software frequently becomes obsolete with each new virus that is written and released. Furthermore, at least some damage will usually be done to some computers during the initial stages of such release. Use of firewalls and other protective measures are also known, however, firewalls are generally not integrated into portable computers or portable computers operating over a public network outside of a corporate Information Technology (IT) environment, and a number of hacking techniques exist to defeat such firewalls in any event. The world-wide cost of damage from computer viruses, spy-ware, and hacking each year has been estimated to run into the tens of billions of dollars. More significantly with the ever increasing reliance on computers to control and maintain operation of air-traffic, transportation systems, building environmental control, stock markets, telephone systems, nuclear-power plants, and other public and private infrastructure, the potential harm from such malicious code goes beyond any monetary assessment.

What is needed is an architecture, system, and operational methodology that provide a measure of immunity from computer hacking, viruses, spy-ware, cyber-terror attacks, and the like, malicious activity. In a sense there remains a need for a universal vaccine against such malicious agents.

There also remains a need for a computer that, unlike conventional computers that enable the user to initiate "repairs" on demand by reverting to known clean installation of operating system and application program software and/or data, resets or erases memory and data stores to create a known clean or sterile storage environment prior to opening files or data sets.

BRIEF DESCRIPTION OF THE DRAWINGS

FIG. 9 illustrates an embodiment of yet another alternative embodiment of the inventive architecture and system.

SUMMARY

Figure 1:
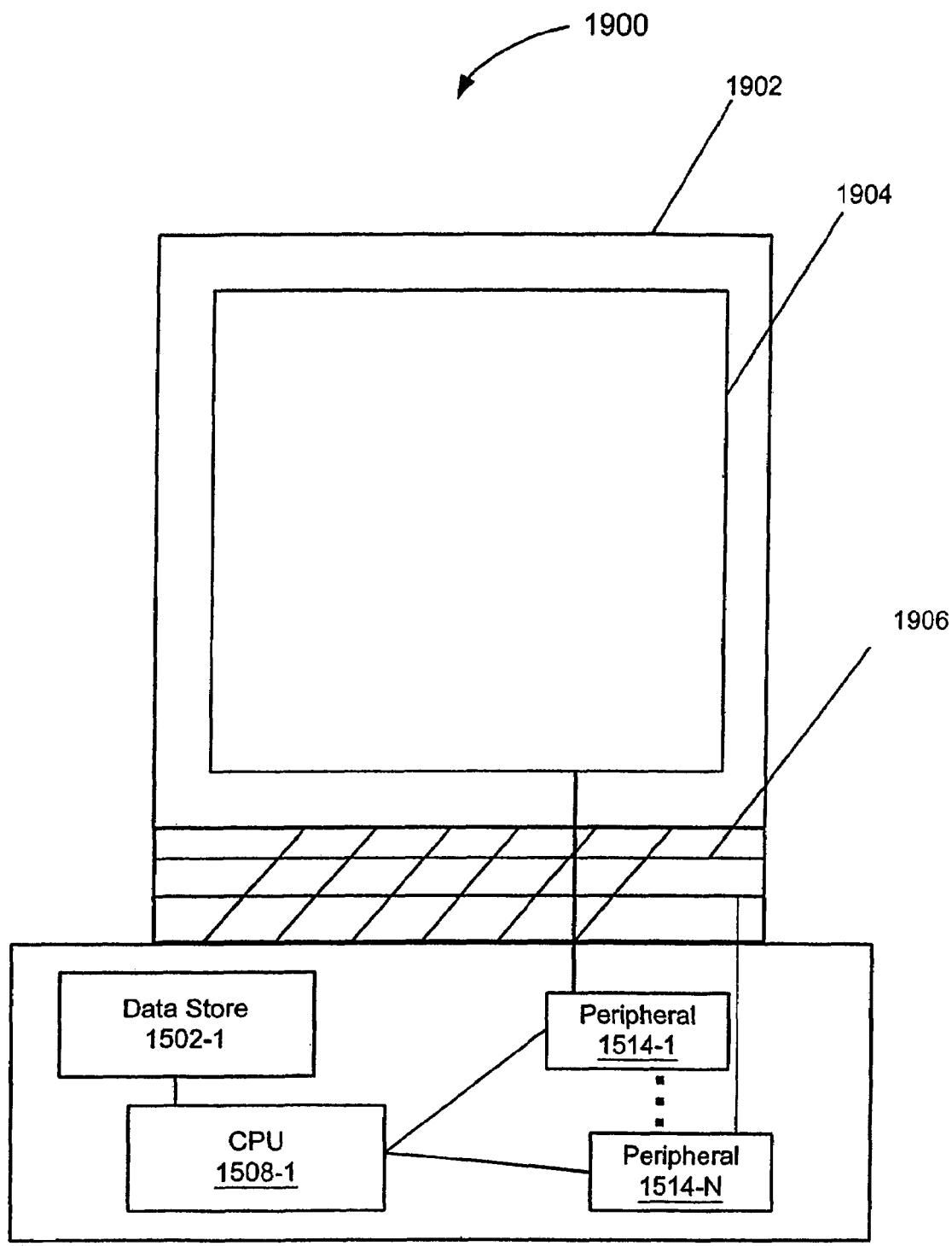
FIG. 1 illustrates a laptop computer or other computing system, according to the prior art.

This invention provides security and anti-viral, anti-hacker, and anti-cyber terror features, and can automatically create multiple sequentially or concurrently and intermittently isolated and/or restricted computing environments to prevent viruses, malicious or other computer hacking, computer or device corruption and failure by using these computing environments in conjunction with restricted and controlled methods of moving and copying data, combined with a process that destroys malicious code located in computing environments and data stores.

In one embodiment, the invention provides an information appliance architecture, system, device, and methods for configuring and operating are provided. An information appliance of the type having first storage for programs and data, and processor logic and executing computer program instructions to perform a task involving a user data; the information appliance operating so that separate control processing environments and user processing environments are created and maintained such that: (1) user data having unknown or untrusted content is not exposed in the control processor logic environment to computer program code that can execute any computer program code instructions imbedded in the user data; and (2) user data having unknown or untrusted content is only exposed in the user processor logic environment in a temporary storage different from the first storage when isolated from the first storage.

In another embodiment, the invention provides an information appliance having at least one processing logic device for executing at least one instruction; a first storage for storing first data and first program code including the at least one instruction and including a user data; a second storage for storing second data; a switching system for selectably and independently coupling and decoupling the processing logic device with the first storage and/or the second storage under automated control, the switching system receiving at least one control signal from the processing logic device for selecting a condition of the switching system; where the processing logic device operating in a control configuration and in a user data configuration according to the following conditions: (i) the processing logic device may be coupled with the first storage when the processing logic is loaded with a program instruction not capable of executing a data item that has untrusted content or that did not originate within a known controlled environment; (ii) the processing logic device may not be coupled with the first storage when the processing logic is loaded with a program instruction that may be capable of executing a data item that has untrusted content or that did not originate within a known controlled environment; (iii) the processing logic device may be coupled with the second storage when the processing logic is loaded with a program instruction that may be capable of executing a data item that has untrusted content or that did not originate within a known controlled environment; and (iv) the processing logic device may be coupled with the first storage and the second storage when the processing logic is loaded with a program instruction that is only capable of copying a data item from the first storage to the second storage or from the second storage to the first storage. A method of configuring and operating the information appliance is provided.

Embodiments of the invention may be applied to a variety of electronic devices and information appliances such as ones selected from the set of information appliances, but not limited to: a computer, a notebook computer, a personal data assistant, a personal data organizer, a cellular telephone, a mobile telephone, a radio receiver, a radio transmitter, a GPS receiver, a satellite telephone, an automobile on-board computer, an aircraft on-board computer, a navigation device, a home appliance, a printing device, a scanning device, a camera, an electronic camera, a television receiver, a broadcast control system, an electronic instrument, a medical monitoring device, a security device, an environmental control system, a electronic device, and combinations of these.

DETAILED DESCRIPTION OF EMBODIMENTS OF THE INVENTION

This invention relates generally to computers, information appliances, mobile communication devices, cellular and mobile telephones, personal data assistants (PDAs), music storage devices and players, data organizers, hybrid devices incorporating these functional elements, and to other electronic systems and devices. It relates even more particularly to such systems and devices that provide security features and anti-viral, anti-hacker, and anti-cyber terror features; and even more particularly to such devices that can automatically create multiple sequentially or concurrently and intermittently isolated and/or restricted computing environments to prevent viruses, malicious or other computer hacking, computer or device corruption and failure by using these computing environments in conjunction with restricted and controlled methods of moving and copying data, combined with a process that destroys malicious code located in computing environments and data stores.

In the present invention, these needs are satisfied by providing an architecture, system, and approach and method of operation for computing devices and other information appliances. This new approach results in computers and information appliances that are inherently immune to hacking and viruses and other malicious agents and code. Additionally, unlike computers that enable the user to initiate "repairs" on demand by reverting to a prior backup of the software, embodiments of the inventive architecture, system, and methods reset or erase memory and data stores, prior to opening each file to maintain known clean or sterile storage and processing environments. For example, using this new technology, data storage may be automatically reformatted or erased, and memory may be cleared or reset after each and every time a computing environment is or may have been exposed to un-trusted or unknown code, prior to moving or opening a new file in that computing environment.

It will be understood in the context of the architecture, system, and method that embodiments of the invention provide intermittently sequentially isolated, and/or communicatively restricted, computing environments that are created, operated, and terminated by an automated control system. Different levels of isolation and/or levels of security or immunity from malicious code may be implemented according to the needs of the computing environment and/or of the device incorporating or using the computing environment.

This section describes architectures, systems, apparatuses, methods, and computer programs and computer program products for protecting computers and computing devices from hacking, viruses, cyber-terrorism, and from potential damage or intrusion such as spy software (spy-ware), keystroke recorders and damage from hacking, viruses, worms, Trojan horses, and similar threats and vulnerabilities. Cyber-terrorism is an attempt to cripple or subvert a computing system, such as for example, by an attack that originates by an attempt at unauthorized access to a user's private data. The present invention provides a solution to potential cyber-terrorism.

A computer system of the prior art typically includes: a processor, memory, display, a display controller, and input/output controller. The present invention provides a plurality of special-purpose subsystems (physically or temporally separated) housed within a computer system (or other device) housing or case. These special-purpose subsystems typically perform limited functions and have limited interaction with other special-purpose subsystems.

General- or special-purpose subsystems (also referred to in some embodiments as "isolated processing unit", "isolated computing environments", or more simply as "computing environments" sometimes further characterized by a functionally descriptive adjective) may be designed for many purposes, including to support storing information, performing work, and handing communication.

It is also to be noted that computing environments and components of such computing environments may be modular and dynamically configured so that the specific defective component and/or computing environment can be taken out of service by a controlling entity, such as a CSCE or CCE computing environment, until the defective component or set of components comprising a computing environment are swapped out for a working part or repaired. An optional diagnostic process of attaching components (such as via one or more switches or otherwise) and testing and removing components can be performed in order to identify and isolate the problem.

Aspects of computing environments are now described. This description is somewhat generalized owing to the broad range of specific embodiments and physical implementations that may be realized. A computing environment may execute one or more computer program instruction. One or more computing environments may be coupled with a computer system. The computing environment may be represented by a physical representation, a logical representation, and/or a combination of physical and logical representations. In a physical representation, the computing environment may incorporate a number of physical computer components, such as, for example, a central processing unit (CPU), one or more memory, and one or more peripheral. In a logical computing environment representation provides that a first computing environment may coexist with other computing environments by utilizing one or more common computing components. The first computing environment is isolated from the other computing environments such that communication is supported between the first computing environment and the other computing environments that might communicate a virus, hacker, or other intentionally or accidentally malicious code or data. For example, in one embodiment there is only indirect communication of a limited set of information. In another embodiment, there may be direct communication but such communication may be limited in specific ways, such as to permit only authorized data types and amounts, such as window screen coordinates, mouse position coordinates, or other data types and amounts as are described in additional detail herein. Filters or limiters may be used to limit the communication between the first computing environment and the second or other computing environments. In some embodiments these filters and/or limiters are hardware circuits that cannot be corrupted by malicious code, in other embodiments software and/or firmware may be used for such filtering or limiting, and in other embodiments hybrid hardware-software/firmware filters and/or limiters may be used.

Each computing environment is typically capable of performing processing activities including receiving input from one or more peripheral through the I/O switch system, and sending output to one or more peripheral through the I/O switch system. The processing activity performed by one computing environment is typically independent of the processing activities of another computing environment. According to one embodiment of the present invention, a potentially malicious processing activity of one computing environment does not directly interfere with the processing activity of another computing environment.

According to one embodiment, an isolated computing environment and other physical or logical computing environments may exist in different address spaces that correspond with a computer system. Consequently, each physical or logical computing environment is isolated from the operation of each of the other logical computing environments. Furthermore, one should appreciate that a variety of configurations may be used for managing the creation and operation of multiple logical computing environments. Furthermore, one should also appreciate that an operating system, (such as for example Linux, Macintosh, Microsoft Windows (R), and/or other operating system), may correspond with a logical computing environment, a physical computing environment, and/or a combination of logical and physical computing environments.

A controlling computing environment may be selected from the computing environments for configuring and/or reconfiguring the data store switch system configuration and/or the I/O switch system configuration. The data store switch system configuration may support communication between the control computing environment and the protected data store, as described above. According to one embodiment of the present invention, an initial boot sequence may identify initial configuration information within the computer CMOS data to identify the control computing environment, the protected data store, and initiate configuration of the data store switch system configuration and/or the I/O switch system configuration.

One or more user computing environment may be selected from the computing environments to perform computer processing in isolation from the controlling computing environments and other user computing environments. Data (such as computer files) may be received by the user computing environment through a data store that may be communicatively coupled with the user computing environment. According to one embodiment, the controlling computing environment that may be communicatively coupled with a first data store that may include user information and a protected data store that may also include user information. The controlling computing environment is configured to support copying information between the protected data store and the first data store. After the controlling computing environment initializes the first data store then the first data store may be communicatively de-attached from the controlling computing environment and then attached to the user computing environment for use independent of other computing environments. After the user computing environment completes an activity (such as for example, editing a file, receiving email, etc.) then the first data store may be communicatively de-attached from the user computing environment and attached to the controlling computing environment. Again, the controlling computing environment is configured to support copying information between the protected data store and the first data store. Consequently, data may be saved independently of the processing activities of the user computing environment. Accordingly, malicious code being processed within a user computing environment does not corrupt other files and/or data stored on a protected data store.

In one embodiment, sophisticated processing capability such as processing capability that might provide a capability to execute malicious computer program code or software, is selectively and intermittently removed when only a copy operation. The sophisticated processing or process itself is switched out of accessibility or disabled in response to a signal from the controlling entity during the copy operation and then re-enabled when the operation is completed. This operation may for example be used for a file save operation, or when copying data or master templates to a computing environment.

Returning to a description of other features we note that in one embodiment, a storage special-purpose subsystem or computing environment (or protected storage computing environment) may be designed to store data and retrieve data, while allowing limited access to the stored data. A working special-purpose subsystem (also referred to as a isolated processing unit computing environment) may be designed to process information to achieve the same result as in a general purpose computer with various applications, but at the same time protecting the system as a whole and the user's data from loss or corruption. A communication special-purpose subsystem (or control and switching computing environment) may be designed to facilitate communication between other special-purpose subsystems or computing environments.

Each special-purpose subsystem or computing environment typically may include, depending upon the processing to be accomplished, one, some combination, or all of a: processing capability, memory, logic, and an interface for coupling for communication the special-purpose subsystem or computing environment with another (internal or external) component. Processing capability may be a computer processing unit (CPU) of some type or ASIC. The processing capability may be the computer-system CPU, or a CPU shared by multiple special-purpose subsystems. Thus, the processing capability associated with a special-purpose subsystem may also be used by the computer system or other special-purpose subsystems.

Exemplary features and aspects of the invention are first described to provide at least a partial orientation to the architecture, features, and advantages of the invention. This section is followed by even more detailed descriptions of several exemplary architectures and structural topologies so that both the broad scope of the invention and particular structural and methodological implementations are more readily understood.

Various embodiments of this invention provide concurrent and/or intermittent and sequential or temporal (time) isolation, and/or restriction of: processing or computing environments, data storage and processes, and communication. In at least some embodiments, this isolation and/or restriction is combined with erasure, reformatting, resetting or other sterilization of a previously used processing or computer environments prior to using that computing or processing environment for a later operation, such as before opening another file or data set for an operation.

In one embodiment, a computer system or other device incorporating a computing system or capability can be provided with a new type of self repairing feature on the basis that sequentially and automatically erasing/re-setting and copying all or part of a master template prior to each time a new file is opened can either repair the computer or prevent failure in the first instance.

In one exemplary embodiment, user data is stored in one or more concurrently or intermittently sequentially isolated and/or or restricted data stores and/or intermittently isolated and/or restricted protected computing environments. Herein, a protected data store or stores or protected computing environment(s) may be referred to as Protected Data Storage (PDS). Protected Data Storage may store any kind of data such as user data and files, application program code programs or applets, operating systems or portions thereof, device drivers, status or state information, or any other information of whatever type.

While the structure, organization, and stored content of a protected data store or more generally protected store may vary from system to system, some features that may be present (including some optional features) are now described relative to one embodiment. A protected data store represents a data store that is used for storing information in a manner that prevents the data (any data including but not limited to user data, computer program code, email, web pages, instructions, operating system code, or any other set or collection of binary bits in that data store from being executed. Therefore the data is not exposed to a processing environment that typically performs processing or operations on the stored data or information based on the contents of the store information. This same isolation from exposure may also be applied during data and software copy operations so that any malicious code contained therein cannot be executed until it is in an isolated computing environment where exposure to an executing capability will at most contaminate that particular computing environment but be contained in isolation.

According to one embodiment of the present invention, a user file (such as, for example, a user's word processing document, e-mail, spreadsheet, Microsoft Outlook or other contacts file, password, cell phone telephone number list, PDA stored data, or any other user data or program) may be stored on a protected data store. In one embodiment the protection is achieved by storing the data in a protected store so that it is not accessible by any structure or process that can cause execution of malicious code or binary sequences such as may be present in a virus, robot, hacker code, or other malicious code. Ideally, user operations such as edits of the corresponding work processing document or opening and review of the email message (and any attachments thereto) are performed on a copy of the original data independently of the original version of the document that is stored on the protected data store and in a location within the computer (or other electronic device such as a PDA, cell phone, analog or digital camera, or other information appliance). The separation of the protected storage of an original file or data set and the storage and operation on a copy of the file or data set is described in greater detail elsewhere herein. In this context is may be appreciated that separated from a processor capable of executing viral or other malicious code, such code is simply a collection of "0" and "1" bits that will not be problematic even if it is stored on the data store or moved or copied from one data store to another data store.

One or more of the inventive data stores may be used to define a protected data store. Multiple protected data stores may optionally be defined but are not typically needed. According to one embodiment of the invention, the protected data store may be used to store the user data or other files (possibly including computer application program, operating system, and other non-user code or data) independently of a processing environment that may modify the user file. It is noted that the master template may be one type of non-user data that is stored in a form of protected storage. This may alternatively be referred to as protected master template store.

According to one alignment of the present invention, a user's decision to edit the document causes the original version of the document to be copied from the protected data store to a second data store. A user computing environment that can be coupled with the second data store for editing the original document may be used to create a second version of the document. An action by the user, such as, for example, saving the second version of the document, generates a series of instructions that copies the second version of the document from the second data store back to the protected data store. Copying the second version of the document back to the protected data store may overwrite the original version of the document.

The structure and procedure for storing and retrieving binary data from protected data store and/or from protected master template store, and how operation on this protected information processed in the computing system without subjecting the data that may contain malicious code or data stored on the same storage device or within the same computer system is described in greater detail elsewhere in this specification.

Returning now to the description of the system, it is by means of switching communication that a Control Computing Environment concurrently or intermittently isolates and/or restricts communication with the Protected Data Storage as needed to protect the Protected Data Storage from the processing or execution of code that may occur of unknown and potentially malicious code. A directory of the data on the Protected Data Store may be created for example by a Control Computing Environment or a Protected Storage Computing Environment (see further description of these particular computing environment configurations herein elsewhere), and this directory may be communicated to a (concurrently or intermittently) isolated and/or restricted computing environment, such as for example a Desktop Computing Environment. Embodiments of these Control Computing Environments, Protected Storage Computing Environments, and Desktop Computing Environments, as well as other computing environments are described in greater detail elsewhere in this specification and in the drawings. Note that in one embodiment the directory is made by a Protected Storage Computing Environment that may contain limited processing abilities. For example it may contain functionality to read and write ASCII and extended ASCII filenames and directories, and may contain the ability to copy and move data, and may contain the ability to create a file directory, but may generally not contain many other functions or capabilities that would be required to recognize or execute code or perform other functions that might be harmful to system, program, or data integrity. This information may be collected by the Control Computing Environment or sent to the Control Computing Environment by the Protected Storage Computing Environment.

It should be noted that in at least one embodiment of the invention, one, more than one, or any combination of the following structures and/or procedures may be combined into one computing environment configuration and/or process and that these may be predetermined or dynamically determined and configured: (a) control environment, (b) protected storage, (c) desktop environment, (d) switch, (e) switch configuration, (f) reformatting/erasing environment, (g) video control environment, (h) video processing, and any combination or subset of these. Other optional structural and/or procedural elements may also or alternatively be implemented as described elsewhere in this specification. Thus, for example, in one embodiment, the invention could consist of two computing environments, one that contains all environments and switches and switch configuration, but excluding the user computing environment, and a second environment that only contains a user environment.

To open user data, the user may select a representation of the data such as a filename or a "shortcut" or "alias" that is located or identified in or by the Desktop Computing Environment. The actual file is not opened or executed in the desktop computing environment and in embodiments of the invention is not actually present in that Desktop Computing Environment. Instead, this filename and location information (a pointer or reference to the file or data set) may then be sent to the Control Computing Environment which may not be isolated from the Desktop Computing Environment. In this embodiment, the Control Computing Environment may then copy the file corresponding to the file name selected by the user (or other designating entity) from the Protected Data Storage to one of a plurality of concurrently or intermittently isolated and/or communicatively restricted computing environments (such as to a User Computing Environment # 1). In this example, a command is sent to User Computing Environment # 1 to open the file, and a command is sent to the switch(s) to terminate unrestricted communication with the User Computing Environment # 1. The architecture, system, and methods associated with such operation are described in greater detail elsewhere in this specification.

At least in part for this reason, if the user data is "infected" with malicious code and executes, it can not damage or destroy other user data or information that is in storage protected from the executing malicious code, except for damage to the originally infected data file. It is also true that if the application program computer code or operating system program code is or may have been contaminated or compromised, such contamination or compromise will not have any impact of continued operation of the system or device because at most a copy has been contaminated or compromised and is not reused.

In this exemplary embodiment an optional restricted communication path may connect the User Computing Environment # 1 to the Control Computing Environment and this communication path may be restricted any one or more of several ways. For example, the communication path may be restricted by an ASIC limiter or filter which may have highly restricted communication abilities such as permitting only a predetermined set of ACSII characters to pass, such set and ordering being known with certainty or predetermined high probability of not supporting executable instructions. The limiter may for example compare the bits or characters that are attempted to be communicated with a permitted set of bits or characters.

In this particular embodiment, for example, it may only contain or possess the functionality required to communicate a very limited number and/or combination or sequence of binary "0" or "1" bits to the control environment, representing concepts such as for example: "save file" and "erase/reset this computing environment", and may for example contain limits to the quantity of information it can communicate in a time period or in response to an event or events.

Alternatively or in addition, for example, a electrical or optical light pulse or other signal could be communicated to a receiver connected to the control environment, and for example one pulse meaning "save file"; and two timed consecutive pulses meaning "erase/reset this computing environment." It will be appreciated that these are only examples, and those workers having ordinary skill in the art in light of the description presented here will appreciate that other signaling schemes that limit the amount or nature of the information but that provide the required operation may be implemented.

After a data store and its computing environment has been "exposed" to a user document, and thus potentially exposed to a virus, spy software, or the like intentionally or unintentionally malicious program code, the data storage device may be completely reformatted and/or cleared, erased, and reset in any combination, thus eliminating all data, such as, for example, hidden partitions, drivers, boot sectors, hidden code, or the like. The computing environment may also be "re-set" (such as for example, power cycled or otherwise cleared or reloaded) in a manner that assures no residual contamination prior to its next use.

The switching and copying process described above (and in various alternative embodiments elsewhere in this specification) may be used to move data safely to and from isolated computing environments and data storage devices or storage subsystems; this process may be controlled and orchestrated by the Control Computing Environment, and associated software and the connected switches. Master Templates (described in greater detail in its various embodiments elsewhere herein, but which in simplified terms, contains or includes clean and uncontaminated executable code) may be copied between data storage devices as needed.

Several switches and switching systems and means are described in connection with the several embodiments. Again, this description is somewhat generalized because of the broad applicability of the inventive architecture, system, and method to many different physical implementations and device types. In one embodiment, a general switch system may be used to couple one or more of source and one or more of destination to support a communication between source and the destination, such as a for example between first and second storage devices or between a network interface card (NIC) and a computing environment, to name only two of many examples that could be named. The communication may support bi-directional or only unidirectional communications between a source and a destination. The general switch system may be coupled with a switch configuration that is used to determine which sources are to be coupled with which destinations. The switch configuration may for example include one or more of a logic circuit or circuits, a data file, a look-up table, and/or any other means for identifying or designating connections or valid enabled communications paths between source(s) and destination(s). In one embodiment, the switch configuration may identify invalid or non-enabled communication paths, and in yet another embodiment the switch configuration may identify both invalid (non-enabled) and valid (enabled) communication paths between possible sources and destinations. The general switch system may be implemented in hardware, software, and/or a combination of hardware and software.

According to one embodiment of the invention, the general switch system may be implemented in hardware as a physical switch. The source may be represented as an IDE drive and the destination may be represented as a computing environment. Each source may be coupled with the general switch system using an IDE cable. Each destination may also be coupled with the general switch system using an IDE cable. According to one embodiment of the present invention, the switch configuration may be represented according to the physical capabilities of the switch and where the IDE cables are physically coupled with the switch. Physical manipulation and/or twisting of the physical switch may thereby connect a given IDE cable corresponding with a source to a given second IDE cable corresponding with a destination for supporting communication between the source and the destination. The communication between the source and the destination may support bidirectional communication. According to one embodiment of the present invention, the switch may be actuated manually and/or under the direction and/or control of one or more computing environment.

According to one embodiment of the present invention, a general switch system may be implemented in a combination of hardware and software, such as, for example, through the use of a computer system coupled with a general switch system. The computer system is capable of executing one or more computer instructions and may be used to configure the general switch system. Several example instructions may include configuring instructions, communication instructions, and accessing instructions. Configuring instructions may be used for configuring communication to support enabling or disabling communication between a given source and destination. Communication instructions may be used for receiving, sending, and/or verifying information related to one or more configurations. For example, communication instructions may be used to receive information that may subsequently be used by a configuration instruction. Accessing instructions may be used to read and/or write information related to a switch configuration. However, one should appreciate that other instructions and/or sets of instructions may be used.

The data store switch system may include the functionality of a general switch system, where the source may represent a data store and the destination may represent a computing environment. The general configuration may be used to identify which data stores are coupled with which computing environments. As described above, the IDE devices may represent one embodiment of a data store that may be configured to support communication with one or more computing environment.

According to one embodiment of the present invention, the data store switch system may be coupled with a data store switch system configuration that may extend the number and/or type of traits corresponding with a general configuration. The data store switch system traits may further support configuring communication between the source and the destination.

The I/O and/or other peripheral or device switch system may include the functionality of a general switch system, where the source may represent a peripheral and the destination may represent a computing environment. The general configuration may be used to identify which data stores are coupled with which computing environments. A keyboard device may represent one embodiment of a peripheral that may be configured to support communication with one or more computing environment.

According to one embodiment of the present invention, the I/O system may be coupled with an I/O system configuration that may extend the number and/or type of traits corresponding with a general configuration. The I/O switch system traits support configuring communication between the source and the destination.

In the context of such switching and communication paths, in one embodiment, a data store switch communication path is used to couple a computing environment with the data store switch. The data store switch communication path is used to support the communication with at least one data store according to the data store switch configuration, as described above. According to one embodiment, one of the data stores coupled with the computing environment includes an operating system that may be used by the computing environment as a computer boot device.

In analogous manner, an I/O switch communication path is used to couple a computing environment with the I/O switch system. The I/O switch communication path may be used to couple one or more peripheral with one or more computing environments. The I/O switch system configuration may be used to direct the output from one or more computing environments to a single output device. Similarly, the I/O switch system configuration may be used to direct an input from a single peripheral computing device to one or more computing environments.

The I/O switch system configuration may be configured to direct a received input (or output) to at least one of the computing environment based on a corresponding trait. And, the I/O switch system configuration may be configured to direct an output generated by one or more of the computing environments to and input/output device, a peripheral, or to or from some other component in the system based on a corresponding trait (see description of traits elsewhere in this specification).

Turning attention to another type of signal, it is noted that in one embodiment, video signal outputs from each isolated computing environment may be combined or mixed at the point in the processing of these video signals when malicious code can no longer execute (for example, when output has been converted into graphic "primitives and attributes", and/or where the video signals are analog signals). This prevents a windowed video signal representing the process occurring in an isolated computing environment from being used as a medium for cross contaminating the different computing environments. (Note that not all computing environments require or generate video output signals, as some processing especially in specialized devices may process data in a computing environment but not provide a video display or signal that the user can view.)

In on embodiment, a so called "isolated global toolbar" may also be utilized for a predetermined or dynamically (e.g. context sensitive) commands and/or other operations or functions. This isolated global toolbar may appear on its own isolated video layer or on the Desktop Computing Environment to protect it from malicious code. Advantageously, the isolated global toolbar is always on top or displayed in response to some user command or action so that the user or other trusted control entity may directly control an action in one of the computing environments. For example, if a user sees some suspicious output represented in a windowed video portion of the display screen, the user may access the isolated global toolbar and terminate the processing occurring in that computing environment, including optionally taking various options such as saving or not saving a file. In one embodiment, this provides the user or human operator with administrative control over the operation of the entire system as well as the operations occurring within any computing environment. In principle, the global tool bar may permit any operation or function but some embodiments, the global tool bar has a more restricted set of administrative functions or operation. In some embodiments, the functions and operations that may be accessed via the global tool bar may be set according to system defaults, administrative preferences, user preferences, or according to other rules or policies.

In one embodiment, these functions and operations may also or alternately be performed in computer program software instructions. In other embodiments, there may be a hardware component and in other embodiments that is a combination of hardware and software. Thus, each environment may be isolated in software, the switching and copying may be performed by software, and the like.

It should be noted that optional procedural steps can be cut or eliminated, and the functions of computing environments described herein can be mixed and matched as desired. In some instances the decision to include or exclude optional steps or procedures will be made in the context of the threat environment, the sensitivity of the data and/or operation, the need for speed, the storage device attributes (magnetic storage versus electronic RAM for example), and other factors. For example, the functions of the Control Computing Environment could be combined with the Desktop Computing Environment and/or the Switch Configuration, and/or the switch, and/or Protected Storage.

The principles of the invention transcend any particular computer operating system, application program, user interface, or device type or characteristic. Essentially the inventive architecture, system, method, and procedures are applicable to any electrical, electronic, or optical device that has logic circuitry capable of using information (such as in the form of binary bits) to perform an intended logical or arithmetic operations and are therefore susceptible to being altered or corrupted by having different or additional information introduced so that the intended operations are not performed or additional operations are performed. In contemporary devices such as computers, information appliances, cellular or other mobile telephones, automotive electronics, home appliances, GPS receivers, PDAs, and the like the logic is a controller, processor, microprocessor, or other programmable logic circuits or logic means, or the like; and the information used are computer program instructions and optional data. In the future it is anticipated that current developmental optical computing systems will be further commercialized and that the invention will therefore become applicable to optical computing and information processing systems and optical processors as well.

The description here focuses attention on computers and computing environments but it will be appreciated that the invention is applicable to all manner of devices and systems that have logic to interpret instructions and/or data and are therefore susceptible to accidental or intended malicious attach by viruses, hackers, spyware, cyber-terror or other external agents.

Attention is now directed to some features of a conventional computing system and comparative aspects of various embodiments of the invention. As the invention may be implemented in a number of different physical forms, we describe numerous embodiments as examples of how typical systems might be implemented. It will be understood by those workers having ordinary skill in the art that these are merely additional embodiments of the invention that embody some or all of these features.

FIG. 1 is an illustration showing a typical laptop (or other) computer system 1900, according to the prior art. This computer system includes a case or housing in which are disposed the electronics and any mechanical components, such as CPU 1508-1, Data store 1502-1 (typically in the form of a rotating magnetic hard disc drive, and one or more peripherals 1541-1, 1541-2, . . . , 1541-N, as are known in the art. The housing or case 1904 also typically mounts or carries a display screen 1904 and a keyboard and pointing device such as a mouse. Additional external peripheral devices may be attached or connected to such computer system 1900 via a variety of connector ports as are typically provided. In such conventional computing systems, the data store 1502-1 and peripherals 1514-N are coupled to CPU 1508-1 in a fixed topology, usually through system and peripheral busses as are known in the art. For example, the data store 1502-1, typically a hard disk drive or some solid state memory (RAM) is always coupled to the CPU unless physically removed from the system 1900. Likewise, the CPU coupled memory is typically always coupled to the CPU unless removed and in most conventional computing systems a certain portion of such memory (such as in the form of on-chip caches) is always and permanently coupled to the CPU. Similarly, peripherals such as CDROM, DVD reader/writers, network interface cards (NIC), modems, floppy-disk drives (FDD), wireless interface cards, and other peripherals are coupled to the system and directly or indirectly to the CPU via fixed busses and interconnects. Because these connections are always present, they may provide an opportunity for the introduction of a virus or other malicious code into the CPU, CPU associated memory, BIOS, or onto a data store. Such malicious code may act immediately or lay dormant until some future time or event.

Such vulnerability and means for achieving a level of immunity from such vulnerability is further described relative to embodiments of the invention.

Figure 2:
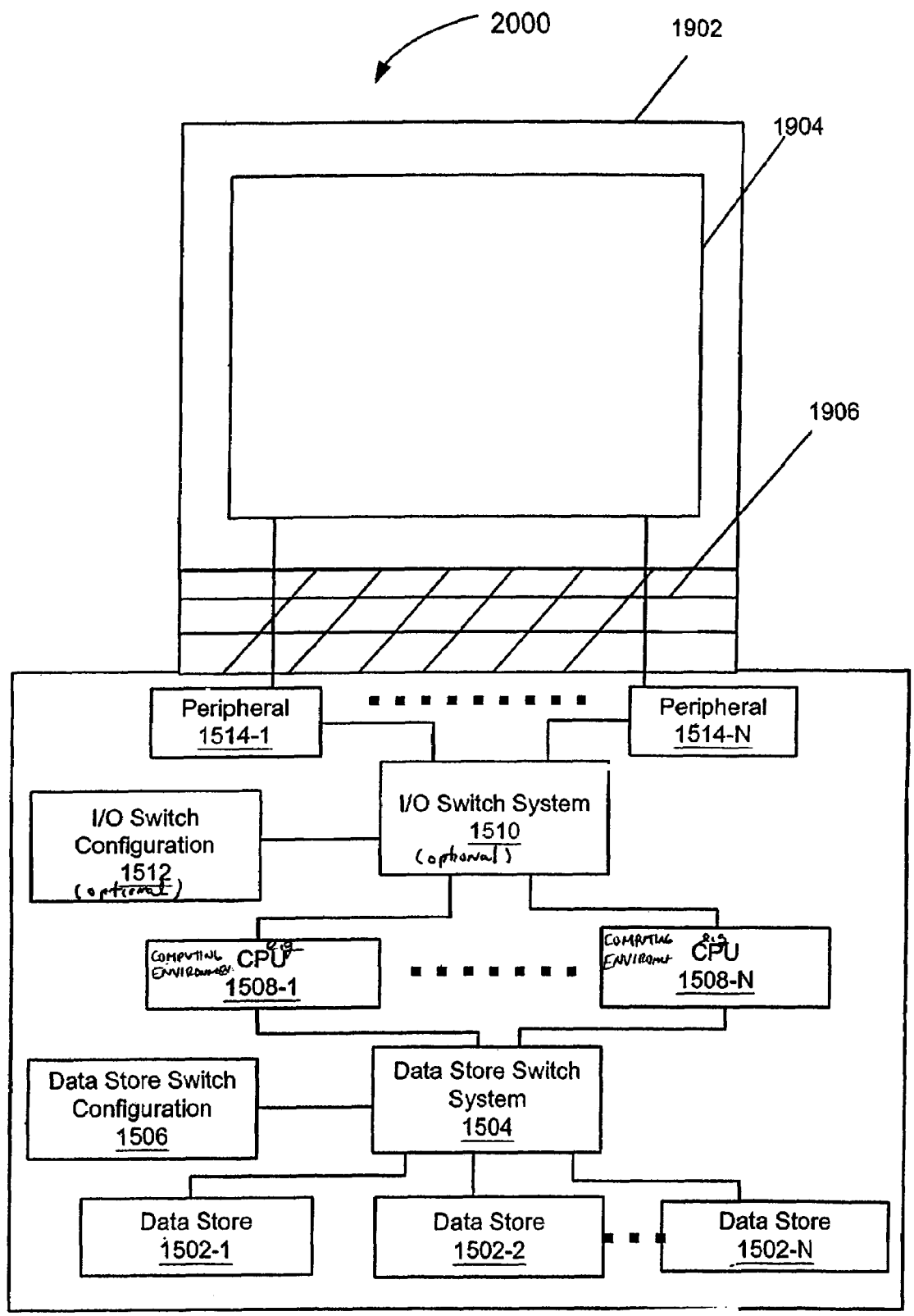
FIG. 2 illustrates a laptop computer system or other information appliance incorporating one embodiment of the present invention.

FIG. 2 illustrates an exemplary information appliance, such as a desktop computer system, a laptop computer system, a notebook computer system, a personal data assistant (PDA), a stationary or mobile wired or wireless communication device (such as a mobile telephone, cellular telephone, satellite telephone, radio-frequency transmitter and/or receiver, and the like). In general the inventive structures, methods, computer programs and computer program products are applicable and may be used with any electronic device or system that includes or may be adapted to include at least one processing elements, such as a controller or micro-controller, a CPU, an ASIC, a microprocessor, a logic circuit, or any other processing element. (Other embodiments of the invention are described and may utilize two or other plurality of such processing elements, including any combination of the recited processing element types.) Such systems may be implemented to perform a variety of operations, such as for example some predetermined, dynamically determined or other logic, computational, word processing, email, network computing, music processing, video processing, Internet browsing, voice processing or coding or decoding, picture or image acquisition or processing such as in digital cameras of mobile telephones incorporating digital cameras, GPS signal reception and processing, positional navigation, entertainment. Those workers having ordinary skill in the art in light of the description provided here will appreciate that many electronic devices and systems fall into the applicable category of applications. The invention provides particular advantages where anti-viral and anti-hacker protection is desired and also where it is desired to process multiple applications concurrently, though these two advantages may be achieved separately.

In the illustrated embodiment a single computing environment, or more advantageously in most embodiments of the inventive system and method, a plurality multiple independent computing environments 1508-1, 1508-2, . . . , 1508-N are created. These computing environments 1508 have features analogous to the special purpose subsystems 1120 in the embodiments of FIG. 7 and FIG. 8, and the analogy will become more clear after the several embodiments of the invention have been described in full detail. The independent computing environments may for example be physically implemented using hard-wired or programmable arithmetic or logic circuitry, programmable micro-controllers, processors, microprocessors, CPUs, ASICs, in any combination and possibly with the support of support components such as microprocessor memory, power and the like as are known in the art.

At least certain embodiments utilize Central Processing Units (CPUs), microprocessors, micro-controllers, ASICs, or some combination to provide the physical structure to create the computing (processing) environment 1508. In some instances the complexity of the processing or computational task will dictate the physical elements that will support the desired computing environment. In one embodiment the elements that create the computing environment are dynamically selectable and configurable. Such selection and configuration may be under user control, or more typically, under the automatic control of the computing system 2000 according to some predetermined or dynamically determined rules or policies and optionally but desirable according to some measured computing system physical or logical state, environmental conditions, processing request and complexity, application program size and data set size. Spares may also be provided so that such spare component (such as CPU, memory, storage, video processor, coprocessor, modem, network or Ethernet processor, and the like) can be switched in to replace a failed component. Dynamic allocation and configurability also provides efficiency where there are to be many computing environments as it is not necessary to provide all processing capabilities for every environment.

The computing environments 1508 are or may be coupled or selectably coupleable to peripherals 1514-1, . . . , 1514-N via optional I/O Switch system 1510 according to switching commands or an I/O switch configuration data or logic 1512. Any requirement for the optional I/O switch system 1510 in particular embodiments of the invention may depend on such factors as the characteristics of the particular peripheral, and the required or desired degree of security or isolation. In some embodiments, certain peripherals may be directly connected, permanently connected, permanently disconnected, or switchable connected with one or selected computing environments. The computer system 2000 of FIG. 2, may for example include a display device 1904 attached to and held by case or frame 1902. It will also generally include an input device such as a keyboard and pointing device, though there are not required given the many alternatives for input and output, such as voice input, touch screens, voice or spoken computer generated speech, and the like. LCD displays may also take the place of computer screens in such devices as cellular telephones, PDAs, and digital cameras, among other devices.

As with other switches and switching systems described herein, the switching can be any one, plurality, or multiplicity of mechanical, electrical, electronic, transistor, diode, microprocessor, digital or analog, that accomplish the desired switching and maintain desired or required voltage, current, isolation, impedance, termination, and/or electrical characteristics. For example, a switch that connects and disconnects a hard disk drive from a CPU will do so without damaging the CPU or the hard disk drive. In some situations with some devices, switching may be accomplished by turning the device, or portions of the device off, or otherwise limiting the operating voltage or current, by stopping a clock to the device, by interrupting a data line or communication pathway but not interrupting a power line, or other ways of stopping operation as are known in the art. As is described elsewhere in the specification, in some instances these switching operations are intended to provide a guaranteed level of isolation between components of the computing system and the different computing environments 1508-1, . . . , 1508-N.

Figure 7:
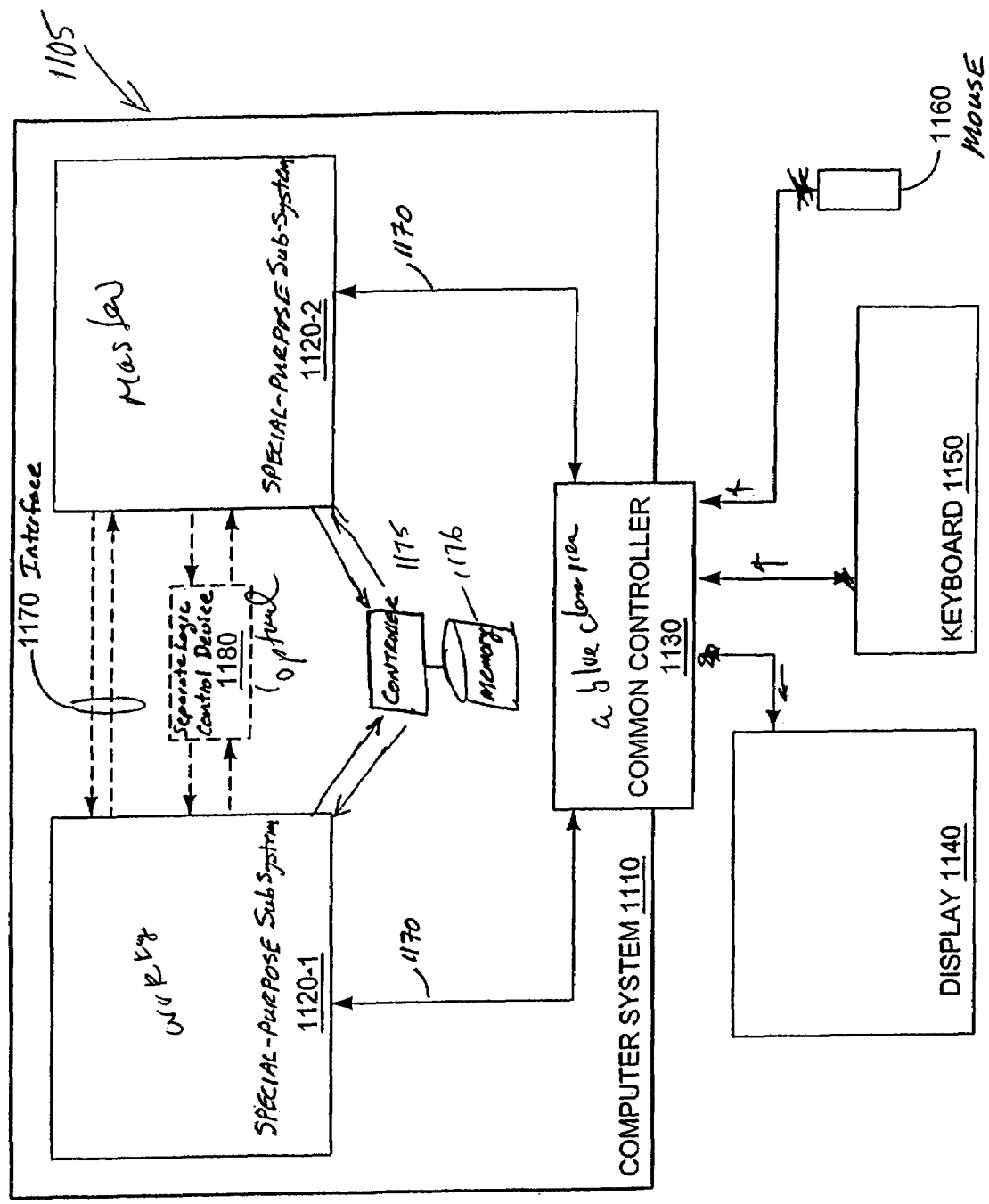
FIG. 7 illustrates an alternative embodiment of the invention including special purpose sub-systems or computing environments and a common controller.
Figure 8:
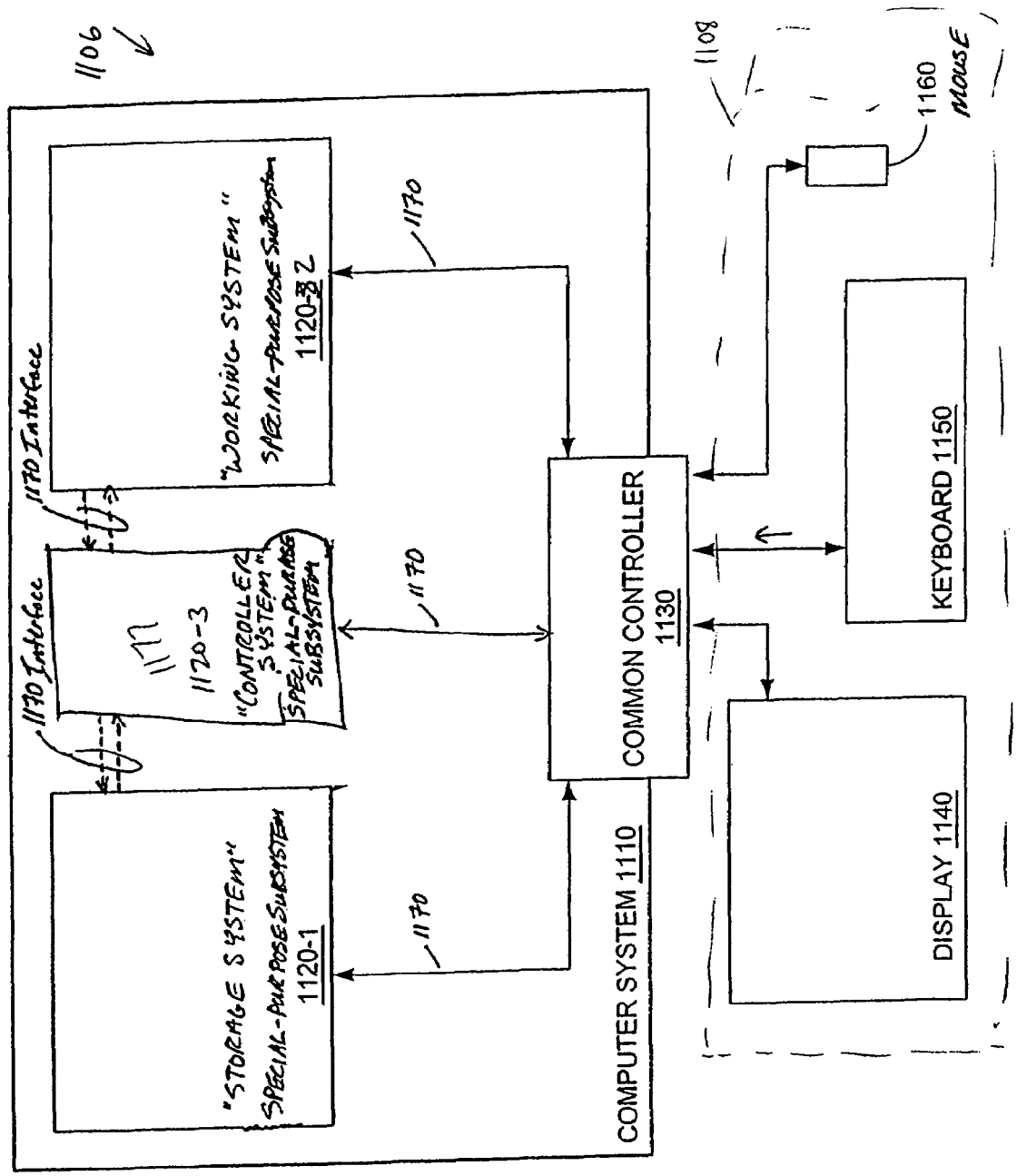
FIG. 8 illustrates another alternative embodiment of the invention.

The plurality of computing environments (also referred to as special purpose subsystems 1120 in the embodiment of FIG. 7 and FIG. 8) are also selectably coupled or coupleable to one or a plurality of data stores 1502 through a data store switch system 1504 via data store switch system 1504 according to switching commands or a data store switch configuration data or logic 1506. Data store may be any combination of storage devices known in the art or to be developed, such as including but not limited to, rotating magnetic hard disk drives, rotating or non-rotating optical storage media, CDs, DVDs, holographic recordings, nanotechnology based storage, solid state memory (RAM, ROM, EEPROM, CMOS, and the like), molecular or atomic storage, chemical memory, as well as any other storage device or system. It will be appreciated that the separate logical storage elements 1502-1, 1502-2, . . . , 1502-N may be configured or portioned on a single physical device or within or on any combination of physical devices and that even for a single logical storage device 1502-2 (for example) multiple different physical devices may be utilized to obtain the desired or required storage capacity, copy data to device speed, write data from storage device speed, clear and/or erase or overwrite speed and performance, or other operating characteristics. For example in one embodiment for a notebook computer, some of data store 1502 are implemented as logical partitions of a single physical hard disk drive. In another embodiment, all of the data store 1502 are implemented with solid state memory devices to provide fast read, write, and erasure speed performance. Various kinds of multiply-ported memory types and architectures are available and may be used. For example, Rambus memory may be used as well as more conventional memory chips. In yet another embodiment, several of the data store 1502 are implemented as separate platters or disks on a multi-disk hard magnetic disk drive. Such drives may have a single controller and controlled set of read/write heads, or may have separate controllers and optionally independently operable actuator arms and read/write heads to assure isolation of data paths so that malicious code (such as from a virus, robot, or computer hacker) cannot migrate from one computing environment to another and corrupt the intended isolation and independence of the several computing environments 1508.

It is expected that for physically small devices (such as for example, PDAs, mobile telephones or other communication devices) there will be a preference to utilize only solid state memory as compared to memory having mechanical moving parts because of the lower energy consumption, smaller size, lower heat generation, faster access speed, read/write speed, and speed and ease or erasure. Such solid state memory may be internal to the device (e.g. mobile telephone), external but pluggable via a mechanical and electrical connector or coupling (such as by using compact memory cards or modules, Sony SmartMedia, as are available as base or additional memory for Microsoft Windows operating system (OS) and PalmPilot OS based PDAs; PDA cell phone combinations; PDA, cell phone, and digital camera combination devices; digital cameras; cell phones; digital audio and/or video recorders and players; MP3 players; and other devices and memory systems as are known in the art. There are also small and inexpensive storage devices and subsystems that are not solid state that may be used.

A comparison between the conventional computer system 1900 of FIG. 1 and the inventive embodiment 2000 of FIG. 2, reveals several differences. In the conventional system, the data store 1502-1 in connected directly or via some more-or-less fixed and permanent connections to CPU 1508-1, such as over one or more busses or interconnects. (Mechanical and manual disconnection may be possible in some instances and for some device types, but not under programmatic control during operation of the computer according to the need for or desirability of a particular storage device, peripheral device, or other system component at the time according to a processing operation.) By comparison with conventional system 1900, the several data stores 1502-1, . . . , 1502-N of the computer system 2000 are coupled, if at all (depending upon the state of the data store switch system 1504), to a computing environment (e.g. a computing environment that includes some processing or computing capability such as but not limited to a CPU) though the data store switch system. In general, any one of the data store 1502 may be coupled to any one of the computing environments, or coupled to none of them. More typically, any given data store will be intermittently coupled with or connected to a computing environment when there is a need for such coupling or connection, and the particular data store to which a particular data store 1502 may change during the existence of the computing environment. The predominant default is that such data stores and other devices are not coupled or connected unless access is specifically desired, required, and permitted by the controller or controlling computing environment.

Furthermore, in embodiments of the invention, the paring or switching connection between physical components such as a particular CPU and a particular data store (e.g. hard disc drive or solid state memory chip) may (but is not required to) dynamically change for different processing operations. Likewise, in at least some embodiments that include the optional I/O switch system 1510 and the optional I/O switch configuration 1512, the computing environments 1508 couple to peripherals 1514 only via the I/O switch system 1510. The switchable connection or coupling may involve any of a variety of switching schemes, such as schemes that involve altering one or more electrical connection, removing power from an interface or peripheral device, stopping a clock signal that is required for operation of the peripheral, and other schemes, structures, and methods as are known in the art for making the peripheral appear not to be present or accessible to the computing environment.

It will be appreciated that operations that enable or disable (or connect and disconnect) either the data stores 1502 and/or the peripherals 1514 may happen automatically under program control without human user intervention (though the enablement or disablement may be the result of a command or other action by a user of the computer system), and that the enablement and disablement may occur many times per second when required for the operation of the inventive computer system 2000. For example, where the computer has interfaces or busses that operate at 100 MegaHertz, data stores and peripherals may be switchably coupled and decoupled as needed as operations on the interface or bus are initiated, executed, and completed. For example, switching may occur at least at rates of 1 Hz, 10 Hz, 100 Hz, 1 KHz, 1 MHz, and 10 MHz, as well as at higher and lower rates and at any intermediate rate. It will also be appreciated in light of this description that the data store switch system 1504 and the I/O switch system 1510 (when present) can simultaneously switch to enable or connect, or to disable or disconnect, different CPUs to the data stores and/or peripherals.

In a typical conventional computer system 1900, the peripherals 1514 are connected directly to the CPU 1508 and are not switchably connected and disconnected (or enabled and disabled) during the operation of the computer system. It will be appreciate that the disconnection of the data stores and peripherals may also make them available to other computing environments. In conventional systems, even where some peripheral may be hot-pluggable, plugging the peripheral is a manual operation that requires human user interaction. Other differences between conventional computing systems and methods and the inventive system and method will be better appreciated in the context of the descriptions of the other embodiments of the invention described herein.

Figure 3:
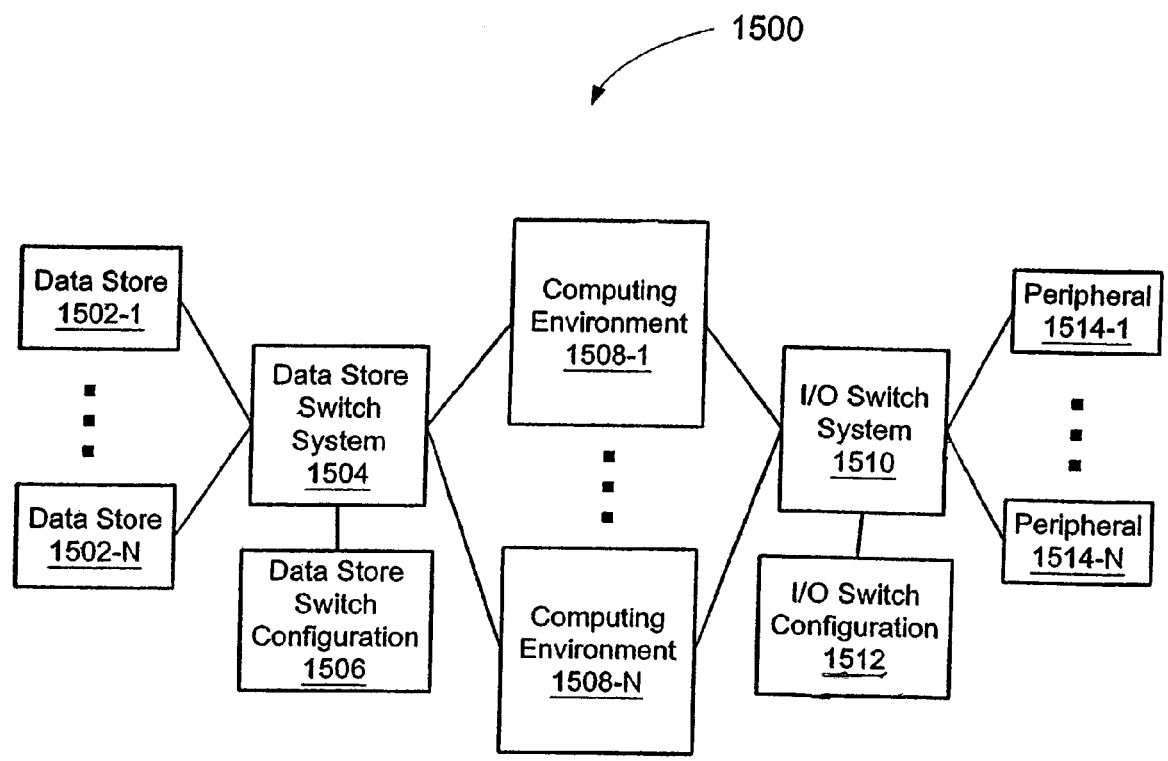
FIG. 3 illustrates a schematic diagram of an architecture and system for supporting multiple independent computing environments, according to one embodiment of the present invention.

FIG. 3 illustrates a schematic diagram of an architecture and system 1500 for supporting multiple independent computing environments 1508-1, . . . , 1508-N, including a computer system capable of supporting multiple independent computing environments that may advantageously be used to separate and isolate certain processing operations to prevent contamination or an attack that would damage user data by a malicious virus, robot, or hacking. Such a computer system 1500 may include a plurality of data stores 1502, a data store switch system 1504 (and optional data store switch configuration unit 1506), an I/O system such as one including one or a plurality of peripherals 1514 coupled to the computing environments 1508 via an optional I/O switch system and I/O switch configuration unit, and one or more computing environments 1508.

One or more data stores 1502 may be coupled with the computer system. A data store 1502 is representative of a memory area. A data store may be implemented by any type of storage media, such as magnetic hard disk drive, optical storage media, solid state memory, other forms of data storage, or a combination of these data storage media types. The data store may represent the memory area that corresponds to a disk drive and/or a portion of a one or more disk drives, and/or a combination or physical disk drives. According to one embodiment of the present invention, a data store 1502 may contain a copy of a master template. An embodiment of a method that may be used in conjunction with the inventive system is hereinafter described relative to FIG. 4.

Figure 4:
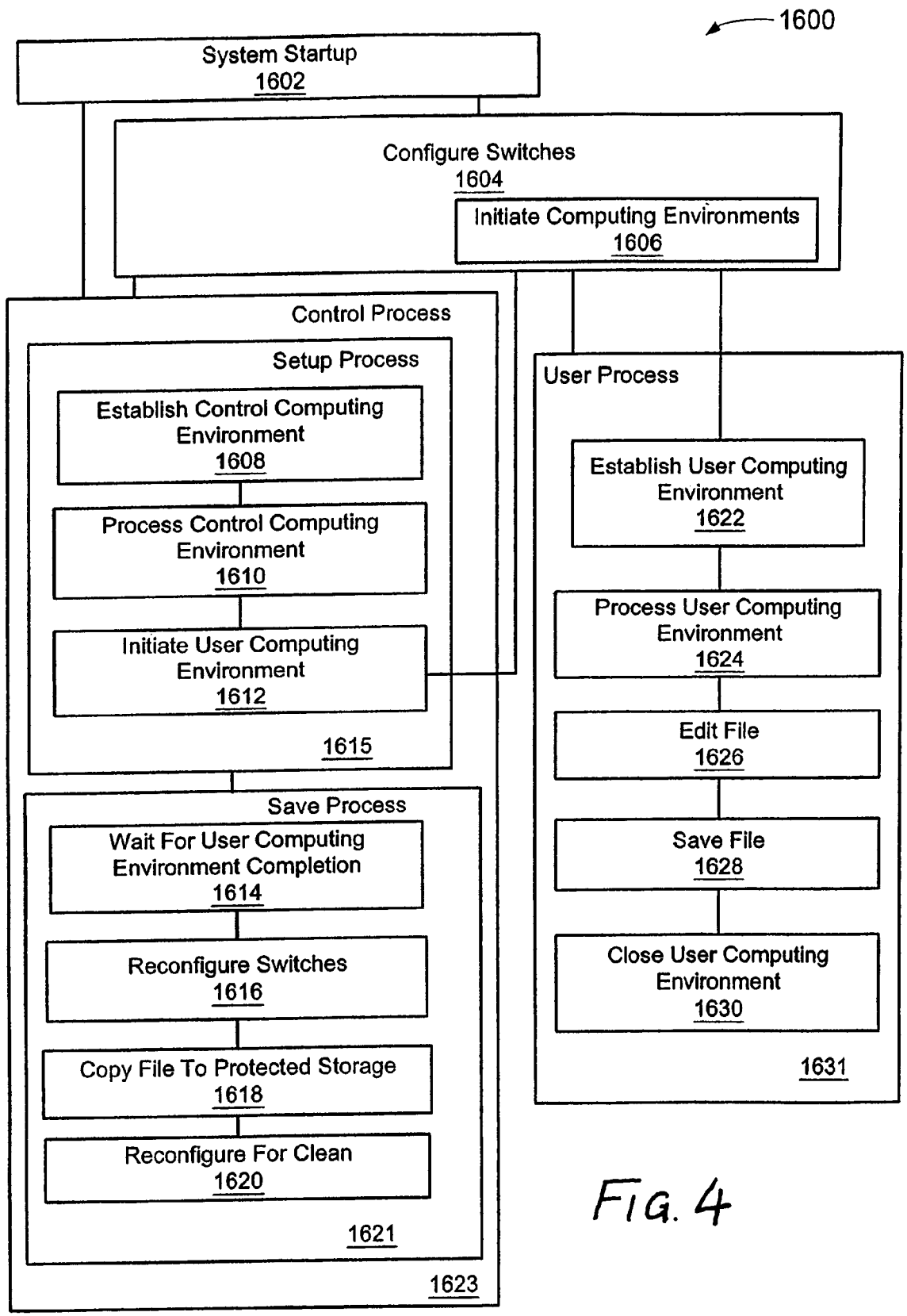
FIG. 4 illustrates a diagrammatic flow chart of an embodiment of a method for using an embodiment of the present invention.
Figure 5:
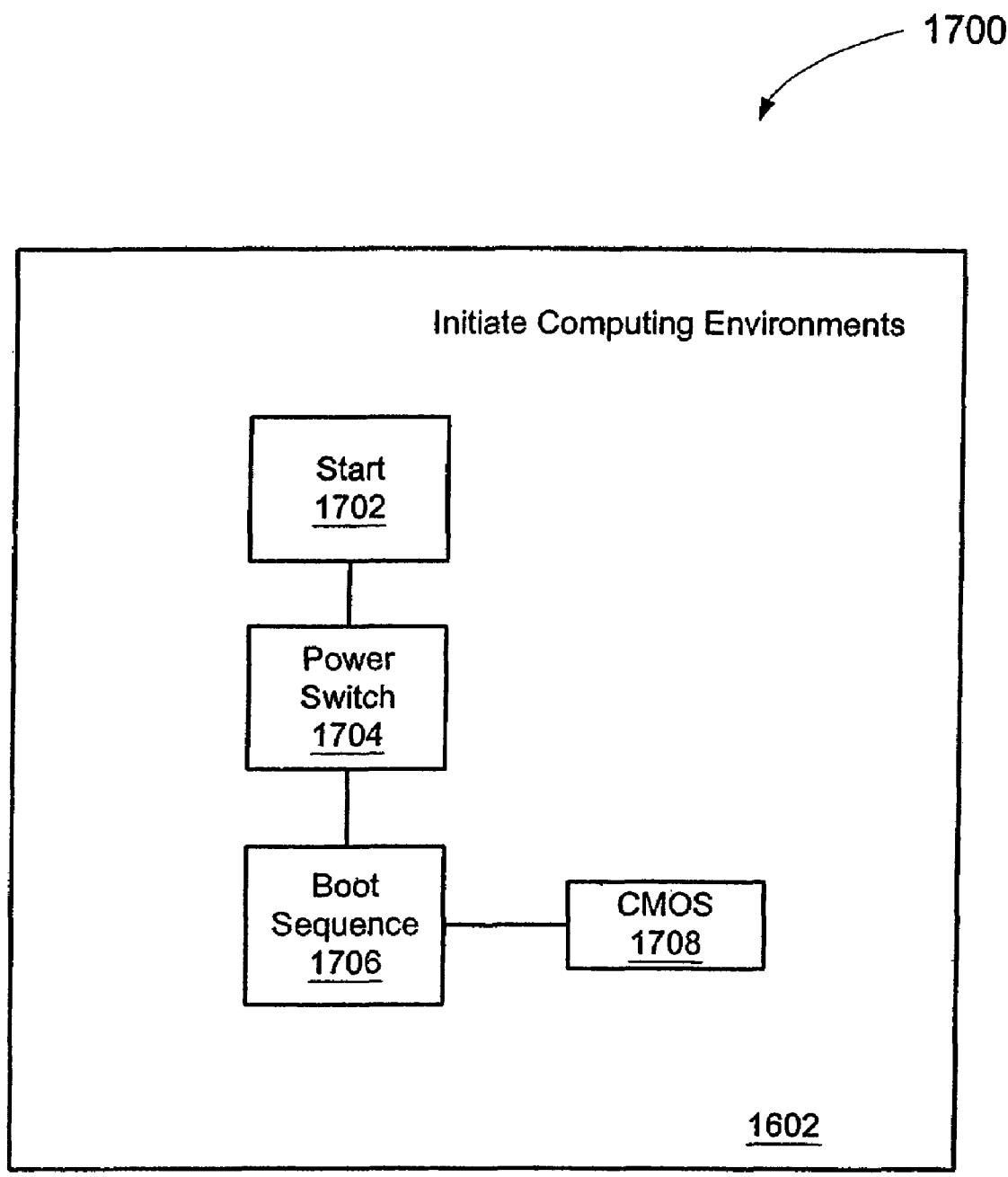
FIG. 5 illustrates a diagrammatic flow chart of an embodiment of a method for initiating computing environments.
Figure 6:
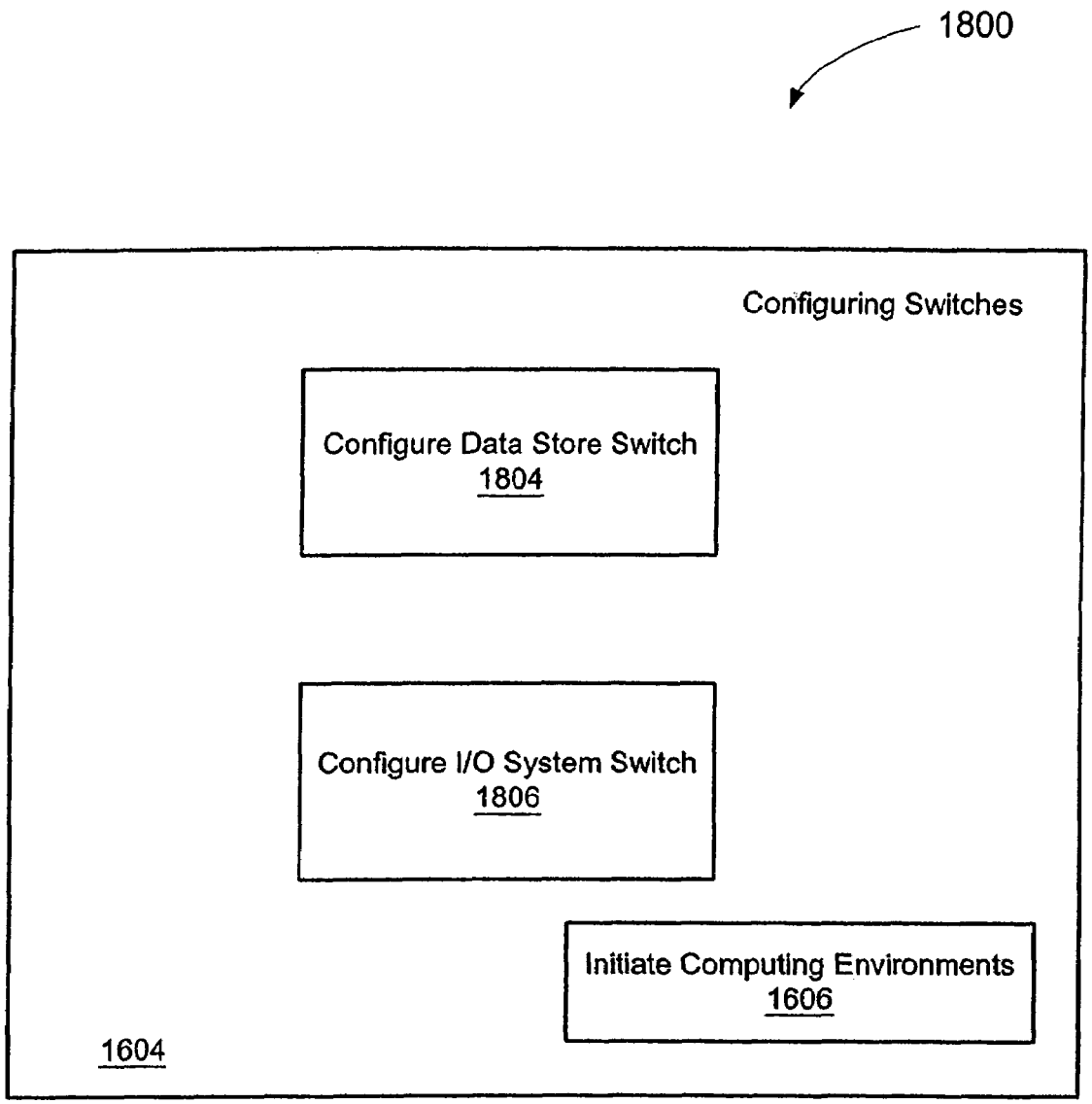
FIG. 6 illustrates a diagrammatic flow chart of an embodiment of a method for configuring one or more switch systems of computing environments.

Embodiment of Method for Using a Computer System Capable of Supporting Multiple Independent Computing Environments With reference to FIG. 4, FIG. 5, and FIG. 6, attention is now directed to a description of aspects of the methods and operation for setup and initialization and operating of exemplary embodiments of a computer system according to the invention. The exemplary methods and procedures are at least applicable to the architectures and systems illustrated in the embodiments of FIG. 2 and FIG. 3 and it will be appreciated with appropriate modification owing to the somewhat different structure to the other embodiments of the invention, such as but not limited to the embodiments illustrated and described relative to FIG. 9-17. The headings and subheadings provided in this section and throughout the specification are intended to act as a reference for the convenience of the reader where particular aspects of the invention and embodiments of the invention are described but it will be understood that aspect of the invention and embodiments of the invention are described throughout the specification, in the drawings, and in the claims and that the totality of the specification, drawings, and claims are to be considered in understanding the invention.

In one embodiment of the invention, the inventive method and the component procedures for creating or establishing computing environment(s), initializing, configuring switches, controlling processing, operating one or more computing environments, performing user and/or control operations within the computing environments, completion of user processing, saving files, and terminating processing in a computing environment may advantageously be implemented as a computer program or as a computer program product stored on tangible media and including computer program instructions for performing the methodological steps of the inventive method and system. Other embodiments may use a combination of hardware logic, firmware, and/or software to accomplish some or all of these procedures.

Aspects of the inventive method are now described. These and other aspects of the inventive method and procedures, including embodiment specific optional procedures and steps, are described in the context of specific embodiments throughout this specification.

Initial System Startup and Establishing a Computing Environment

With reference to FIG. 4, according to one embodiment of the inventive method, using multiple independent computing environments (1508-N) may include initiating a system startup (1602), configuring the I/O switch system configurations (1512) at 1604 and data store switch configurations 1506 at 1604, configuring the I/O switch system 1510 to support communication, configuring the data store switch system 1504 to support communication, performing control processing at 1623, and user processing at 1631. Typically the control processing may also include control setup processing at 1615 and control save processing at 1621.

Initiating a system startup at 1602 may include an initial boot sequence similar to known boot sequences of a computer system. The boot sequence may further include support for defining and/or modifying one or more switch configuration at 1604, such as, for example, a data store switch configuration and/or an I/O switch configuration. The initial configuration of each switching system may be initiated to establish one or more communication paths between one or more source and one or more destination according to the corresponding switch configuration 1604. Configuration of switches 1800 may also involve procedures to configure data store switch 1804 and configure I/O system switch 1806 along with a procedure to initiate computing environments as illustrated in FIG. 6. (Other embodiments of the invention provide a combined procedure for configuring the data store and I/O switches when initially configuring or when reconfiguring a computing environment.)

With further reference to FIG. 5, illustrating an embodiment of a procedure for initiating a computing environment, according to one embodiment of the present invention, the power may be turned on via a physical switch 1704 to initiate a system startup during a start operation 1702. At system startup, a CMOS memory 1708 may be used to define one or more step of the initialization process and/or boot sequence. The boot sequence 1706 or some other initialization sequence or procedure may use information coupled with the CMOS 1708 or other memory store to establish a switch system configuration and subsequently initialize the corresponding switch system to apply and/or modify the configuration to communicatively couple sources and destinations. One or more computing environments may also be initiated by the system startup at 1602.

With further reference to FIG. 4, establishing a computing environment at 1608 and 1622 may include configuring the I/O switch system configurations and data store switch configurations, configuring the I/O switch system to support communication, and configuring the data store switch system to support communication According to one embodiment, two data stores (such as, for example, data stores 1502-1, 1502-N) may be coupled with a computing environment. The first data store may include an operating system to support the processing activities of the computing environment. The second data store may include a variety of information that may be used or operated on by the computing environment. The variety of information may, for example, include specific user information and/or configuration information. Specific user information may include a document that is to be edited by a user. Configuration information may be used of a controlling computing environment to configure a data store switch configuration and/or an I/O switch configuration.

Typically a control computing environment is established at 1608 before any user computing environments are established. In some embodiments the control computing environment or equivalent may be established upon initialization. A first control computing environment may be established by the boot sequence as described above. The first data store may support an computer operating system. The second data store may represent the protected data store. After the data stores are coupled to the computing environment, then the computing environment may boot to allow a user to interact with the computing environment. User inputs may be received through the I/O switch system 1510 that is configured to communicate inputs that correspond with traits of the control computing environment (such as, for example, a region trait and an computing environment identification trait) to the control computing environment. Similarly, outputs from the control computing environment may be sent to a peripheral (such as, for example, peripheral 1514-1, . . . , 1514-N) based on the traits that correspond with the control computing environment. Accordingly, the control computing environment may boot from the first data store and have access to the protected data store. Consequently, a user may interact with the control computing environment.

Attention is now directed to an option for using optional "traits" within embodiments of the inventive architecture, system, and method. References to traits are made in other portions of the specification and though advantageously used are optional features. In one embodiment, at least one characteristic, attribute, descriptor, or trait may be used to represent each source and destination (as well as to represent characteristics of other components of the system). The trait may be representative of a physical identifier and/or a logical identifier. According to the IDE disk drive storage device example, described above, each IDE cable may be identified by a physical coupling with the physical switch. The IDE drive information, (such as, for example, master and/or slave designation, drive size, and the like) may be used to identify the drive and/or a data store coupled with the drive.

Similarly, at least one trait is used to represent each destination, such as, for example, a computing environment or CE. If the computing environment is representative of a separate physical computing environment, it may be identified by the separate physical computing characteristics, such as, for example, a unique interface coupled with the general switch. According to one embodiment of the present invention, the computing environment may be represented as a logical computing environment that may share some or all of the physical computing properties that correspond with another computing environment. A logical computing environment may be identified in a variety of ways, such as, for example, through a unique process identifier.

One or more trait may correspond with an output device, such as, for example, a computer monitor and/or computer graphics card. According to one embodiment, a trait my correspond with a display region associated with a potential viewing area of the computer monitor. Display outputs from a source may be positioned according to the display region trait, such that output from one computing environment is directed for display within the region associated with a region trait. A region trait may include a pair of x, y coordinates that define a rectangular display region associated with the potential viewing area of the computer monitor. Accordingly, a display output from a particular computing environment may be represented according to one or more trait within the corresponding region and not another region.

One or more traits may correspond with an input device. As described above, a region trait associated with the potential viewing area may be further extended to identify when inputs are communicated to a particular computing environment. Mouse movement and mouse commands may also correlate with a rectangular display region, such that inputs corresponding with the rectangular display region may be directed to the corresponding computing environment. Consequently, mouse movements within a region may be communicated with a computing environment that corresponds with the same region. The use of traits may generally be extended to any device, subsystem, or peripheral used with, associated with, or potentially available for use with on an as needed or intermittent basis with the system, and may include external devices or systems with which the inventive system may be placed in communication with.

The computing environment trait may be used to identify one or more output as having originated from the computing environment. The computing environment trait may also be used to identify one or more input and the corresponding computing environment that is a designated recipient of the input. One or more computing environment trait may be used to identify the computing environment. A computing environment trait may be used to uniquely identify the computing environment. The trait may identify a computing environment through corresponding physical attributes, logical attributes, or a combination of attributes. For example, a trait may identify a physical address of one or more computing system components. Alternatively, a trait may identify a logical address corresponding to a logical computing environment. Furthermore, one should also appreciate that a trait may identify a number of characteristics of a given computing environment, and the number and type of corresponding traits may vary in accordance with the present invention.

Traits may be used, for example, to assist in orchestrating and configuring components of the inventive system to accomplish one or a set of processing tasks. Such configuring may include configuring various switches, switching systems, and switching means to provide the desired connectivity to storage devices, I/O devices, and/or other peripherals.

Configuring Switches and Minimizing User Processing Within Control Environment

One type of computing environment capable of configuring a switch system is the control computing environment. (Other embodiments of the invention provide for combining different computing environments so that other variations to this are possible as described herein elsewhere.) The control computing environment may re-configure the switch system configurations such as the data store switch configuration and the I/O switch configuration. The configuration of the corresponding switch system may be activated in a variety of ways, such as, for example configuring and or reconfiguring communication through the switch when any change to a supporting switch configuration is made and/or determined. Further, communication between the control computing environment and a switch system and/or switch system configuration may be encrypted to help ensure that only the control computing environment is capable of configuring the switch systems.

In one embodiment, processing of user data or unknown or untrusted data within the control computing environment is disabled or not allowed to eliminate the potential for corruption of data or other information (such as for example, corruption of user data files or computer program code existing or residing in that control computing environment) corresponding to the protected data store where for example protected data or master template may be stored. According to one embodiment of the present invention, if a user initiates a user operation, such as an activity that may typically be performed by a user, (such as, for example, email, word processing, etc.) then the user operation may be processed in a separate computing environment. In embodiments of the invention that combine user interface, control operations, and/or protected storage into a single computing environment or sub-system, the configuration of this environment is such that such environment does not support processing of the user data in a manner that would permit such user data to execute in that control environment and corrupt it or the system. Processing operations such as a copy operation may be supported but such copy operation would be implemented in a manner that does not permit execution or infection of other system files by malicious code.

The control computing environment may receive a user input to initiate a user operation. A computer mouse input may be received by the I/O switch system and directed to the control computing environment according to the I/O switch system configuration. Other inputs from other peripherals may also be received by the control computing environment through the I/O switch system.

Initiating and Performing a User Operation Within a User Computing Environment

The user of a control computing environment may initiate a user operation. In one example, the user may double click on a particular icon displayed within a region of the monitor. The mouse action may be received by the control computing environment and result in the initialization at 1612 of a separate computing environment to perform user processing at 1631, such as, for example word processing.

The control computing environment may initialize the creation of a separate processing environment to perform the word processing corresponding with an existing and or new document. If this is an existing document, the control computing session may need to copy a copy of the document to a third data store for subsequent use by a user computing environment.

The control computing environment may configure the switch systems to support the user environment. The data store switch system may be configured to couple a third data store and a fourth data store with the user computing environment. The I/O switch system may be configured to couple peripherals with the user computing environment, such as, for example, a region of the display may be coupled with the user computing environment. The user computing environment may also be initiated by a signal or event triggered by the changes to one or more switch configurations. A variety of alternative approaches may also be used to initialize the user computing environment.

As part of the initialization at 1606 of the user computing environment, the file to be edited may be launched after the user computing environment is booted. According to another embodiment, an existing user computing environment may be coupled with a corresponding data store to make the file available for processing within the user computing environment. According to one embodiment of the present invention, the file or files to be edited may reside in a predefined location, such that a corresponding application may be launched to open the corresponding files and/or support the user activity.

Control processing may be performed by the controlling computing environment, and may include configuring one or more switch configurations, initialization the reconfiguration of one or more switch systems, copying information between one data store to other data stores, copying information between the protected data store and other data stores.

User processing may include interaction with the controlling computing environment and user computing environments. Any processing typically associated with function that may be performed by a user may be configured for processing in an independent user computing environment. Accordingly, the user processing activities may not directly interfere with the processing activities of the controlling computing environment and/or the processing activities of other user computing environments. Information may be made accessible to the user computing environment through the copying of computer information from one data store to another data store depending on the computer information that is necessary to support a particular user processing activity, such as, for example, a word processing activity, may require access to a user file to be edited.

Typically, the control computing process may include control setup processing at 1615 and control save processing at 1628. The control setup may be used to support the establishment of a user computing environment to be used to perform at least one processing activity, such as, for example, a word processing activity. Control save processing may include saving user information to a protected data store. Once the user processing activity is completed, then information related to the user processing activity may be saved into the protected data store at 1618 without allowing the user computing environment to perform the save function directly into the protected data store.

According to one embodiment of the present invention, the controlling computing environment may copy one or more file to a temporary data store. The controlling computing environment may update a data store switch configuration at 1616 to allow a user computing environment access to the temporary data store. According to one embodiment the controlling computing environment may verify the user computing environment has be communicatively coupled with the temporary data store. Subsequently, the controlling computing environment may wait for the processing corresponding to one or more user computing environment at 1614 to complete. While waiting for the user computing environment to complete the controlling computing environment perform the function that may correspond with general desktop functionality. The desktop functionality may correspond to the management of data stores, configuring data stores, and copying of computing information between data stores, such as, for example, to clean one or more data stores of a computer virus. Typically, the functionality corresponding to the desktop functionality is limited to reduce the possibility of corrupting the computing information stored in the protected data store.

Completion of User Processing

At the completion of a user processing activity, the controlling computing environment may be notified according to a variety of different notification approaches. According to one such approach, the user computing environment may terminate such that the termination is sensed by the corresponding switch system. The switch system may activity notify the control computing environment that the data may contain user information that should be placed in the protected data store.

In response to the completion of the user activity, the control computing environment may couple the user data store with the controlling computing environment such that the user information and/or files may be copied to the protected data store independently of any process that may have been performed by the user computing environment. Accordingly, other files stored with the protected data store would not be corrupted by the operation of the independent user computing environment.

According to one embodiment of the present invention, a file save command may be used as a triggering event that causes the controlling computing environment to store a user file to the protected data store independently of other operations that may be preformed within the context of the user computing environment.

According to one embodiment of the present invention, a temporary data store may be coupled with both a user computing environment and a controlling computing environment such that the user computing environment cannot corrupt other files coupled with the controlling computing environment. The user computing environment may save a file in a temporary data store, where the controlling computing environment may include the ability to copy the file to the protected data store and/or an intermediate data store. An intermediate data store may be subsequently used to save a corresponding file to the protected data store, such as, for example, when the user application is closed. Communication between a user computing environment may be passively implemented to help ensure the user computing environment can not corrupt files stored in a protected data store.

A user file may be saved to a temporary data store, as the result of a file save command. Subsequent to the initiation of the save command, the data store switch system may verify that the data store is coupled with a saved file. If the file was present, then a series of instructions may be executed to copy the file from temporary data store to the protected data store.

According to one embodiment of the present invention, the controlling computing environment may wait for a corresponding user computing environment to complete a user activity, such as, for example, saving the file. Subsequently, the data store switch may be configuration to uncouple the temporary data store from the user computing environment. The temporary data store may then be coupled with the controlling computing environment. The protected data is also coupled with the controlling computing environment. The file may be copied from the temporary data store to the protected data store independently of the user computing environment. The temporary data store may then be uncoupled from the controlling computing environment and recoupled with the user computing environment.

According to an alternative embodiment of the present invention, the save process may trip and/or set a flag corresponding to a switching system that is communicated to the controlling computing environment. The presence of one or more files may be verified. If the verification of files indicates the presence of files, then a series of computer instructions may be executed to copy one or more file from the temporary data store to the protected data store.

According to an alternative embodiment of the present invention, a keyboard command (such as, for example, Control-S) may be used to save a file. The I/O switch system may be configured to communicate the command sequence to both the user computing environment and the control computing environment. Consequently, the control computing environment may reconfigure the data store switch and/or the I/O switch system to support copying the file saved in the user computing environment to a protected data store.

According to an alternative embodiment of the present invention, the file could be transferred to protected data store when the user computing environment is closed and/or shutdown. One or more of the switch systems could sense the closure and/or shutdown. According to one embodiment of the present invention, a closed user computing environment may be verified by the data store switch system by an altered power state corresponding to the data store that may have been supplied by the user computing environment.

According to an alternative embodiment of the present invention, a graphical region corresponding with a computer display monitor may be used to identify when user inputs have been received that correspond with a particular computing environment. The user input may be analyzed within the I/O switch system and/or within the controlling computing environment depending on the specific implementation. According to one embodiment, a save command and/or a close command corresponding with a user computing environment may be used to identify that user information may need to be saved to a protected data store, and/or trigger the saving of computer information to a protected data store.

Closing the user computing environment may include turning a power switch off. A switching system may be capable of sensing a change in power consumption and/or interruption. If the user closes an application and a corresponding user computing environment then the controlling computing environment may sense the transition and save any corresponding user data to the protected data store. Before reconfiguring the data stores, a corresponding switch system may verify that the power to the data store containing the user data is disabled and/or in an off state. The controlling computing environment may then uncoupled the data store containing user information from the user controlling environment and copy the user information to a protected data store, as described above.

According to one embodiment of the present invention, data stores may be cleaned after they are coupled with a user computing environment. The controlling computing environment may reformat and/or clean one or more data stores after a user computing environment has used the data source. A master template data store may also be used to initialize a data store prior to coupling the data store with a user computing environment. According to another embodiment, the controlling computing environment may initiate another user computing process that is defined to support reformatting and/or cleansing one or more data stores.

Having described an architectural topology and system structure relative to the embodiment of FIG. 2 and FIG. 3 as well as initialization and operational aspects relative to the methods and procedures in FIG. 4, FIG. 5, and FIG. 6; attention is now directed to additional architectural, structural, and methodological aspects of such computing devices, information appliances, and processing machines.

FIG. 7 illustrates an embodiment of the invention 1105 including special purpose sub-systems or computing environments 1120 (e.g. 1120-1 and 1120-2) and a common controller 1130 within a computer system 1110 that is coupled with a number of peripherals 1108 including a display 1140, keyboard 1150, and mouse 1160.

It will be appreciated that although only two special purpose subsystems are shown in the diagram that the system may include a single subsystem or computing environment or any plurality of such subsystems, may include a plurality but actively use only a single special purpose subsystem, or may include a plurality of special purpose subsystems having different structural and/or operational characteristics. For example, the plurality may be 2, 3, 4, 5, 6, 7, 8, 9, 10, 11, 12, 13, 14, 15, 16, 17, 18, 19, 20, 21, 22, 23, 24, 32, 50, 64, 100, or more special purpose processing systems, or any intermediate number, subject to physical space, circuit density, heat generation, and other packaging and connectivity design issues as are known in the art.

Furthermore, in at least one embodiment, the inventive structure and method may be implemented in hardware having only a single or one subsystem or computing environment, where the computing environment or subsystem in used sequentially for different processes. In one embodiment of this single computing environment system, separate logic may be used to perform a store and restore of computing environment state so that the computing environment may be used to perform the intended processing operation and to maintain an ability to restore either an initial state or any intermediate state of a second or control process.

The structural and/or processing characteristics may include, but are not limited to special purpose subsystems having different processing capabilities (e.g. different numbers of operations per second, different amounts of processor associated memory, different processor architecture or instruction sets, or different operating systems) or different amounts of mass storage in the form of a physical or logical allocation or hard disk drive, optical storage media, or solid state memory storage.

A controller 1175 and its associated and coupled memory storage 1176 is bi-directionally coupled to selected ones or all of the plurality of special purpose subsystems (for example, coupled to special purpose subsystems 1120-1 and 1120-2). This either direction of the bi-directional coupling to or from any of the special purpose subsystems may be intermittent, and/or switchably enableable and disableable. Furthermore, the connection between controller 1175 and the memory store 1176 may be switchably enableable and disableable.

As illustrated, an optional separate logic control device 1180 may be coupled between a first and second special-purpose sub-systems 1120. Common controller 1130 is coupled with special purpose subsystem 1120-1 and with special purpose subsystem 1120-2 via interface 1170. Embodiments of the invention provide for these to be the same interface or separate interfaces. An optional interface 1170 may be coupled between special purpose subsystem 1120-1 and 1120-2, and such coupling may be intermittent or subject to being enabled or disabled when not needed or not desired. In this embodiment the interface is illustrated as being bi-directional but either unidirectional interface may be separately used, enabled, or disabled independently or as a set. Furthermore it will be appreciated that although a single line is illustrated in the drawing for clarity, the interface may be implemented as a plurality of connections or communication paths, such as but not limited to an interface multi-line bus interface. It will be appreciated that the display or display subsystem (such as a conventional display subsystem that includes a video processor card or chip-set, drivers, and display screen) receives data in the form of electrical signals from the common controller 1130, and that the common controller 1130 in turn receives its inputs from and as a result of processes executing on one or both of the special purpose subsystems 1120-1 and/or 1120-2. Hardware such as arithmetic and logic circuits, software, and firmware or a combination thereof in the display subsystem 1140, common controller 1130, and/or special purpose subsystems 1120-1 and 1120-2 generate a desired graphical display that for example reflects the user's computing environment desktop, and currently active and currently inactive windows.

The keyboard 1150 and mouse inputs 1160 are also typically unidirectional from the keyboard or mouse back to the common controller, unless some feedback in provided in the form of electronic signals or audio, mechanical, or tactile feedback. The unidirectional nature of display screen, keyboard, and mouse devices means that these are typically immune from malicious computer attack from outside the local computing environment and in at least some instances are treated as trusted or secure inputs when they occur.

FIG. 8 illustrates an alternative embodiment of the invention 1106 similar to the embodiment illustrated and described relative to FIG. 7. This alternative embodiment including special purpose sub-systems 1120 and a common controller 1130 within a computer system 1110 that is coupled with a number of peripherals 1108 including a display 1140, keyboard 1150, and mouse 1160. As illustrated, a controller system may be coupled between and among first and second special-purpose sub-systems 1120-1 and 1120-2, or as in the FIG. 7 embodiment, between any plurality of such special purpose subsystems. In this embodiment, the controller 1175 and associated coupled memory storage 1176 is implemented using one of the special purpose subsystems 1120-3 that is operated as a controller system 1177. Controller system 1177 (1120-3) is selectably coupled to one, more than one, or all of the other special purpose subsystems 1120 and to common controller 1130 via interface 1170. The structure of exemplary special purpose subsystems and the manner in which they are configured to operate as application execution and processing units, or to take on various master control and/or monitoring functions, such as to operate as a controller system 1170, is described elsewhere in this specification relative to other ones of the figures.

Attention is now directed to further embodiments of the inventive architecture, system and method for an information appliance, computer, or data processing device.

Recall that other embodiments of the inventive information appliance or computer system have been described that includes a plurality of data stores including at least one protected data store; a plurality of switching system for communicatively coupling (and decoupling) at least one source with a plurality of destinations, including a data store switch system wherein the source is a data store source, and a I/O switch system wherein the source is a peripheral source; a plurality of computing environments (sometimes referred to as shells) for performing a processing activity independently of another computing environment, coupled between the data store switch system and the I/O switch system, wherein the destination is the computing environment, and the switching system communicatively couples the source and the destination; at least one control computing environment selected from the plurality of computing environments for configuring the switch configuration according to the processing activity, communicatively coupled with the protected data store; and at least one user computing environment selected from the plurality of computing environments, wherein the processing activity is not performed on the protected data store.

In one embodiment of this information appliance and computing system each of the computing environments is further defined to be identified by at least one trait selected from a plurality of traits, the switching system communicatively couples the source and the destination according to the traits, and the at least one control computing environment is selected from the plurality of computing environments for configuring the switch configuration according to the processing activity and the traits.

The embodiment in FIG. 9 provides additional implementation and structural detail that exposes additional aspects and features that may be incorporated into devices and systems using the invention. Similarities between this system architecture and structure will be apparent with those already described relative to FIG. 2 and FIG. 3.

In this embodiment, five computing environments 2108-1 through 2108-5 are specifically shown, though any number (M) of computing environments may be provided either statically or dynamically. It will be appreciated that at least some of these computing environments 2108-1, . . . , 2108-5 appear to have somewhat different components or internal structure. In fact in some embodiments of the invention the structure and operation of the computing environments may be different (and perhaps significantly different), while in other embodiments they may be the same, and in yet still other embodiments the hardware may be the same but executing different operating system or application programs or with some other software configuration differences. In some of these computing systems, the configuration of the plurality of computing environments is dynamically configured as to hardware, firmware, software, or any combination of these.

In the system 2100 of FIG. 9, two of the computing environments 2108-4 and 2108-5 appear to have the same structural configuration (yet they may still have different software and data) and the other three computing environments 2108-1, 2108-2, and 2108-3 appear to have different structures. The structures and operation of these different computing environments will now be described and we will later show relative to FIG. 10 how these different structures and operations may optionally but advantageously implemented using a common structural computing environment module that can be dynamically customized to provide the desired effective structure and operation.

User Interface Computing Environment

Attention is first directed to User Interface Computing Environment (UICE) 2108-1 which provides a user interface operation, though not a conventional user interface, and which includes a central processing unit (CPU) 21 which generally includes a processor and processor coupled memory. The CPU may also include other chips or circuits usually referred to as the processor chip set as is known in the art. CE 2108-1 also includes storage 2121 that is switchably coupleable to the CPU 2120.

In one embodiment, it is noted that the user can manipulate a file or data set somewhat transparently independent of the actual operating of the computer system and computing environments. For example, in one embodiment, from the user's perspective he/she just drags an icon or file name or other descriptive reference from one location (such as the desktop, hard disk drive icon, or any other location) to any other location. In reality, for the desktop example, the controlling computing environment or user interface computing environment, calculates that items (such as files) dragged to/from the area corresponding to the coordinates of the desktop and create icons of the item in the desktop environment or other destination, yet the actual file may be located in protected storage.

In the embodiment illustrated the storage 2121 is shown as having two storage portions, a secondary template portion (STP) 2122 that may store all or a selected portion of the master template (see description of master template elsewhere in this specification), and an optional temporary data store portion (TDP) 2123 that may store user data files but which may be eliminated as the need to provide storage in this environment is minimal in most embodiments. Recall that in preferred embodiments of this computing environment 2108-1 there are no application programs or actual files in this environment but only references, links, or pointers to such programs or actual files. (Note that other computing environments may also have minimal temporary storage requirements as a result of their minimal processing requirements as well.) Computing environment 2108-1 is identified as the user interface computational environment (UICE) and provides the interface between a human user or operator 2129 and the computing system 2100.

Usually, the User Interface Computing Environment (UICE) 2108-1 will have a secondary template portion that includes only the operating system components and application programs (if any) that are needed to provide the computing or data processing or control capability identified to the computing environment. For example, as the UICE will primarily receive requests and commands from the human user 2129, and process these so as to send signals to the Control and Switching Computing Environment, the UICE does not need to have any word processing, photo editing, e-mail, network or internet browsing, or other common or uncommon applications programs in its stored secondary template 2122. It may also have a different operating system than other computing environments or an operating system that only includes the code, code portions, libraries, or other features of the operating system to support its responsibilities. This same principle of providing only the operating system components and application programs or application program components also applies to the other computing environment secondary templates, and though not considered to be the preferred approach, in all situations a complete copy of a master template or more than the minimum required operating system and application programs may be provided.

In other embodiments, such as in an embodiment of a computing environment generated or configured to perform image processing operations, the STP 2122 may store Microsoft Windows 2000 operating system code and Adobe Photoshop application software, and TDP 2123 may store one or more input digital image files, intermediate files that are created during execution of the Adobe Photoshop application software during processing of an image, and any output files that are generated. TDP 2123 may also store any other user or temporary system data, such as a file to undo an prior edit or data copied to a clipboard.

In an actual implementation the STP and TDP may be the same physical storage device, such as a portion of a solid state memory, magnetic disk drive, or any other storage media, or they may be different physical devices or even different types of devices. Furthermore, using some of the dynamic switching configuration methods described herein, even the STP and/or TDP may each comprise a plurality of similar or dissimilar data store types, such as for example a combination of hard disk drive storage and solid state RAM, ROM, EEPROM, or the like.

Storage 2121 is selectively and switchably coupleable to CPU 2120. In the embodiment of FIG. 9, separate first switch

2124 and second switch 2125 are show for connecting or disconnecting CPU 2120 to/from STP 2122 and TDP 2123. A simple icon for a switch is shown but it will be appreciated in light of the description provided here that the switching may be, but is usually not, a simple wire that is connected or disconnected; and, is more typically a set of conductors such as an interface buss and signal conditioning circuitry for the signals on that interface buss. Switching to connect the CPU to the storage can be accomplished by any means that enables communication between the CPU and the storage, and switching to disconnect the CPU from the storage can be accomplished by any means that disables communication between the CPU and the storage as described elsewhere in this specification. Operation of these STP-CPU and TDP-CPU switches 224, 225 (or a more generic storage 2221 to CPU switch (not separately shown) to interoperate with other structures and procedures to protect the integrity of the computer system 2100 will be described subsequently after other components of system 2100 have been described in greater detail.

A peripheral switch 2157 is provided for coupling and decoupling (or enabling and disabling) any one or combination of peripheral devices, input devices, output devices, or the like. For example, keyboard, mouse, network interfaces or NICs, microphone, speakers, headsets, floppy-disk drive (FDD), hard-disk drive (HDD), PC Cards, memory cards, CD, DVD, serial or parallel interface devices, GPS devise, USB devices, scanners, biometric readers, wireless interfaces, or any other peripheral of device may be allocated to a particular computing environment. While the switch 25157 is illustrated as being part of Desktop and User Interface Computing Environment (UICE) 2108-1, it may be thought of and implemented as a separate stand-alone switch or switch subsystem that is controlled by the CSCE or other controlling computing environment. In another embodiment it is controlled and directly couples peripherals to the other computing environments on an as needed and a permitted basis. In another embodiment, the video outputs from the computing environments may be switched and/or processed through the peripheral or input/output switching system. These peripheral switching and connection capabilities may also be combined with the other switching systems 2150 for storage devices and controlled by CSCE 2108-2 as described elsewhere in this specification.

Computer environment 2108-1 may also include additional components that are not needed or are inactivated for the particular function and operation of the computing environment at that time. Such additional components may for example include ROM, RAM. ASIC(s), and/or additional circuitry and logic elements.

Protected Storage and Read/Write Control Computing Environment

Protected Storage Computer Environment (PSCE) 2108-3 is configured to store an original or primary master template PMT 2148 in a master template protected store 2142 and a primary user data 2149 in a user data protected storage 2143. (In one embodiment the functions and operations performed by the Protected Storage Computer Environment (PSCE) 2108-3 can be combined with the functions and operations performed by the Control and Switching Computing Environment (CSCE) 2108-2 and vice versa.)

A master template take any of a variety of forms or content and may for example be a copy of data (commands, instructions, data elements, and the like) that represents an ideal state of a computer system or component of a computer system. The master template may for example, be created by copying data from an operational computer system or component of a computer system, or created in other ways. The computer system may be in an ideal state before creating a master template. An ideal state of a computer system may be represented by data that is accessible to the computer system. Where different secondary templates are to be used in different computing environments, there will be different master template portions or a single master template having portions that can be communicated separately to the other computing environments 2108. Data, within this context, may include an operating system (e.g., Linux, Unix, Windows 98, Windows 2000, and enhancements, extensions to these operating systems), applications (e.g., WordPerfect, Microsoft Office), user data (e.g., operating system preferences, background images, created documents), and component data (e.g., BIOS, PRAM, EPROM). In some embodiments, data may also or alternatively include any information accessible to the computer system, including local and remote data storage devices, and data in other databases, so long as the protective measures and procedures of the invention are observed to maintain isolation of these other data elements.

As an example, the master template for one computer system may include all of the information installed on that computer system, such as the Microsoft Windows 98 or 2000 operating system, WordPerfect application, Microsoft Word application, and documents created by the user. The information may be installed across one or multiple storage elements accessible to the computer system as described herein. Additionally, the master template may include a copy or an ideal-state version of the BIOS settings, or may provide multiple BIOS adapted to the particular computing environments.

In some embodiments, a master template may represent a snapshot of a newly purchased computer system. Such system is typically in an ideal state with an operating system and various applications pre-installed, thereby allowing a user to begin utilizing the computer system. For a particular user, the master template may represent an ideal state of a computer system, including, for example, an operating system, applications, and user customizations. As an example, a user customization may include the users prior selection of a picture or ".jpg" image for a desktop background, such as a picture of the users pet.

Optionally, the master template may be created from a first computer system and subsequently may be used as a master template for a different computer system. The first computer system might be the manufacturers computer system. An ideal state of the first computer is thereby transferred to a second computer system or any number of computer systems. In some embodiments the master template may be created in one computing environment and then with appropriate safeguards migrated and stored as the master template. Embodiments of the invention advantageously provide support for updating, patching, reinstalling, and replacing elements of the master template so that these operations can be performed with substantially or the same user interaction, and substantially the same or the same operational result.

The master template may be alternatively be created by a process of selective copying. For example, depending on the particular OS in use, a program may interrogate the registry, determine what entries are associated with a particular program or application, and then choose to selectively copy only those files and entries associated with the particular program or application to the master template.

In the illustrated embodiment of a protected storage and read/write computing environment of FIG. 9 there is no connection to any processor that would permit execution of the binary information stored in the master template protected storage 2142 or the user data protected storage 2143. This isolation can be accomplished either by physically not providing any such processing capability such as a CPU, or by disabling or disconnecting such CPU from the protected storage. This disabling or disconnecting may be accomplished using the switches described elsewhere in the specification or by other known means for preventing the binary data in protected storage, whether computer program code instructions or data.

In this embodiment, the only processing operation permitted on binary data stored in the master template protected store 2142 or the user data protected store 2143 is a read operation, and in some instances (described elsewhere herein) a write operation. These may conveniently referred to as copy operations.

The inventive architecture, system, methods, procedures and computer program product protects computers, computing devices, information appliances, PDAs, cell phones and other processor incorporating devices from hacking, viruses, cyber-terrorism, and from potential damage or intrusion such as spy software, keystroke recorders, and damage from hacking, viruses, worms, Trojan horses, and similar threats and vulnerabilities, independent of whether they were maliciously or unintentionally introduced or exposed.

In one embodiment, the master template protected store 2142 stores one or more sets of computer program code instructions that can be communicated to other computing environments and which is sufficient to provide operational capability for the designated operation of that computing environment. In some embodiments, there is a single set of computer program code that permits any operation that may be requested by the user or by the system itself to be performed, and each computing environment receives a copy of this complete master template, at a time and in the manner described herein. In other embodiments, the master template protected store 2142 stores multiple different sets and only the set that provides the operations required of the particular computing environment are set to it. This may generally result in smaller and faster copy operations and lower individual and overall storage requirements. Where erasure is required additional time savings are realized for smaller template sizes. The different secondary templates may be stored or generated as needed, however, storing the secondary templates in a ready to copy form exposes a lower security risk and greater operational speed.

In one embodiment, the user data protected store 2143 stores original versions (or copies) of the user data or files referred to as protected user data 2149. For example, such user data may include or be selected from the set of data or files such as an e-mail, an e-mail attachment of any type, a word processing document, a TIFF image file, a JPEG image file, an MP3 file, a computer program, stored versions of an operating system or operating system file, stored versions of a computer program application program, a device driver, and any other type of computer data, file, or collection of "0" and/or "1" bits. Interestingly, the user data protected store may even knowingly or unknowingly store a computer virus or a file containing a computer virus, computer robot or bot, spyware, or other malicious computer program code. The presence and storage alone of such virus, bot, spyware, or other malicious computer program code in protected storage 2142, 2143 poses no threat and cannot by its presence in storage there cause harm. In one embodiment, the processor is decoupled from the protected storage when no access is required to data or computer program code stored there; however, in other embodiments the processor may remain coupled to the protected storage as the processor is not configured to be able to execute the data or computer program files there and cannot cause damage to the protected storage, the processor, or the protected storage computing environment 2108-3. In some embodiments, the decision to maintain a continuous communication path between protected storage and the processor within the protected storage computing environment 2108-3 may depend upon the set of functions or operations that are supported in that protected storage computing environment. These same considerations may apply in embodiments of the invention that combine the protected storage computing environment with other computing environments such as with a user interface computing environment and control and switching computing environment (but not with user data isolated computing environment).

As suggested, in one embodiment the protected storage computing environment 2108-3 may include a decoupled or disabled processor such as a CPU 2140 which can be switched to couple via switches 2144, 2145 to the protected store for initial loading or reloading of the master template or user data, compilation, virus scanning or detection, testing, or other special operations. Enabling the connection between the CPU and the protected storage would normally only be allowed where precautions were taken to prevent corruption of other data within the protected storage should a virus or other malicious computer program code be present and execute. In embodiments where only a "dumb copy" operation is supported between a protected storage, a CPU or other processor may remain coupled with or connected to the protected storage. A dumb copy is a copy that does not open or expose the file to be copied to computer program code that could result in contamination or infection. Dumb copy may be a bit-by-bit, byte-by-byte or other copy or bit replication operations, such as for example that may be implemented by a fixed hardware logic circuit or ASIC or where precautions are taken by using software or firmware, or by using a combination of hardware and software/firmware.

The protected storage computing environment 2108-3 may be coupled with other of the computing environments 2208-1, 2208-2, 2208-4, and 2208-5 (or any of the M computing environments) through a plurality of switches 2250, such as copy from MTPS enable switch 2251, copy from UDPS enable switch 2252, and write to UDPS 2253.

In one embodiment, a command from MTPS enable switch (SW1) 2251 enables (or disables) the appropriate master template portion to be accessed (or denied access) and read or copied to the secondary template portion of a computing environment, such as for example to STP 2122 of computing environment 2108-1. The copy from UDPS enable switch (SW2) 2252 enables (or disables) the appropriate user data or file to be accessed (or denied access) and read or copied to the user data storage portion of a computing environment, such as for example to TDP 2123 of computing environment 2108-1. Usually, only one file or the set of files needed to perform an operation will be copied, rather than the entire set of user data in the protected storage 2143. Other embodiments may copy the entire user data set but this is inefficient and may typically serve no obvious beneficial purpose, except in certain instances during maintenance, diagnostic, and/or repair operations.

The write to UDPS (SW3) 2253 enables (or disables) the appropriate user data or file to be accessed (or denied access) and read or copied from one of the other computing environments where it has been created or modified and written back to UDPS 2143 of computing environment 2108-3. In some embodiments a single switch provides bi-directional capability to read from and write to the user data protected storage 2143 so that only one switch (or set of switches) is required.

It will also be observed that as the secondary template that is copied and sent from MTPS 2142 is not usually modified, there is typically no need to write it back to MTPS 2142. Therefore the copying from MTPS to STP may be unidirectional. Separate bi-directional handshakes and control signals or levels may be used as a signaling protocol for such events as request to copy, ready to copy, copy complete, data received, and the like. Parity or other error detection and error correction may be implemented as known in the art and consistent with aspects and features of the invention to verify that the transfer occurred without error, though this is optional.

In one embodiment, modification of a master template (or other template that may be used in the system) may involve: (i) copying or loading it into one of the user isolated computing environments; then (ii) updating it using any necessary operating system, application program, complier, debugging, linking, or other programming procedures as are known in the art; and (iii) copying it back and saving it as the new master template in protected storage. The copied and saved version of the master template may replace the original or may be saved as a new file or as an updated version.

These switches or sets of switches may be a component or set of components of computing environment 2108-3, a separate component or set of components outside of computing environment 2108-3, or some combination thereof. In one embodiment, the switches are provided in hardware logic circuits, in another they are implemented by a micro-controller having a very limited set processing capabilities so that sophisticated multi-component and multi-signal switching schemes may be implemented but that do not enable malicious code to execute. In still another embodiment, the switching is implemented as an Application Specific Integrated Circuit (ASIC). In yet another embodiment, the switching is performed under the control of a micro-processor that has a very limited instruction set installed as its secondary template portion (STP) so that it cannot execute or permit execution of malicious code.

As described elsewhere herein, the protected storage can be implemented on or within any type or combinations of type or storage device or memory. In one embodiment, a provision is made for external and portable protected storage, so that for example a user could have their protected storage on a credit card size storage device (such as a flash memory card, USB memory device, Sony MemoryStick, PC Card based memory, or any other form of storage) and just plug it in at any one of a supporting computer or device.

In one embodiment, the architecture, system, and method provide an optional hidden and protected backup storage system.

Control & Switching Computing Environment

Attention is now directed to control and switching computing environment (CSCE) 2108-2 which is responsible (with contribution from user interface computing environment 2108-1) for controlling and coordinating the operations of the other computing environments of the system 2100. In somewhat simplified terms, the switches connect a source to a destination. In some embodiments of the system 2100, data store switch system traits are supported and such traits may further support configuring a communication path between the selected source and destination. Note that in at least some embodiments, CSCE or other controlling computing environment has the ability to switch and couple any peripheral to any computing environment.

Computing environment 2108-2 receives inputs from user interface computing environment (UICE) 2108-1 and operates the switches 2250 (for example switch sets. SW1 2251, SW2 2252, and SW3 2253) of the protected storage computing environment (PSCE) 2108-3, as well as to interact with each other computing environment 2108 to operate switches to couple or decouple (enable or disable) connections or communications between processors (e.g. a CPU) and storage (e.g. a STP and TDP) of the computing environment. The switch control may be more or less direct, such as through an electrical connection and signal or voltage level or set of electrical signals or levels; indirect through a processor, CPU, ASIC, or other circuit or logic elements within the computing environment that receive the signals from the control and switching computing environment 2108-2; or as a combination of these direct and indirect architectures and methods.

As illustrated in the embodiment of the control and switching computing environment 2108-2, it includes a system switching controller unit 2138 which receives commands from UICE 2108-1 responsive to user inputs and commands or system activities and events, taking account the then current status and configuration of the computing system 2100 including available computer resources. In some embodiments, scheduling and component prioritization and utilization arbitration are also provided by the system switch controller 2138. Switch configuration and status as well as other information and data may be stored in a switch configuration information storage 2139 which is operatively coupled via one or more busses, interfaces, or communication circuits, with the system switch controller 2139.

In this embodiment, CSCE 2108-2 receives one, and more usually, a set of signals 2180 from UICE 2108-1. These signals may generally be sufficient to communicate a user request input to UICE 2108-1 so that the other elements of the computer system 2100 can be configured to perform the request. For example, the user may mouse click on a Microsoft Word icon on the UICE desktop expecting launch or an instance of Microsoft Word word-processing program. While UICE 2108-1 may be configured to present to the external human user 2129 that UICE 2108-1 and its components (e.g. CPU 2120 and storage 2121), have installed Windows 2000 operating system, Microsoft Word 2000, and the document that the user desires to edit; in fact it may not have them, and may merely provide for a pointer, link, alias, or other reference to these operating system, application program, and user data files, among other computing system elements.

In particular, the Microsoft operating system and Microsoft Word application program would be present as MT 2148 and stored within protected storage MTPS 2142 of PSCE 2108-3. The user's word processing document if in existence and not to be newly created would be stored and retrievable from protected storage UDPS 2149.

Having described some of the structural and operational characteristics of a Control and Switching Computing Environment (CSCE) also referred to as the system "brain", now set forth are a partial list of some of the functions and operations in which some particular embodiments of the CSCE participates. Not all of these functions need be performed by the CSCE (or the CCE in later described embodiments). It will be appreciated that the particular functions and operations will depend on the implementation of the computing system as a whole, the CSCE (or CCE), and the other computing environments.

In some embodiments of the invention, the CSCE loads its own operating system (OS) upon start-up (or reset) which after loading will orchestrate (some or all of) enabled or supported operations or functions by the rest of the system. The inventive architecture, system, and method are operating system neutral, and any of the known operating systems may be used or adapted for use with the invention. Different operating systems may even be used in different computing environments of the system so that if desired the computing system can operate different operating systems and the suite of application programs suited to those operating systems. In some embodiments of the invention, the operating system may be dynamically determined an loaded when for example a user isolated computing environment is designated to perform a particular processing function or operation, so long as the computing system hardware can support that operating system and the intended operation.

Some embodiments of the invention will utilize different operating systems for different computing environments and such operating systems may be predetermined or dynamically determined as a function of time or task according to the needs of the system, the user selected processing task, the nature of the data, or according to other factors. For example, any of the Microsoft Windows operating systems known or announced (e.g. Windows 98, Windows NT, Windows 2000, Windows XP, and improvements, enhancements and extensions thereof), Linux, Unix, Apple Operating Systems, various disk operating systems (DOS), or other specialized or proprietary operating systems or control programs may be used in the various computing environments so long as they support the intended operation and devices for that operation.

In some, but not necessarily all embodiments of the invention, the CSCE operating system or application programs (or a combination of these two) may be responsible for controlling or orchestrating (some or all of) the following functions, which is only an exemplary partial list: (i) data storage device (DSD) connection switching; (ii) send commands to computing environments to launch computer program applications (or hardwired operations when applicable) with optional verification of receipt of the commands and/or completion of the commanded operation; (iii) track coordinates of clickable windows and/or cursor; (iv) execute repairs and detection, cleaning, and/or destruction of viruses or other malicious code; (v) conducts and control switching, reformatting, erasing, copying of templates and/or master template, resetting, rebooting, and other operations as described; (vi) generate and display "isolated global taskbar" or the equivalent user accessible user interaction tool (alternatively this taskbar or tool may be generated by the desktop and interface computing environment). These or other embodiments may also optionally provide for any one or more of: (vii) an "open" dialog screen; (viii) a "save" dialog screen; (ix) conduct switching of network communication (for example, see the description of the "netlock" operation); (x) receive secure signals from communication environments; (xi) track the order in which communication environments are created and/or current communication environment order or priority; (xii) conduct switching of mouse and keyboard to and among the different computing environments; (xiii) conduct switching of other input/output or peripheral devices to and among the different computing environments; (xiv) coordinate the email access and processing; and/or other combinations of these functions.

In one embodiment, the CSCE may also have responsibility for controlling, coordinating, and/or processing video signals associated with processing activities in the various computing environments (including processing activities in the CSCE itself), or a separate computing environment or video processing unit or logic circuit or other means may be used for this purpose. When a separate video processor or controller is used, the CSCE may generally be responsible for coordinating and orchestrating it's operation with the other system components, but in some embodiments the video processor or controller may participate with the CSCE or other controlling of the system.

It will be appreciated in light of the description provided here that while separation of user computing environments (where potentially contaminated files may be opened and executed) from control computing environments is provided; the description of user interface, control and switching, protected storage, video processor and other operations and functions that operate on known clean data or computer programs as separate computing environments is somewhat artificial and primarily for the purpose of description here. It is noted that embodiments of the invention provides for separation of various non-user data control or processing environments as well as embodiments where these control functions are combined. While some combinations are specifically described by way of example, it is understood that any other combination of the different control or administrative functions and operations are supported consistent with the other principles of the invention.

It will also be appreciated that different levels or degrees of isolation may be required or allowed for different computing or processing environments or a different times within a particular or set of processing or computing environments. For example, in the situation where an unknown file or data set is to be opened and processed in an computing environment where a virus or hacker code may be exposed to a processor and code that might execute such code, the isolation between that file or data set and the "outside world" is absolute and contained within the user isolated computing environment. This absolute isolation is between the particular user computing environment and other user computing environments and control environments.

In other situations, the degree or level of isolation may be limited so that no harm, or a permitted degree of harm set my the computer or user, can be tolerated. This represents a kind of user or administrator override and may be set certain policies and rules that permit a more permissive use of the system. For example, if the computing system is normally used within a corporate computing environment on an Intranet with current anti-viral software, firewalls, and other protection provided by a corporate information technology (IT) department, it may be permissible to disable special processing of email because of the filtering already provided. Other embodiments, may provide for override all isolation when the network or computing environment generally can be trusted. While this permissive override may not be referred in all embodiments, it does show the flexibility afforded by the inventive architecture, system, and method. Therefore, it will be appreciated that different levels or degrees of isolation may be provided and the invention is not to be construed to be limited to architectures, systems, methods, or procedures that are intolerant of some degree of non-isolation or override.

Operations performed relative to processing video (digital or analog) from the different computing environments may include, by way of example but not limitation: merge or otherwise combine or format outputs from the several computing environments (e.g. signals 2187-1, . . . , 2187-5, . . . 2187-N) for display on a monitor or display device. While any of a variety of initial or default conditions may be implemented, in one embodiment the default setting upon booting is to have the computing environment video signals disable or turned off because there should be no activity in any of the unallocated computing environments until some system or user initiated activity has been commanded. Alternatively, the CSCE (or other entity) may turn on/off or enable/disable the video signals.

In some embodiments, the "processing" of video outputs from the computing environments is accomplished to present a "layering" effect on, for example, a single monitor. For example, the most recently active computing environment may always be moved to the "top" (or "front") layer or otherwise be treated according to predetermined rules or policies. The CSCE may contribute to controlling and orchestrating this process if it is not itself directly responsible for it. For example, the CSCE may send one or more commands to the video controller to help determine which "layer" to put in "front", and how to merge the video outputs from the various computing environments. The CSCE has this information because it maintains databases of information pertaining to layers, active computing environments, unallocated or inactive computing environments, window locations, mouse or pointing device cursor coordinates and locations and switching, for other purposes such as determining mouse clicks.

In some embodiments, such as in embodiments where a video graphics card or video subsystem may continuously send a signal (even for a "black" or empty screen), the video signal may be turned "on/off" or "enabled/disabled" at the video controller. Alternatively, the CSCE or video controller may simply be directed to "ignore" this signal from a particular computing environment when that computing environment is unallocated or inactive. In other words, the computing environment video cards (whether separate cards or chips or integrated with a processor or other logic circuits) could optionally always be "pumping out" a video signal, or the CSCE or other video controller could only have them output such video signal when they become active processing environments. This would beneficially decrease power consumption and heat generation, and may have the effect of increasing longevity of the system and its components. The CSCE may also send out a signal to the video controller or processor (when present) to tell it what video inputs from the computing environments to process, and what information for each video input that is to be used and what information may be ignored. For example, portions of a desktop for each computing environment may be suppressed when it is duplicative or does not represent actual activity in the computing environment.

Isolated Processing Unit Computing Environments

System 2100 also includes one or a plurality of other unallocated isolated processing unit (IPU) computing environments (IPUCE) or shells, such as CE 2108-4 and CE 2108-5 which in the embodiment of FIG. 9 each include CPUs (2160, 2170), storage (2161, 2171) including STP (2162, 2172) and TDP (2163, 2173), interfaces (2169, 2179), and switches (2164, 2165, 2174, 2175) for coupling or decoupling (enabling or disabling communication) between the storage and the CPU.

This combination of operating system, application program, user data file, and computing hardware to support and interoperate with the operating system, application program, and user data, under control of the CSCE 2108-2 via UICE 2108-1 enable protected and isolated processing of the selected Microsoft Word program with the user data.

Operationally, UICE sends commands including any necessary data via signals 2180 to CSCE 2108-2. CSCE receives these signals taking account of current assignments of system 2100 resources and any other rules or policies to system configuration, selects an appropriate computing environment, such as computing environment 2108-4. Other embodiments of the invention provide for dynamic allocation of separate elements (such as CPU and storage) which can be assembled as a computing element even if not physically connected at the time of manufacture of the computer and even in not adjacently located within the computer system 2100 hardware.

Once the computing environment 2108-4 has been selected by CSCE 2108-2 and more particularly by rules policies or algorithms within system switch controller (SSC) 2138, the SSC sends one or more signals 2186-4 to CE 2108-4 to communicate that it has been allocated to perform a Microsoft Word processing program under the Microsoft Windows 2000 operating system with an identified user document file. CE 2108-4 optionally acknowledges that it has received the communication under some handshake or other communication protocol, even a communication protocol as simple as a single logic voltage level. Therefore the signal(s) 2186-4 may be unidirectional or bi-directional. SSC 2138 also communicates one or more switch control signals 2181 to switches 2250. For example, switch control signals 2181-1, 2181-2, and 2181-3 to configure one or more of switches SW1, SW2, and SW3 to permit the desired storage access. These same switches may optionally but advantageously acknowledge the communications from SSC and provide status back to indicate that the switches are in the proper configuration (open or closed, or enabled/disabled, for example) for the intended cooperation. Likewise, the switches 2250 may send a ready to send data type communication to the target destination such as the STP 2162 and/or TDP 2162 of storage 2161, and these may optionally though desireably indicate a ready to receive data type status signal back to the switches 2250.

Specifically in this word processing example, SW1 2251 would enable a communication of all or a selected part of the master template that includes Microsoft Widows 2000 operating system and at least Microsoft Word application program. Note that in some embodiments, the operating system and application program may alternatively be separately provided from separate sources. In yet other embodiments, the operating system may be provided within the computing environment so that it need not be communicated each time, either stored on the STP 2162 so that it need not be communicated each time or within a coupled ROM, or in other ways. Note, however, that where the STP is not cleared after use, there is a possibility of contamination if the STP may have been written to by malicious code, but may not be a problem if retrieved from a read only memory or ROM.

Either in parallel (where the communications paths provided are sufficient to support multiple access paths) or sequentially (where the communications paths 2187 may not be sufficient to support multiple access paths) SW1 2251 is configured to connect the MTPS 2142 to STP 2162 where upon STP 2162 receives the required computer program code. Likewise, SW2 2252 is configured to provide a communications path so that the identified user document file from UDPS 2143 can be copied to TDP 2163. Recall that the hardware/firmware/software accessible during the copy operations are not sufficient to permit execution of any malicious code. For example, a hardware only copy circuit adapted to copy bits from a source to a destination cannot be corrupted by viral, hacker, or other malicious code and may be made to only grab (or read) bits from a source and replicate (or write) bits to a destination. Buffers between source and destination may optionally be used as may filters or limiters. Software and/or programmable hardware may also be used for the copy operation but the capabilities of such copy means are advantageously protected from contamination of unintended modification that may compromise system or computing environment immunity. Desirably, the copy operation is only a copy of binary bits or sets of bits without any other interpretation; however, though desirable the invention need not be constrained by this condition and other protective measures may be utilized to prevent possible execution of malicious code.

In one embodiment, the process of copying data may be "dumb" or restricted so that data being copied cannot execute and thus the data on that data storage device cannot be damaged by malicious code. For example, to move or copy data it can be encoded, or an ASIC with limited functionality can be utilized, or direct memory transfer or any other method of moving or copying data can be used that does not allow data that may contain some executable code of bit-sequences to execute. Optionally, copying could be orchestrated by a control system that could address or have access to the isolated working system(s) and isolated or protected storage system(s).

Selecting a file to open in the storage system could initiate a process whereby a file is copied from the storage system or source (such as UDPS) to the working computer environment (such as the STP 2166 of IPUCE 2108-4) and after terminating the connection with the UDPS 2143 through the switch 2250, the data or file may be opened and permitted exposure to the CPU 2160. Saving a file in the working computing environment could initiate a process whereby the file is copied to the storage system. Quitting a file in the working computing environment could initiate a process whereby the new or updated file or data set is copied or written to the destination storage system (such as the UDPS 2143) and deleted (and desirably physically erased) in the source storage system (such as the TDP 2161). The term "copy" or "copies" or "copying" may be used in its broadest sense, and may include but not be limited to an algorithm, snapshot, compressed data, bit-by-bit, encryption, encoding, and the like.

The isolated computing environment may also send or otherwise communicate flags or other information or indicators 2191 identifying a status or state of the isolated computing environment (or some component within the ICE) to the control and Switching computing environment 2108-2. Such status or state may include and one or a combination of a ready for operation status, a complete processing status, a file ready for copy or save status, a reset status, and/or any other data or information that the controlling environment would need or be able to utilize.

The isolated computing environment may also send or otherwise communicate window x-y coordinates and optionally window dimensions 2192 for use by the controlling environment 2108-2 and/or the desktop and user interface computing environment 2108-1 (or by a separate video graphics processor or video display unit controlled by CSCE) to combine or merge the different computing environment windows to a single display device (if such single display is desired). The communication lines or links 2191, 2192 may also be shared over a single line or link. Furthermore, various traits as described elsewhere in this specification may be communicated over these communication lines or links.

These as well as any other communication path, communication link, or signal lines may be fitted with filters or limiters as described elsewhere in this specification to limit the type, sequence, number, or volume of information, data, binary bits, or the like to further reduce the possibility of infection between one computing environment and another. These filters and limiters are described in greater detail relative to other embodiments of the invention.

Once an appropriate combination of operating system, application program, and user data is present in CE 2108-4, the word processing operation can commence. The file can be saved either within the TDP 2163 until exiting the word processing program, or by using intermediate saves with write operations to UDPS 2143 via an appropriately configured switch SW3 2253.

Advantageously, when any read or write operations are made between MTDS 2142 or UDPS 2143 and a storage (such as STP 2164 or TDP 2163), the CPU 2160 is decoupled from the storage or disabled, so that MTDS 2142 or UDPS 2143 are never exposed to CPU 2160 in a way that might permit malicious code to be executed and contaminate the protected storage MTDS 2142 or UDPS 2143.

Once the word processing is complete and the new or edited file is written back to protected storage, a signal or state change or "flag" or other indication, and following instructions from the CSCE, the contents of STP 2162 and TDP 2163 are cleared and erased. This clearing or erasure should be an actual erase, such as by over writing the storage media, or formatting master boot records, or partition tables, so that any malicious code that might have been present in the last data set stored there is not spread to other files or data sets. This differs from most conventional systems which merely update a directory to remove the reference to the deleted file rather than actual erasure. The desirability of erasing the storage space used and preferably the entire accessible storage space makes fast solid state memory more desirable than slower electromechanical storage such as hard disc drive storage. It also makes minimizing the amount of storage space that is accessible in a computing environment a consideration. The ability to dynamically allocate storage space in some embodiments of different size, to add to the accessible memory as the process generates a need for more memory, and to configure both solid state memory and larger and less expensive hard disk drive storage.

Reflection on the description provided to this point will reveal a situation in which a user data that was present in protected storage UDPS 2143 that was contaminated with a virus was moved with the virus to CE 2108-4 and then exposed to CPU 2160 and an operating system that is capable of supporting execution of the viral code within the computing environment.

If the virus does not execute for whatever reason, such as the virus having an execution date condition that is not satisfied while exposed to the CPU and operating system, it will be returned with the file that contains it or even as a new and independent file to protected storage UDPS 2143. In this case neither the particular computing environment 2108-4 nor the system 2100 as a whole suffered any harm by virtue of having been exposed to the virus (or other malicious code).

On the other hand, if the virus (or other malicious code) does execute while within computing environment 2108-4 and explodes or otherwise contaminates CPU, CPU associated RAM or other memory, and/or the STP 2162 or TDP 2163 storage, its harmful effect is limited to the isolated computing environment 2108-4. No path is provided in this architecture and processing system and method to permit the virus or other malicious code to escape to the rest of the system 2100 and cause the system 2100 or data within the protected storage MTPS 2142 or UDPS 2143. Even if the virally contaminated file is returned to protected storage MTPS 2142 or UDPS 2143, the other operating system, application program, or other data files cannot be contaminated because the PSCE 2108-3 does not include a processor that can execute any bit pattern contained in the data, they are just "0" and "1" bits and have no programmatic meaning within that computing environment. Again recall that the only operation the bits are exposed to is a dumb copy operation by hardware, software, and/or firmware that can only perform the copy and little if anything more. Where a virus executes while in a computing environment 2108 other than the PSCE, it may damage or destroy the copy of the file, the original data or file in PSCE is still in tact. Clearly, it may be desirable once a virus or other malicious code is discovered to exist, to take steps to clean or remove the virus and replace the virally contaminated version with a cleaned version. Such viral or malicious code detection and/or cleaning operation may in fact be one of the processes that is performed in the isolated computing environment on a copy of the file before the cleaned copy of the file is returned to protected storage. Saving files as versions rather than over writing is an alternative storage option.

Having now described the structural and operational features that enable safe processing of even maliciously infected files, we now digress to describe the graphical or display screen presentation to the human user 2129. For purposes of description, we assume that the computer system 2100 is providing a windowed system where each process may be displayed in a separate window of a display subsystem. Operating systems such as Microsoft Windows, Unix, Linux, Apple MacIntosh OS, and other common operating support such windowing and structures and techniques for presenting a display of each process in separate windows of a common display. Therefore each computing environment provides a display screen or graphical output 2187 that is processed by a video display subsystem 2192 to present a windowed multi-taking processing system just like that of conventional multi-tasking windowed systems. Input/output such as via keyboard 2190 and mouse 2191 or other pointing device is similarly provided by allocating the keyboard button presses and mouse to an active process or window. The user 2129, or in some situations, the system itself identifies a selected or active window, and the keyboard and mouse actions are tracked and identified to the selected process. Essentially the keyboard, mouse or pointing device, and display process are allocated to the active window or other identified active process through the UICE 2108-1 and the CSCE 2108-2.

In analogous manner, each other device or peripheral within the computer system, including any one or more of the floppy-disk drive, USB ports and any USB peripheral devices attached through these ports, modems, network interface circuits or cards (NIC), modems, SCSI interfaces and devices, PC Card slots and interfaces and devices connected via these interfaces, CD readers/writers, DVD readers/writers, scanners, printers, audio systems, microphone, speakers, serial or parallel interfaces and devices coupled with these interfaces, cameras, recorders, and without limitation any other input/output or peripheral device or system that can be coupled to the computer or information appliance.

Recall that as this inventive architecture, system, and method can be applied to a diverse set of devices and appliances that have a processor, such as but not limited to computers, PDAs, mobile communication devices and telephones, cellular telephones, digital cameras, video recording devices, navigation and mapping systems, automobile engine management systems, aircraft navigation and guidance systems, network servers and routers, digital and HDTV television receivers and processors, security systems, and all manner of other electronic devices and systems that incorporate a processor and are susceptible to viral, spyware, bots, computer hackers, and other malicious code. Recall also that even non-intentional problems associated with execution of computer code that has not been completely debugged may be handled in a manner that prevents any failure in the code from having harmful effect on the rest of the system if it is tested, debugged, or otherwise utilized in one of the isolated computer environments. Therefore the set of possible input devices, output devices, input/output devices, and peripherals is a broad and diverse set and is not limited to those devices normally associated with conventional desktop or mobile notebook computing. A peripheral device may for example be an automobile or aircraft controlled or monitored by a information system made according to the principles of this invention.

It will also be appreciated in light of the description provided here, that although these different peripherals are visible in the desktop environment of the UICE 2108-1, the process that would actually access these peripherals (beyond the keyboard and mouse) would derive from one of the other isolated processing environments requiring access to the peripheral or more preferably would spawn or initiate a new process to interact with the peripheral and via the data stored and shared via the UDPS, provide data or otherwise interact with the peripheral device or subsystem.

Figure 10C:
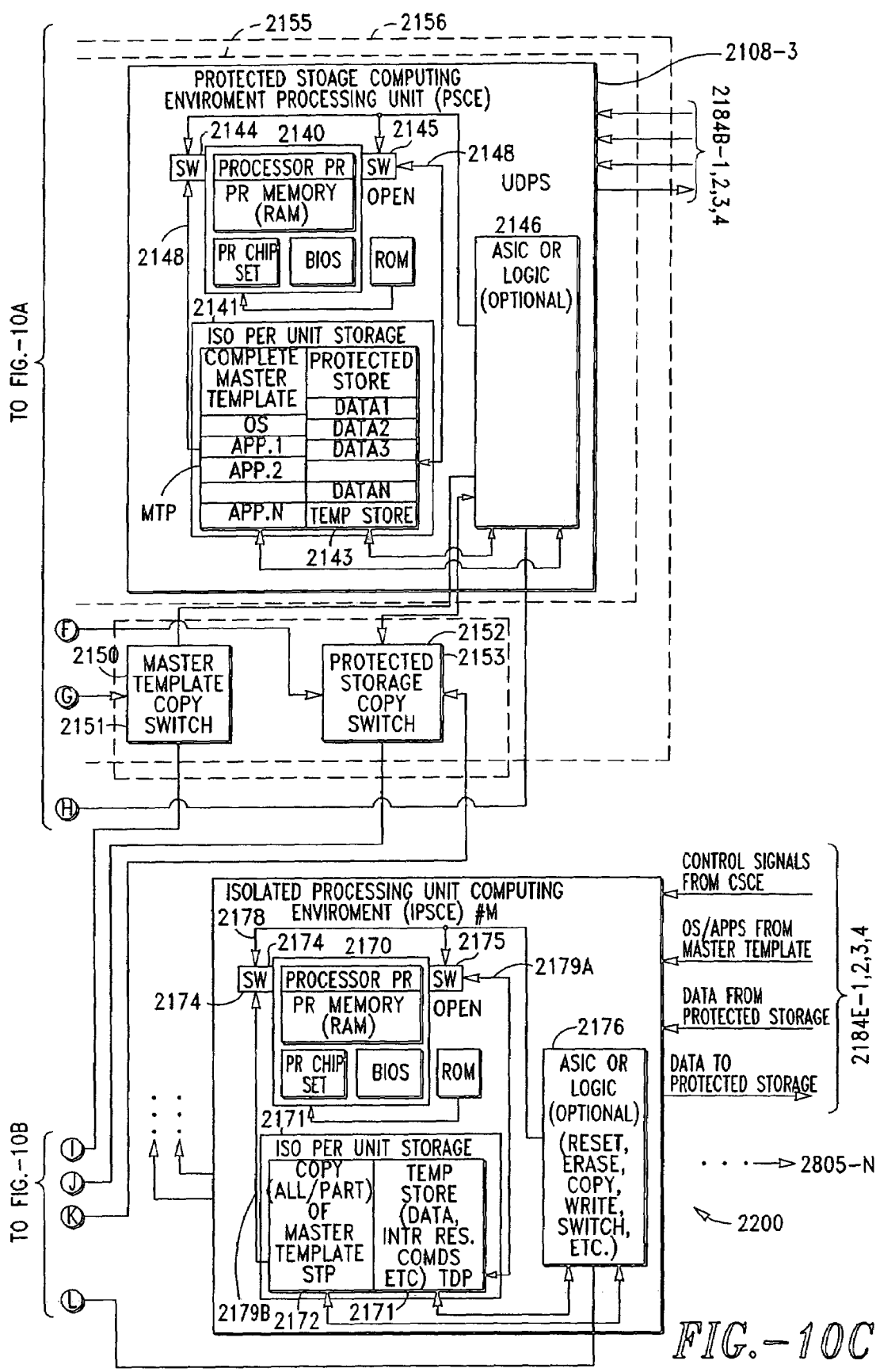
FIG. 10 illustrates an embodiment of yet another alternative embodiment of the inventive architecture and system.

Alternative Embodiment Combining Functions of User Interface, Control & Switching, and Protected Storage Computing Environments Having described the structure and operations performed by the Control & User Interface Computing Environment 2108-1, Switching Computing Environment 2108-2, and Protected Storage and Read/Write Computing Environment 2108-3, it may be appreciated in light of the description that these operations may be combined and performed in a single computing environment that is separate from an Isolated User Computing Environment such as Isolated Computing Environments 2108-4 or 2108-5 in the embodiment of FIG. 10. In particular such an architecture and system configuration may provide at least some of the advantages of the inventive system and method so long as the combined block has no capability to execute user data and/or untrusted code and can only perform such operations as moving or copying data or programs to an isolated computing environment for execution but cannot open or execute them. In some embodiments, only trusted access is permitted to the controlling entity (whether distributed amongst a plurality of computing environments or combined). For example, depending upon rules and policies that may be implemented, a keyboard and mouse input may be treated as a trusted input or interaction medium. Standard security procedures for turning or powering on, logging into a computer or device, such as password or biometrics may be implemented to give some additional assurance that the user accessing the system and therefore possibly inputting keyboard and mouse inputs is authorized and trusted.

Alternative Embodiment With Dynamically Configurable System Components

Having described one particular multiple computing environment embodiment that sets forth some of the operational, control, interface and protection features, we now direct attention to another alternative in which a common set of computing environment are used to implement the particular set of User Interface computing environment (UICE), Control and Switching Computing Environment (CSCE), protected storage computing environment (PSCE) and the other computing environments (CE) which may be configured to perform word processing, email, internet browsing, or other operations.

With reference to FIG. 10, there is shown an alternative embodiment of a system 2200 for processing data or other information. As with the just described embodiment 2100 of FIG. 9, this system and architecture 2200 along with the methods and procedures for configuring the system and for operating the system are applicable to a broad and diverse set of electronic devices which would conventionally include one or more processors, controllers, microprocessors, central processing units (CPU), ASICs, logic circuits, or other means for processing electronic data.

For convenience of description, certain elements such as the various computing environments, peripherals, switches, and control lines and other signals have been drawn with the same or similar topology and given the same reference numbers. It will be appreciated that there are many ways of implementing the principles of the invention and that each of these descriptions and drawings (for example, the embodiments and system configurations of FIG. 9 and FIG. 10) are exemplary of a way of implementing and operating a system according to the invention.

System 2200 includes Desktop and User Interface Computing Environment (UICE) 2108-1 processing unit, Control and Switching Computing Environment (2108-2) processing unit, Protected Storage Computing Environment 2108-3 processing unit, and two Isolation Processing Unit Computing Environments IPUCE #1 2108-4 and IPUCE #2 2108-5. In the embodiment of FIG. 9, typical processing unit elements were illustrated and described to accomplish the desired operation of the particular processing unit 2108-1, . . . , 2108-5, . . . , 2108-N. In the embodiment of FIG. 10, there is illustrated a common component configuration which permits a plurality of modular units to be dynamically configured to perform the functions and operations required for initialization, configuration, and operation of the system 2200. While identical or common components are not required, there are advantages to using a common set of components which are or may be customized with software, firmware, and user or system data according to the intended operation and processing function.

Given this general correspondence between the computing environments 2108-1 through 2108-5 this description highlights the implementation differences (if any) and/or details.

With reference to the Desktop and User Interface Computing Environment (UICE) 2108-1 processing unit, it is noted that the CPU 2120 is now show to include a processor (PR) and Processor coupled memory in the form of RAM, and an optional processor chip set and BIOS as are known in the art. It will be appreciated than any form of processor, microprocessor, central processing unit, ASIC, or other logic circuit capable of performing the tasks of the Control and Switching Computing Environment (2108-2) may be utilized. Note that even for an overall system 2200 which may be required to perform sophisticated and complex data processing and which may require a CPU capable of executing complex computer program instructions, the "processor" of the Desktop and User Interface Computing Environment (UICE) 2108-1 processing unit may be a much simpler component.

Similar statements can be made about the Control and Switching Computing Environment (2108-2) processing unit and Protected Storage Computing Environment 2108-3 processing unit. In fact, in some embodiments, the function of the Control and Switching Computing Environment (2108-2) processing unit and Protected Storage Computing Environment 2108-3 processing unit can be performed by a single unit 2155, and in even other embodiments even the function and operation of the master template copy switch 2151 and the protected storage copy switch 2152 can be combined into a single unit 2156.

The UICE 2108-1 is also illustrated as receiving control signals 2184A from CSCE (2184A-1), operating system (OS) and/or application programs from the protected master template (2184A-2), and data from protected storage (2184A-3). It also may send data back to protected storage (2184A-4). These four sets of signals are illustrated as being present in each of the computing environments though to preserve clarity, not all of the connecting lines are shown. For some processing operations, not all signal lines may be required or used.

The embodiment also shows the allocation function that interoperates with the UICE, CSCE, and PSCE to couple and make available the different peripherals to the processing operations that may require them. it is noted that in at least one embodiment, the Keyboard and mouse (or other pointing or selection device, such as for example a touch screen) is available to the other computing environments and directly to the desktop and user interface computing environment processing unit.

An optional ASIC 2126 is also illustrated. In at least some embodiments, the CPU or an ASIC (or other logic circuit) may be sufficient to provide the required interface processing capability, but both are illustrated here in the interest of modularity and generality.

With reference to the Control and Switching Computing Environment 2108-2 processing unit, the control and switching computing environment processing unit (CSCE) is shown as a similar set of components though it will be appreciated that the contents of the storage for programs and data will typically be different according to the functions and operations provided by the computing environment. In the case of the CSCE 2108-2, the temporary storage 2149 is indicated as including I/O switch configuration data 2158 and data transfer or read/write switch configuration data 2159.

With reference to the Protected Storage Computing Environment 2108-3 processing unit, again a similar set of components are shown. The protected store for the master template and user data is illustrated as being part of this unit. A complete copy of the master template including operating system and application program elements, or in some embodiments, copies of multiple templates appropriate to different processing operations that might be requested by a user, were stored in this protected storage 2141. User and possibly system files are stored in the protected data storage UDPS 2143. Recall that the protected storage is not to be exposed to a processor or CPU capable of executing the user's data (or code instructions) that might be present, so that if a processor or CPU is provided, either it would be disabled or disconnected from the protected memory. Thus, switches 2144 and 2145 would be open or other steps taken to disable the processor, such as removing the operating voltage or withholding an operating clock signal required for operation. This may generally mean that a circuit such as an ASIC or other logic or processing circuit 2146 perhaps in cooperation with software and/or firmware would provide the processing capability to read and write to the protected memories and to preserve their isolation. It is noted that the master template copy switch and the protected storage copy switch or switches may be part of the PSCE or separate but in communication with it. The copy (read and/or write) can for example be performed by the ASIC or other logic or processing circuit 2146.

With reference to the two Isolation Processing Unit Computing Environments IPUCE #1 2108-4 and IPUCE #2 2108-5 also maintain this modular computing environment structure. These processing units may advantageously include a CPU that supports the full spectrum of processing operations that they might be asked to perform. such as word processing, connection with and interaction with the Internet, cellular telephone call reception and voice coding and decoding, and the like.

Embodiment With Combined Control & User Isolated Computing Environments

Figure 11:
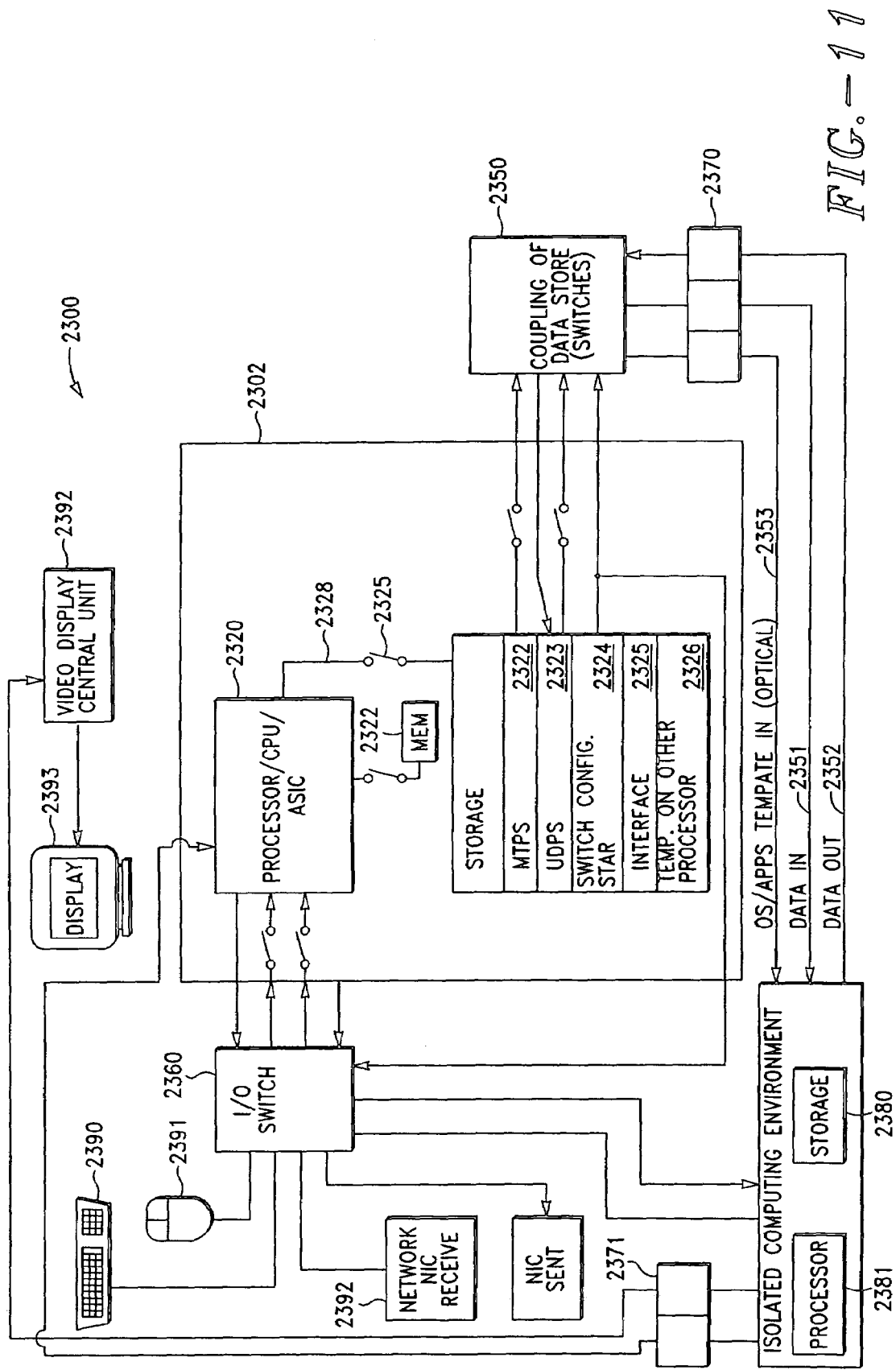
FIG. 11 illustrates an additional embodiment of the invention having a combined control computing environment and at least one isolated computing environment for user processing.

With reference to FIG. 11, there is illustrated another alternative embodiment 2300 of the invention having a combined control computing environment and one (or more than one) isolated computing environment for user processing. The combined control computing environment orchestrates the operation of the computing system 2300 to provide any required operations of the afore described Control & User Interface Computing Environment 2108-1, Switching Computing Environment 2108-2, and Protected Storage and Read/Write Computing Environment 2108-3 of the earlier described embodiment. Isolated computing environment 2304-1 may take the form described in earlier embodiments and is not described in greater detail here, except that such ICE will normally include processing logic 2381 for executing the set of instructions intended of the ICE and storage 2380 switchably coupleable and decoupleable with the processing logic.

It will be appreciated that in any given embodiment some features and procedural steps will be optional and not required depending upon the capabilities desired to be implemented and/or the degree of security or immunity desired. Some features and procedures may be dynamically implemented according to a current status of the system and an intended computing environment operation, among other factors. In any case, it will be appreciated in light of the description that these control operations are performed in a separate (physically or temporally) computing environment from an Isolated User Computing Environment.

In this embodiment, a control processing or computing environment (CCE) 2302 is established and operates to create, control, and terminate one or more isolated computing environments 2304-N. In this embodiment, only one isolated computing environment 2304-1 is illustrated for simplicity of illustration, however, it any number of such isolated computing environments (ICE) or subsystems for user processing may be fixedly or dynamically configured and operated.

CCE 2302 includes some logic circuitry or other logic means 2320 (such as for example, a controller, micro-controller, processor, microprocessor, central processing unit or CPU, ASIC, programmable logic, or the like) and storage 2321 switchable coupleable and decoupleable to the logic means 2320 via one or more communication links 2328 through one or more switches or switching means 2325. Switch or switching means 2325 may generally include a plurality of switches or switching elements appropriate to couple or decouple the signals and data of interest between the storage 2321 and the logic means 2320 and may for example include signal conditioning circuitry as known in the art for coupling and decoupling storage with logic circuitry such as with a CPU.

Depending upon the type of logic circuitry or logic means 2320, separate memory such as in the form of a ROM, RAM, registers, or the like may be provided and may also be switchably connectable or disconnectable (enableable or disableable) through one or more memory switches 2326. Switching may selectively enable either direction (e.g. for read or write) or bi-directional communication or signaling to/from the memory or storage. In the context of this and the other embodiments of the invention, switch, switches, switching means, and the like terms are to be given their broadest possible interpretation and any device, logic, hardware, or software that either physically or logically couples or decouples a signal from one location to another location or that enables or disables an ability to communicate a signal between such locations independent of whether an electrical or optical connection exists or may exist.

The type and capability of the logic circuitry or logic means 2320 may generally depend on the logic or other processing operations to be performed by CCE 2302. For example, the processing operations to be performed as control for a general purpose notebook computer may be different than the control operations to be performed for a cellular telephone or an electronic camera, at least in part because the operations to be performed by these different devices may generally differ.

In some embodiments the various switches (for example switches 2350, 2360, 2325, 2326) and switching capability for coupling or decoupling communication or signals with storage 2321, memory 2322, I/O or peripheral devices (such as for example, keyboard 2390, mouse 2391, or network NIC 2392), and/or storage device(s) 2380 in the isolated computing environments 2304, may be provided by logic circuitry 2320 or in other embodiments separate switching logic may be provided and that is controlled all or in part by the logic circuitry or logic means 2320. In this or other embodiments, a single switch or set of switches or multiple separate switches or sets of switches may be utilized to accomplish the desired switching operations.

While at least some of the switches may be controlled at least in part by CCE 2320, it will be appreciated that the communication links, signal lines, busses, or other connections may not pass through or be accessible by elements of the CCE 2320. For example, it at least one embodiment, network NIC 2392 may be switchably connected or disconnected with an isolated computing environment 2304-1, but the data or bits received from the NIC do not pass through CCE 2320 but only pass to the ICE 2304-1 so as to prevent exposure to a malicious agent. In at least some embodiments, separate modem and/or Network NIC devices and communication paths are provided for receiving data from the external environment and for sending data to the external environment so as to provide an additional measure of immunity and system protection. When received data is separated from transmitted data, this also provides a measure of protection for other computers or devices external to system 2300 because the chances of sending data that is contaminate or contains a malicious agent is reduced or eliminated.

Storage 2321 may be implemented as a single physical device, as a combination of two or more physical devices, or as one or portions of one or more physical devices. It may for example be any type of magnetic, optical, solid-state, or other memory types as are known in the art or may be developed.

In the illustrated embodiment, storage 2321 provides master template protected storage (MTPS) 2322, user data protected storage (UDPS) 2323, switch configuration information or data 2324 for the storage device and/or for I/O devices, as well as an operational portion of whatever operating system elements and application programs 2325 as may be needed to support the device interface with the user and control. Temporary working storage 2326 may also optionally be provided. In some embodiments, the type of storage for these different stored components may advantageously be selected to facilitate fast read and/or write access and/or erasure of components from the storage. In particular, solid-state or semiconductor memory may facility fast access and ready and reliable erasure of a user computing environment after that user computing environment session has completed and is being terminated or closed.

One or more isolated computing environments 2304-1, ..., 2304-N may be fixedly or dynamically configured. When the number of processors or other hardware may tend to limit the number of physically (e.g. hardware) distinct sessions, additional isolated computing environments may optionally be implemented using temporal separation but intermittently accessing the hardware as described elsewhere in this specification.

Each ICE 2304 is advantageously switchably coupleable to storage (or portions of storage) 2321 via a CCE controlled switch 2350 so that access for read and/or write with protected storage (e.g. MTPS 2322 and/or UDPS 2323) or other portions of storage 2321 as may be required. In the embodiment illustrated in FIG. 11, there is shown a Data-In 2351, a Data-Out 2352, and a OS-Apps (Operating System and Application Programs) 2352 communication or signals path. In different embodiments, a single communication or signals path (such as a wire, multi-wire bus, or optical link) may be used with path allocation and arbitration circuitry or other logic means to allocate and control communication over such single link. Furthermore, in embodiments that may provide for any operating system and/or application programs within the ICE 2304 there is no need to provide a path between storage 2380 in the ICE 2304 and storage 2321 within the CCE.

This or these same communication links 2351, 2352, 2353 may also be used to communicate any flags 2355, window x-y coordinates 2356, ICE video output 2357, and/or to couple peripheral devices on a dedicated or temporally shared intermittent basis. Alternatively separate dedicated or shared communication links may be utilized for these signals or data.

Flags 2355 provide status and/or command and control between CCE 2320 and ICE 2304 such as but not limited to flags or status for: "ICE ready to read Master Template", "ICE ready to read user protected data", "ICE processing completed", "ICE Processing Error encountered", "request to save file to protected store", "file save operation complete", "CCE command to reset and erase ICE", and other status and commands to support the desired operation. In some embodiments of the invention, the nature and complexity of the flags are deliberately kept simple and short (such as a few bits or bytes) so as to reduce or eliminate any possibility that the status or command and control flags might inadvertently communicate or transmit a virus or malicious code between the ICE and the CCE.

As already described relative to other embodiments, a video or graphics related output signal or data 2357 is provided from each ICE so that a rendition or representation of the ICE user environment (e.g. a word processing screen) can be captured and displayed on a display screen or other deice 2393. In most embodiments, a single display device will be utilized but the invention does not preclude multiple display devices or indeed multiple video or graphics processors. When operating in a windowing environment, window x-y or line-sample coordinates and window sizes or other descriptors for the ICE window are communicated to CCE (or to a video processor 2392) controlled by CCE so that multiple windows from different ICEs can be combined with each other and optionally but desireably with a desktop (e.g. Microsoft 2000 desktop) display generated by CCE 2302 or the video display unit 2393.

Filters or limiters that limit the type and/or amount of data communicated over the communication path may optionally but advantageously be provided between the CCE Storage 2321 and the ICE 2304, and/or between the ICE 2304 and the video display control unit 2392, and/or between the ICE 2304 and the CCE relative to flags, window coordinates and dimensions, or other status or command and control signals.

For example, a storage access limiter 2370 may be provided between storage 2321 and ICE storage 2380. In analogous manner, a limiter 2371 may be placed in the video signal path between each ICE and the CCE or video display control unit 2392.

In one embodiment, the limiter is combined with the switches (such as with switches 2350, 2360), while in other embodiments they are separate. Such filter or limiter function may also be implemented either as part of CCE logic or as part of ICE logic or as part of both. Redundancy with some validation between ICE and CCE elements may optionally be provided. In general, in this embodiment, any of these filtering or limiting operations will involve a comparison between an attempted communication and a permitted set of communications. If the attempted communication is permitted it will be allowed to pass, and if not permitted will not be allowed to pass. Various error messages and/or notifications may optionally but desireably be implemented according to rules or policies.

Figure 12:
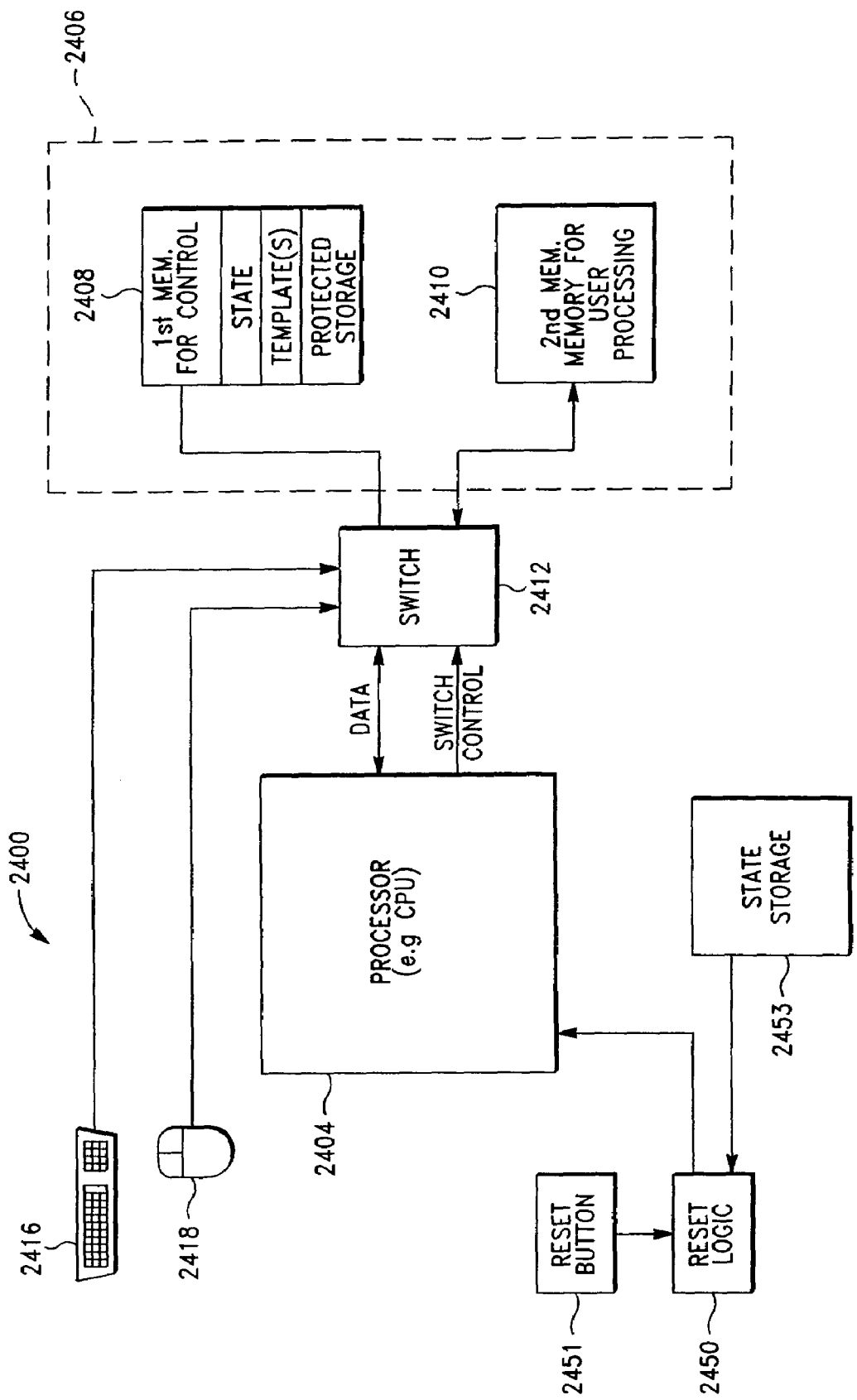
FIG. 12 illustrates an embodiment of the inventive architecture and system that provides a single physical computing environment but that can support a plurality of logical or virtual computing environments using intermittent access and temporally separated allocation of components and access.

Embodiment Having Single Temporally Isolated Computing Environment for Control and Isolated User Processing With reference to FIG. 12, there is illustrated an embodiment that provides only a single physical computing environment but that can support a plurality of logical or virtual computing environments using intermittent access and temporal or time separated access. This single physical computing environment can support the control of the CCE as described in the previous embodiment and the isolated processing computing environment of one of more user processing sessions. This type of intermitted access with temporal separation may also be utilized with other embodiments of the invention that have or can support multiple physical computing environments.

In the illustrated embodiment, a single processing logic element 2404 (such as for example, a processor, microprocessor, ASIC, controller, microcontroller, or other logic or processing circuitry means) may be communicatively coupled to storage 2406 though a switch or switching means 2412.

In one embodiment, storage 2406 may be physically or logically divided or partitioned to provide separation between an isolated computing environment storage 2410 and a control computing environment 2408 where for example, the master template and protected user data as well as any operating system and application program elements may be stored without fear of contamination. The isolated computing environment storage is provided for storing working copies of the user data, operating system and application program components, temporary storage, and the like during ICE execution. Sharing a common physical storage is advantageously accompanied by control routines or procedures that assure that execution of a malicious code while operating in the ICE mode cannot reach or contaminate or infect protected data storage, such as damage to the master template, original protected user data file, or the like.

Other embodiments of the invention utilize separate physical storage or memories and provide for memory address or access control so that inadvertent access such as access that may result from a hackers attempt to over-flow an allocated memory address range cannot occur. Providing separate physical storage for control and protected storage versus isolating computing environment working storage provides an additional level of isolation as it offers the possibility of complete physical isolation where communication lines or busses do not interconnect the two (or they can be physically or logically switched out or disabled) to that no contamination can occur. The use of different physical storage also optionally but advantageously offers the advantages of using different storage devices, such as ROM or EEPROM for portions of the control environment storage, RAM for the ICE, and magnetic storage such as a hard disk drive for any large data or program storage. Either the ICE or CCE requirements for storage may also make use of a plurality of different physical memories and/or memory types.

Switch or switching means 2412 may also be responsible for coupling and decoupling input/output or other peripheral devices (such as but not limited to keyboard 2418 and mouse 2418) with a selected one of the computing environments. In embodiments where the same processing hardware is temporally allocated to the different computing environments, the switching may still be desirable to enable or disable the use of an input, output, or other peripheral device so that a desired degree of isolation is maintained. For example, although keyboard and mouse may be coupled with both control and isolated computing environment performing a word processing application, a network NIC card may only be coupled with or enabled to an isolated computing environment performing an internet network browsing session but not to the control environment.

In one embodiment, a reset mode is provided to initiate a boot or restart to a known initial state. The operating system and application programs for this initial state are stored in non-volatile memory in the control environment storage 2408 in a form where the reset and reload can be readily accomplished. In one embodiment, it is stored in fast ROM. This mode permits the isolated computing environment to perform its processing operation normally culminating in the generation of one or more new files or data sets or the generation of a revised or new version or versions of such files or data sets. In one embodiment, the reset mode procedure looks at a particular region of storage for any such new or revised files or data sets and copies them to protected storage to either add to or replace the files in the protected storage according to defined rules or policies. As the reset mode procedure merely copies the files or data sets but does not open or execute them, protection is maintained as in the other embodiments as described.

In another embodiment, the temporal isolation with shared hardware resources is accomplished by storing and restoring intermediate logic or processor 2402 state. By storing processor 2404 and any other required state information or data, one process such as a control process can be interrupted, a new isolated computing process can be conducted (completely or in part) with its processor state being stored and restored when interrupted and resumed, and so forth. Multiple processing sessions can be conducted in this way using a minimal physical hardware set. Structures and methods for storing and restoring processor state so that multiple processes can be handled during a defined time period and sometimes referred to as concurrent processing or multi-tasking. We do not go into the details of these known structures or methods here. However, in the context of the invention, we note that registers or other memory store may be provided for separately storing processor 2404 state for a plurality of computing environments so that isolation is maintained and malicious code is unable to circumvent the isolation. Thus, each individual temporally allocated segment of the processor (such as for example chips, RAM, storage, or some combination of these or other components or segments) may be reset or repaired individually, as some grouping, or collectively.

In one embodiment, separate reset logic 2450 is coupled with a hardware or software reset button or switch 2451 that provides the required isolated control for transitioning between the different computing environments and for storing state when one process is interrupted and for restoring that state when the process is resumed. The reset logic may be hard-wired logic or may be programmable and generates the signals to processor 2404 and switch 2412 to effect store and restore of state and the setting of other device 2400 parameters and conditions. Control lines to the device components are provided between state storage registers 2453, storage 2406, processor 2404, switch 2412, as required. In some embodiments, a process in an isolated computing environment may be conducted to completion so that in general only the control process may be suspended and then resumed. In other embodiments, any process may be suspended and resumed.

It will be appreciated that some embodiments of this type will find particular applicability to so called thin computing devices, such as cellular telephones, and the like. In such devices, there may be a need to handle the voice processing associated with the telephone conversation, receiving an electronic image or picture, or looking up a calendar item or telephone number, during a single use of the device. By facilitating multiple processes of this type using minimal hardware, the cost of the device can be reduced and small size maintained, as well as achieving a reduction in its power consumption and heat generation.

Figure 13:
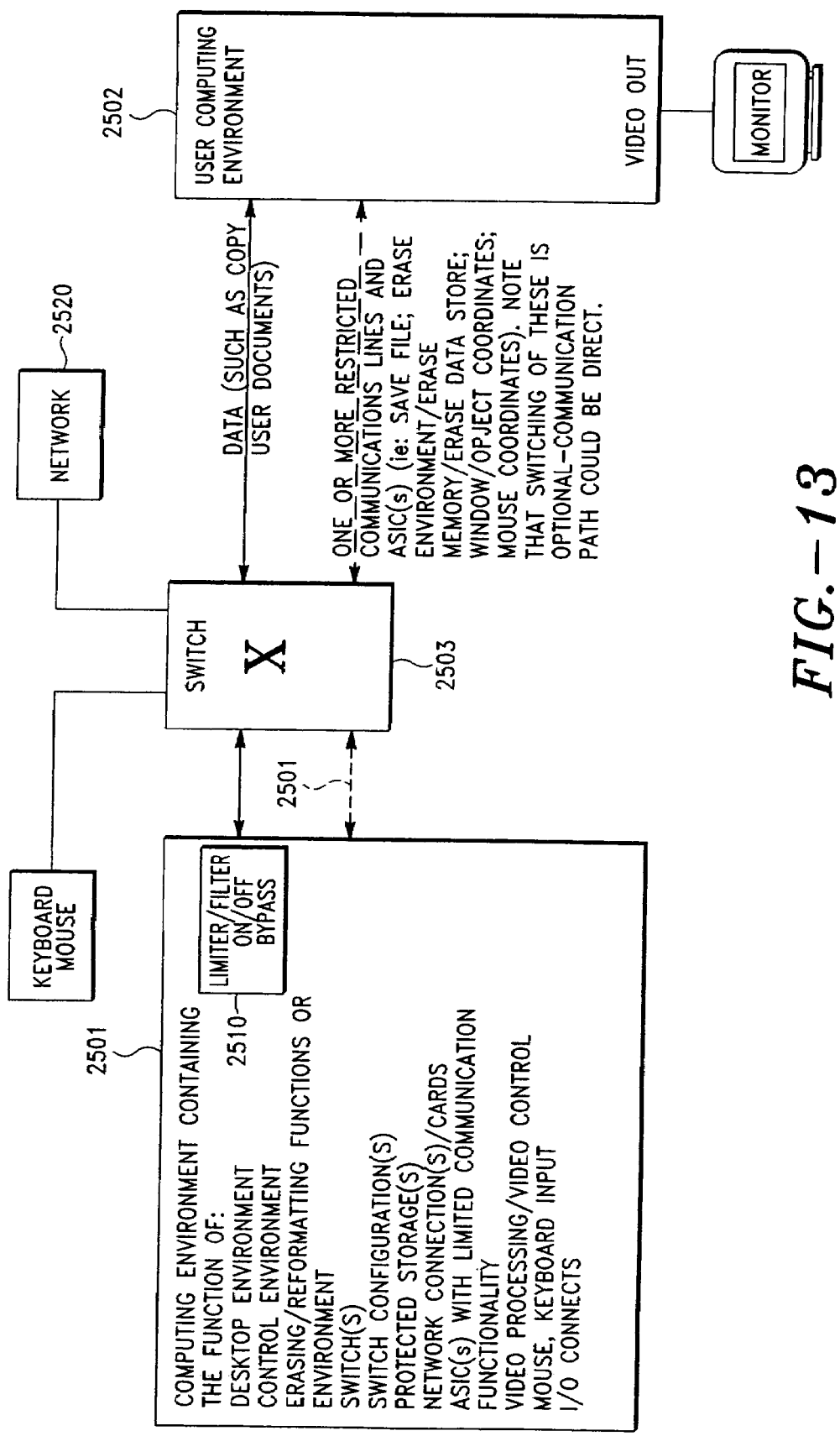
FIG. 13 illustrates another embodiment of the inventive architecture and system configuration according to aspects of the invention.

Alternative Embodiment Having Single Temporally Shared Computing Environment for Control and Isolated User Processing With reference to the embodiment in FIG. 13, there is illustrated a generalized configuration for an architecture and system 2500 according to aspects of the invention. In this embodiment, a first computing environment 2501 includes or may be configured to include and support the functions of a desktop environment, a control environment, erasing/reformatting of functions and/or environments, switch or switches, switch configuration(s), protected storage(s), network interfaces and connections or cards, ASICs having predetermined or dynamically determined communications with an ability limit communication functionality to provide or preserve a level of isolation, video processing and/or video control, mouse and keyboard input, input/output connections, peripheral device connections and control, and combinations of these as desired. This first computing environment 2501 is coupled via a switch 2503 (which may itself be optionally configured or implemented within the first computing environment) to a second or user computing environment 2502. This second user computing environment has the same isolation as described in the earlier embodiments of the invention and therefore provides the same immunity to virus, hacker, cyber-terror, and other accidental or intentional attacks or contamination by malicious computer program code.

Typically the user computing environment 2502 will generate a video output signal that can be processed and displayed by a display device either by the user computing environment or via the first controlling computing environment 2501. It will however be appreciated that in some embodiments of the invention not all computing environments will require a video output signal or even awareness by a user that a separate computing environment has been created. For example, in certain cellular telephones, a computing environment created for processing or coding and decoding voice signals may not require any video output but merely generate the required signals. This is merely one example of a situation where output is a data set, and even in this example the data set is generated and used in real-time or near-real-time and not stored. It will be apparent from the description provided in this specification that the inputs and output of any computing environment will differ depending upon the processing task.

Switch or switching means 2503 can couple or decouple data 2506 (such as for example a copy of a user file or document) between user computing environment 2502 and the first computing environment 2501 which handles the control, interface, protected storage, switching and other functions for operation of the system 2500. An additional optional restricted communication link 2508 that may include communication lines and optional ASICs or other logic circuits or logic means, may be provided to support such operations as save file, erase computing environment, erase memory, erase storage, communicate window and/or object coordinates and identity, communicate mouse coordinates, and the like as described elsewhere in this specification. It will be appreciated that the switching of these is optional and that the communication paths may be direct and that any combination of signals (command, data, etc.) can be combined and multiplexed or otherwise communicated over a defined set of communication links. Such communication links may be wires, busses, optical links, or other connection means as are known in the art.

As for other embodiments described herein, filters or limiters 2510 may be provided in any communication path to filter or limit the type, pattern, or number or amount of bits or data that are passed over the communications path. Other optional specialized dedicated communication paths or links 2526 may be provided as may other generalized sharable communication paths or links.

PC CardBus or Interface Card Embodiment and Conventional Computer

Having described several embodiments of the inventive system, architecture, and method, we now direct attention to an implementation of the inventive system, architecture, and method appropriate to a card or other circuit that is attached via an ISA bus, PCI, bus, USB Bus, SCSI bus, PC Card bus, or other buss or interfaces that provide bandwidth appropriate to the level of performance desired. In analogous manner the invention may be used in conjunction with any card, chip, or chip set that can be retrofittable plugged into a system or peripheral bus, for example, into an ISA, PCI, SCSI, Firewire, USB or other buss or connection.

The PC Card implementation is particularly useful as it permits notebook computer and other information appliances having a PC Card slot or cable to be retrofitted to provide the level of security and anti-virus and anti-hacker performance without completely replacing the notebook computer.

Figure 14:
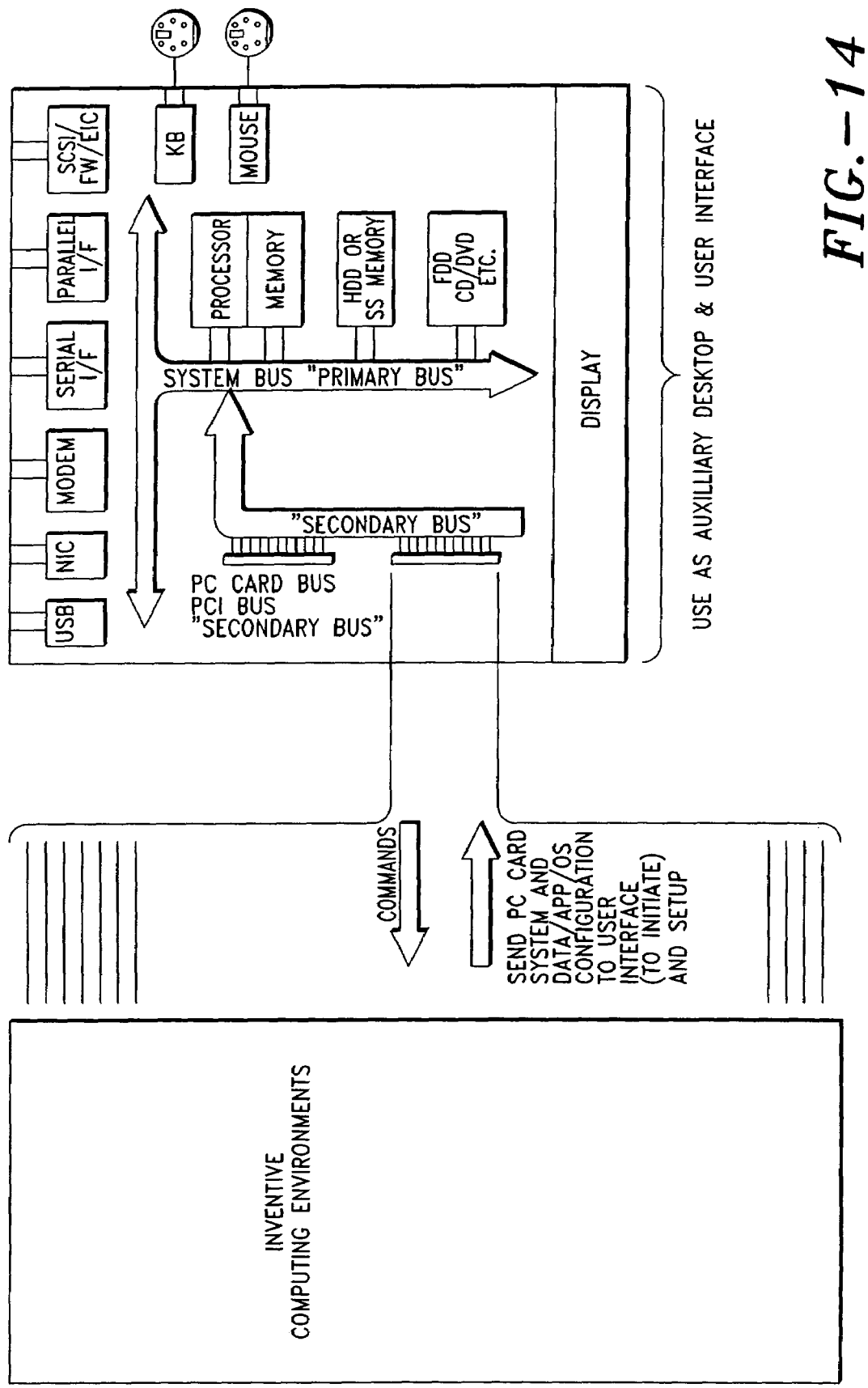
FIG. 14 illustrates an embodiment of a interface card embodiment of the invention such as a PC Card implementation.

With reference to FIG. 14 attention is directed to elements of a PC Card coupling to a host computer processor and main processor memory. In a typical PC Card interface, the PC Card connects to the PCI Local Bus of the computer via a PCI to CardBus Bridge as is known in the art. The PCI Local Bus in turn couples to the host Computer bus via a Host-to-PCI Bridge. This Host Bus is the same bus that couples to the Host computer processor or CPU. Access to the host processor and to all of the peripherals of the host computer provides an opportunity to retrofit a PC Card based auxiliary processing system that has the advantages of the inventive system, architecture, and method.

With reference to FIG. 14, there is illustrated a diagrammatic illustration of a PC Card version of the invention. While PC Card is advantageously used, it will be appreciated that the invention may be embodied in other different devices and connected or coupled with the notebook computer or other information appliance by other interfaces now existent or to be developed.

The PC CardBus provides all of the signals required to couple the circuits of the inventive system with the notebook computer. In one embodiment, circuits of the host computer are used to provide the User Interface computing environment, but in other embodiments, only the processors of the PC Card are utilized for processing. In one embodiment the hard disk drive of the host computer is utilized while in other embodiments solid state memory on the PC Card or coupled to the PC Card by a cable are utilized. Advantageously where a computer has multiple PC Card slots or connectors, one slot may mount and connect the PC Card carrying the inventive processor system, and the second card can carry a memory store having hard disk drive, optical, solid state or other memory storage, or combinations of these. Storage can also be provided on both the processor PC Card and on a PC Card based storage device.

Figure 15:
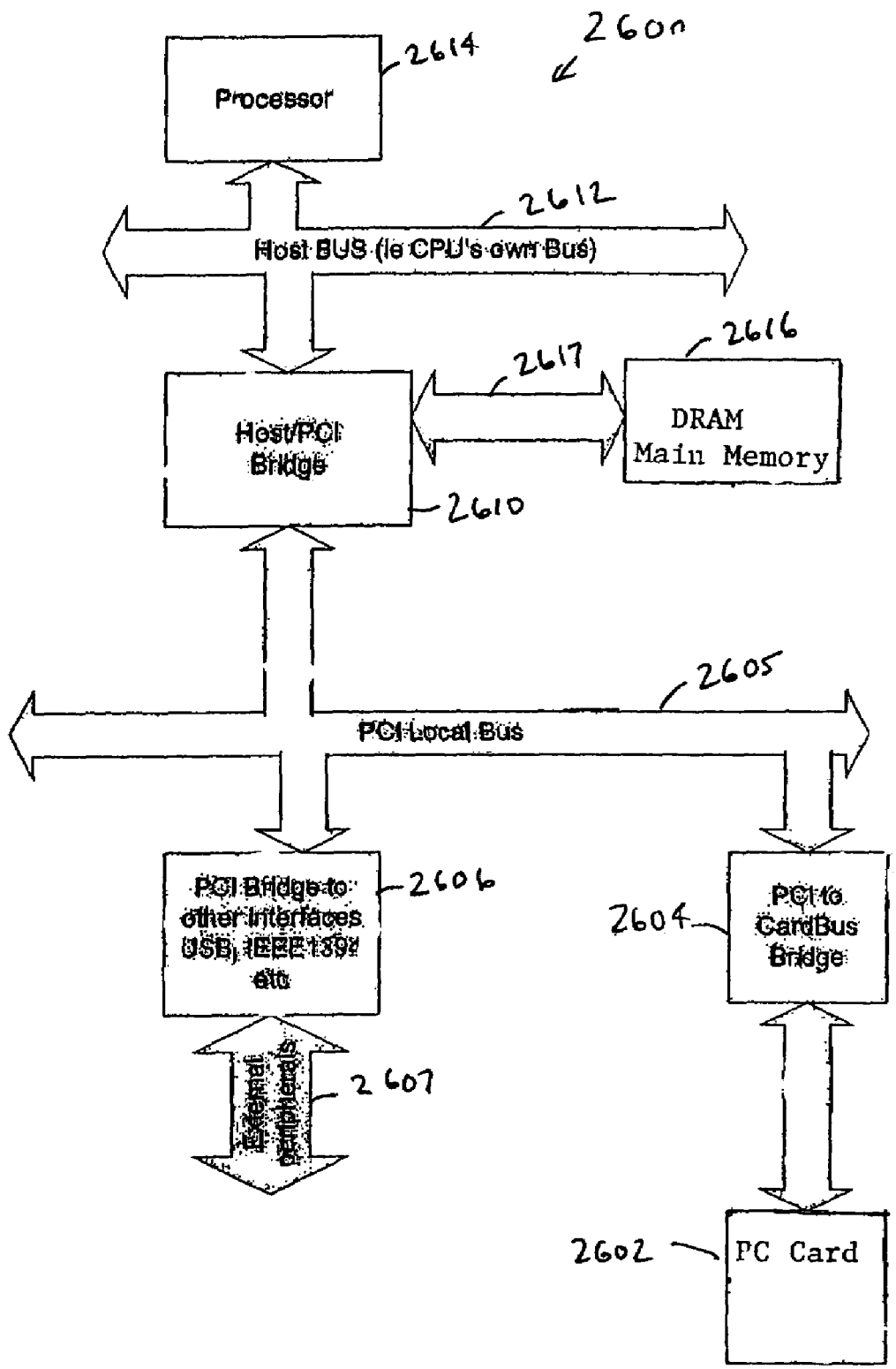
FIG. 15 illustrates an embodiment of the PC Card embodiment of FIG. 14 showing connectivity between the PC Card and peripheral bus, host bus, and host processor.

FIG. 15 is an illustration showing a generalized architecture 2600 for coupling a PC Card 2602 to a PCI-to-CardBus Bridge 2604 and by that bridge circuit to the PCI local bus 2605. This PCI local bus in turn couples to the Host-PCI Bridge 2610 which provides access to the Host Bus 2612 and to the Host processor 2614. Main memory 2616, such as DRAM, is also coupled to the Host bus 2612 and to the PCI local bus 2605 via Host-PCI Bridge 2610. The PC card in this embodiment contains the inventive computing system whereas the host processor 2614 is the processor installed in the conventional notebook or desktop computer. It will be appreciated that for ISA or PCI cards, they may couple directly to a ISA local bus or ISA bus as is known in the art. The PC Card 2602 may advantageously include storage, network interconnect card (NIC), modem, graphics processor, wireless communication, and other device and peripheral operational features of a full computer system.

Alternatively, or in addition, the PC Card 2602 may include connectors for coupling such devices to the card. In other embodiments, a second PC Card may be provided to augment storage, communication, video processing, or other features and interoperate with the PC Card (or other plug in card in a desktop type computer) 2602 containing the inventive processing and computing environments. The ability to provide the inventive computing and processing environments in a retrofittable or pluggable package may be extended to various hand-held and portable devices such as cell phones, organizers, personal data assistants, satellite telephones, appliances, entertainment systems, or other devices or systems, having a plug-in card or external interface capability.

Figure 16:
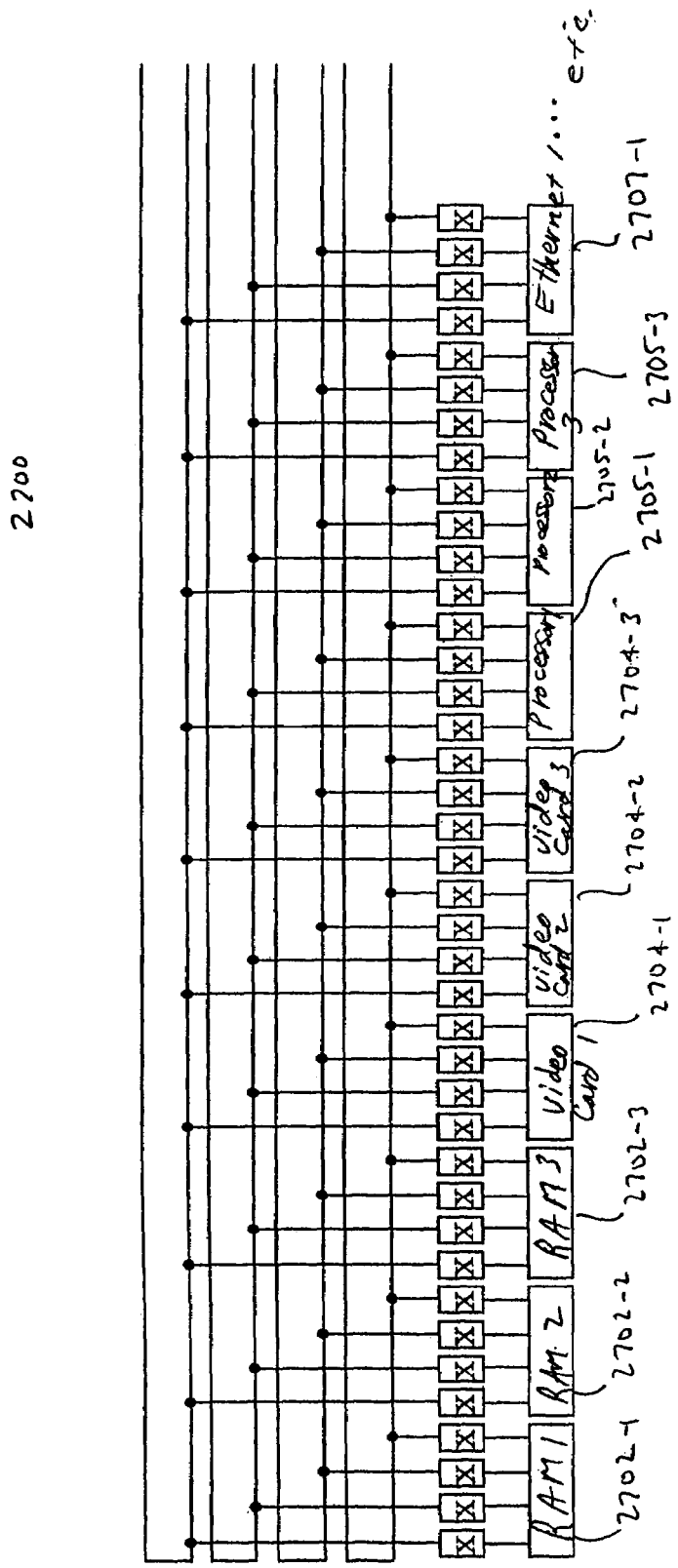
FIG. 16 illustrates aspects of dynamic configuration and component switching and connectivity within an embodiment of the invention.

FIG. 16 illustrates an embodiment 2700 of the invention providing separate dynamically configurable system components, such as but not limited to: memory elements (such as RAM or ROM) 2702, data storage in any form (such as magnetic hard disk drives or other storage subsystems or devices 2706, solid state memory 2708, optical storage devices 2709, and the like), video processing elements 2704, signal processing elements 2711, Ethernet interfaces 2712, network interface cards 2713 or capabilities, modems 2714, wireless interfaces 2715, processors 2705, switches or switching elements 2730, communication paths, wires and/or busses 2720, ASICS 2717, or other components described relative to this invention. Only the interconnect capability is illustrated in this diagram and may be applied to any of the afore illustrated and described embodiments of the invention which provide the additional architectural, topological, system, and methodological details. Dynamic configuration or reconfiguration may occur upon initialization, during operation (even when other processing operations are on-going), or upon a system reset. In some embodiments, an allocation table or data structure 2725 will be stored identifying the allocation of the different components and elements to different computing environments.

The dynamic configurability of some or all of these components has already been described relative to other embodiments of the inventive architecture, system, and method. For example, it was earlier described that computing environments and components of such computing environments may be modular and dynamically configured so that the specific defective component and/or computing environment can be taken out of service by a controlling entity, such as a CSCE or CCE computing environment, until the defective component or set of components comprising a computing environment are swapped out for a working part or repaired. It had also been described that some embodiments of the invention may utilize dynamically allocatable and configurable Central Processing Units (CPUs), microprocessors, micro-controllers, ASICs, or some combination to provide the physical structure to create the computing or processing environments of the types already described. This dynamic configuration also provides for flexibility in choosing the characteristics of a component or element to suit the particular processing task when components or elements with different characteristics are physically available within the system. In some instances the complexity of the processing or computational task will dictate the physical elements that will support the desired computing environment such as the need for a very fast processor or a large memory, or in other instances the desirability to minimize power consumption for a modest monitoring task that requires little processing power or speed and minimal amounts of memory. Recall that such selection and configuration may be under user control, or more typically, under the automatic control of the computing system according to some predetermined or dynamically determined rules or policies and optionally but desirable according to some measured computing system physical or logical state, environmental conditions, processing request and complexity, application program size and data set size. Other embodiments of the invention provide for dynamic allocation of separate elements (such as CPU and storage) which can be assembled as a computing element even if not physically connected at the time of manufacture of the computer and even in not adjacently located within the computer system hardware. In some embodiments, the dynamic allocation and configuration may involve and utilize external components or elements such as may be configured via external ports via the switching systems already described. In some embodiments, the control computing environments (such as the CSCE, CCE, or other control computing environments as described herein) may interoperate and/or control switches or switching systems as described relative to peripheral device, input/output device, and/or storage devices to enable communication paths, switch computing system elements together, and build the links and connections to provide the intended operation.

While FIG. 16 illustrates the different types of components as being connected to single schematic "lines" it will be appreciated that each component will be coupled to other components by a wire, set of wires, buss, or other communication link having the proper electrical (or optical) characteristics and signaling protocols to support the intended communication. Such proper characteristic are conventional, known in the art, and not described in further detail here.

It will also be appreciated that although some embodiments of the invention may provide for dynamic configuration of all of the afore listed components and elements (as well as others not specifically listed), other embodiments may provide for more limited dynamic configurability, such as an ability to dynamically configure different data storage to dynamically or fixedly configured computing environments.

Figure 17:
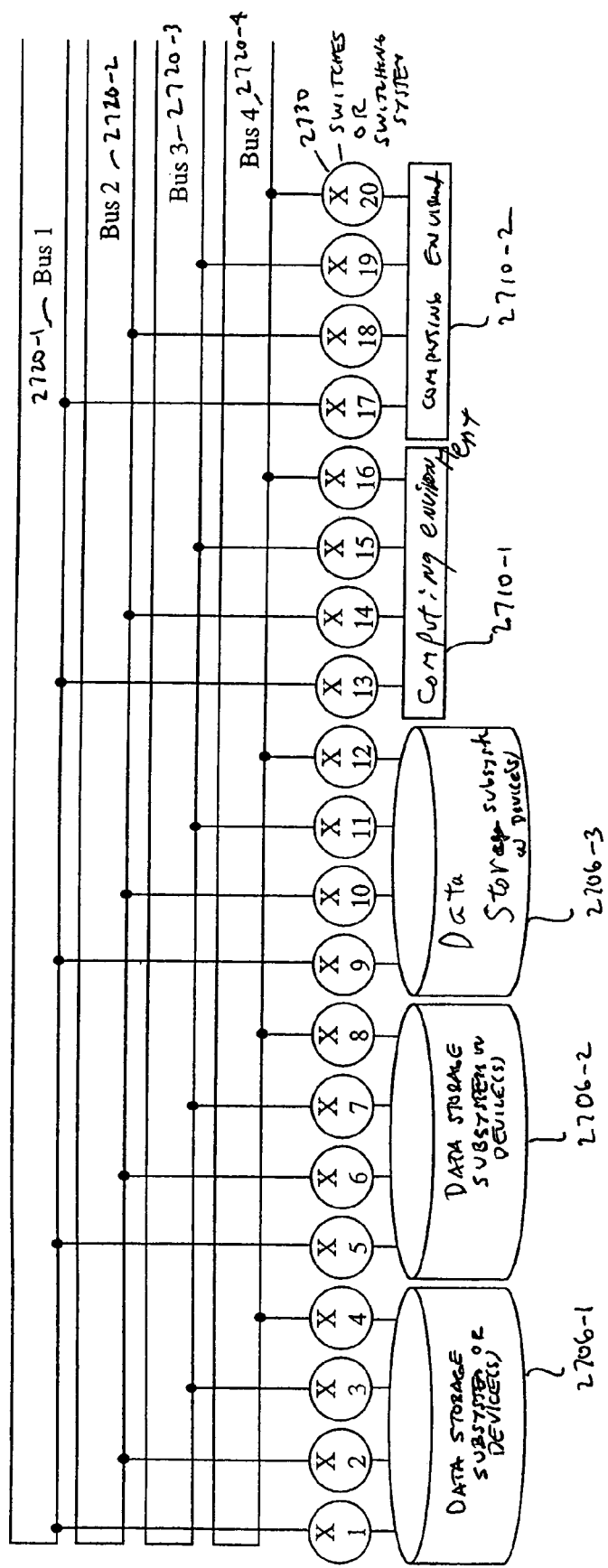
FIG. 17 illustrates aspects alternative aspects of dynamic configuration and component switching and connectivity within an embodiment of the invention.

FIG. 17 illustrates an embodiment showing a plurality of computing environments, each having some set of components and wires, busses or other interfaces connecting the computing environment components via switches "X" to different signal lines or busses. A plurality of data storage subsystems are also illustrated (possibly with different logical partitions or comprised themselves of a plurality of physical devices) that can be dynamically allocated to the overall computing system for use by the different computing environments. In some embodiments, each computing environment may include some data storage components and the dynamically allocatable or switchable data storage represents additional storage capacity when a required storage capacity for a storage or processing task (including for example temporary storage) exceeds the amount of storage available within the defined computing environment.

Figure 18:
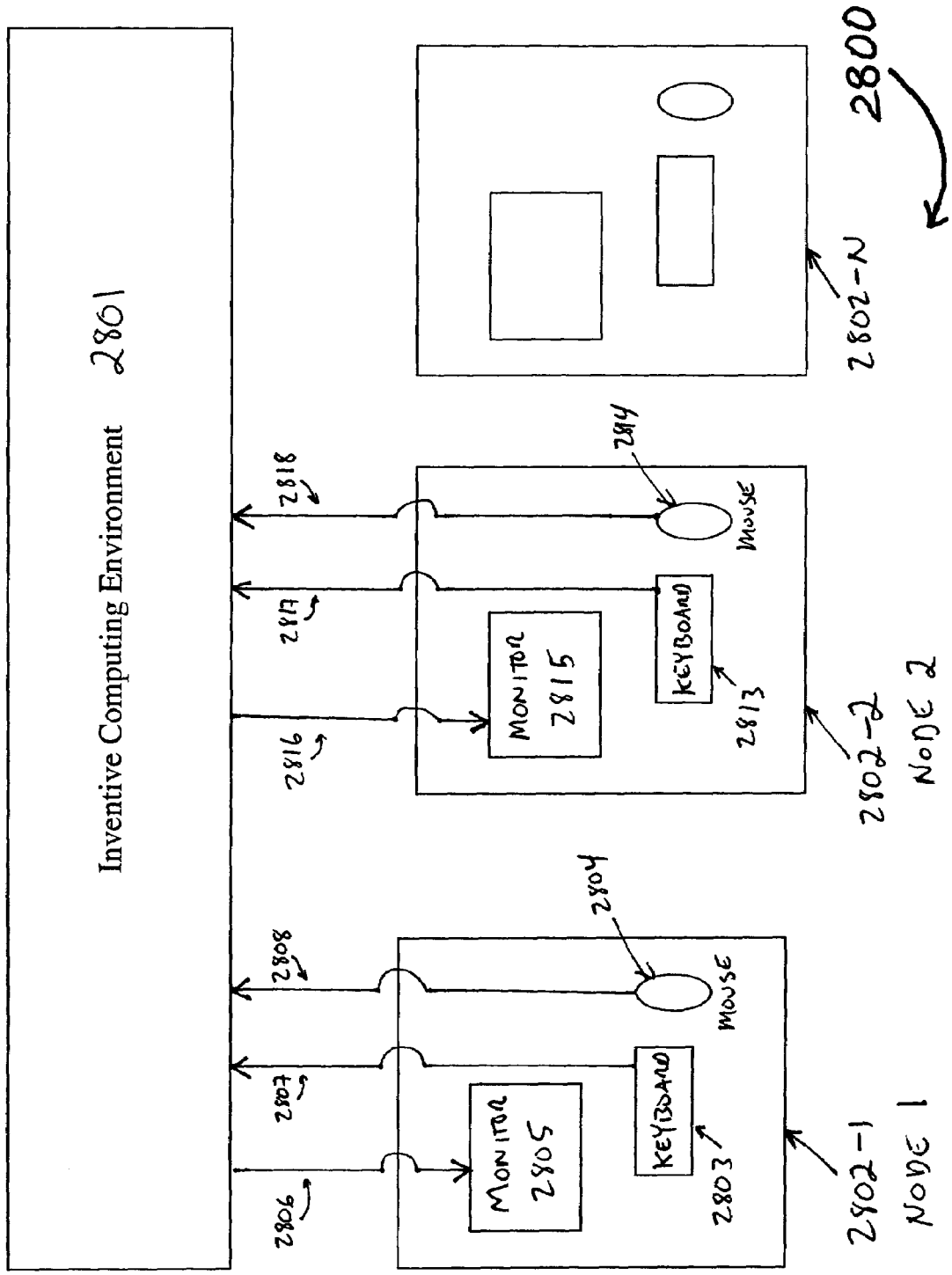
FIG. 18 illustrates further features of an embodiment of the invention including how the inventive computing environment may couple multiple keyboards and mice and provide for multiple separate sets of layered video.

FIG. 18 illustrates how the inventive computing environment 2801 may couple multiple keyboards 2803 and mice 2804 (or other input or pointing devices) via keyboard communication line or link 2807 (such as an electrical cable or wireless link) and mouse communication line or link 2808 to isolated 'sets' of isolated computing environments (ICE's) within the inventive computing system or overall computing environment 2801, and combined with multiple separate 'sets' of layered video via video communication signal link 2806. Output may be sent to a single monitor or to separate monitors 2805 to create independent 'nodes' 2802-1, 2802-N that perform independently and in isolation of one another, yet all under the control of a single controller or control environment.

Optional Features that May be Used With Embodiments of the Invention

Having described several different embodiments of computer and information appliance architectures, system configurations, and methods and procedures for generating and operating computers, information appliances, and other devices, we now digress to describe some features (including some optional features) that may be provided with some of the embodiments. These descriptions also provide some indications of the types of applications that may be handled in the various computing environments, and how particular susceptibility to viruses, hacker code, Trojan horses, and other malicious code may present a security or immunity issue and how such issues are resolved using the inventive architecture, system, methods, and procedures of the invention. In the context of this description the use of the term computing environments of CE is intended to include any of the variety of computing environments, isolated computing environments, or computing or isolated subsystems as are described in this specification as well as to such computing environments and subsystems as are described in the related applications and incorporated by reference herein.

Data may be moved between special-purpose subsystems or computing environments using a separate logic control device, such as an ASIC or logic control device utilizing direct memory access. The process of moving data advantageously does not allow the data to be executed, which could possibly enable or let loose hacking, viruses, other malicious code, and the like. Additionally, data may be encrypted, compressed, or encoded to prevent its execution.

Repair or recovery of a computing environment may be implemented if and when needed. A computing environment (CE) may be repaired or returned to an ideal state using an automated repair process. Such repairs may be conducted "on the fly", or after each transaction or without rebooting. Master templates typically represent an ideal state of a special-purpose subsystem, and may be stored on a storage system. A transaction may include reading e-mail, wherein the opening of each individual e-mail messages represents a separate transaction. Optionally, one or more items can be ignored during a repair process. For example, if an e-mail has been opened, a repair process may run ignoring the open e-mail, detect and repairs problems, and then a user may respond to the e-mail without quitting it. In another embodiment, all downloads and e-mail can be saved immediately to the storage system prior to opening the download or e-mail in the work subsystem.

In one embodiment, the logic of a CE may trigger an event associated with a repair process. The repair process may perform a comparison between a master template of the working system and state of the current working system. Any differences between them could trigger a subsequent repair process in which some or all data that is different is deleted from the working system. Further, data may be copied from the master template by the repair process as necessary. In one embodiment, the repair process may make the working system identical to the master template.

In one embodiment, a repair process can be conducted after one or more e-commerce transactions, or after surfing one or more web pages, and the like. Thus all known and unknown viruses and Trojan horses can be made impotent prior to the next transaction. While this process does not eliminate viruses, worms and Trojan horses from the computer (they may be stored in the storage system), it keeps them in an in operative state. The repair process could repair volatile and non-volatile memory, or clear volatile memory, or set volatile memory to an ideal state.

In one embodiment, if the user selects more than one e-mail to open, two or more e-mails could be copied to the working system and could be open simultaneously. Optionally each e-mail could be copied to its own separate isolated working system, opened, viewed, and worked on separately. If the user needs to copy data from one isolated e-mail to another isolated e-mail, a copying process can be used that does not allow code to execute.

In one embodiment, web commerce software, or e-mail software, or any software can be modified so that individual records, or only copies of the records that are specifically needed for a transaction are copied to the storage system, utilized and then copied back to the database in the storage system, and after each such transaction a repair can be conducted. Optionally, in a transaction in which data interacts with more than one database or CGI for example, the transaction can be broken up into discrete segments, data copied to and from the isolated storage system(s) or working systems as needed, and repairs can be run between each segment of a transaction, or between some segments of a transaction. Optionally, software can contain instructions that define what type of data can comprise a transaction, limiting the copy process to only copying data that meets certain criteria.

In one embodiment, to further speed the repair process a master template of the working system and the software in the working system, may each be loaded into their own separate isolated volatile memory areas or shells to increase the speed of the repair process. Thus, if data in the working system is in volatile memory and the master template is in volatile memory, repairs can be conducted at higher speeds. Alternatively a new working system shell can be utilized, eliminating the need for a repair. For example a user could open an e-mail, and read the e-mail using one shell, and if they want to respond to the e-mail a second shell could be used for the response. Optionally the first shell or computing environment can be checked for a virus while the user is writing a response to an e-mail using a second shell, and additional shells or computing environments can be made ready for use.

In another embodiment, data can be downloaded directly to a storage system, using a method of encrypting or compressing or other copying which prevents execution of the data. Optionally, an isolated hidden backup or archive system may be utilized with this invention, which may make an array of hidden backups or archives of the storage system or working system volatile or non-volatile memory/memories or data as desired, and which may be time stamped. Copying of data to such backup or archive system could also use techniques described herein to prevent execution of files and damage to the data on the backup system.

With respect to file save operations, in one embodiment, each time a save is made in a working system, a copy can be made to a storage system. Optionally, in order to prevent a virus or Trojan horse from causing havoc by performing millions of saves that get saved to the storage system, there could optionally be imposed a limit on frequency that a file could be saved, or other limitations could be placed on the process of saving data to the working system. Optionally this could be part of the ROM or copy, store, save, or other program.

A separate processor that has restricted functionality may be used to process data in the isolated working system, or the main processor can be given a restricted functionality. This can be done with multiple data storage devices, or one data storage device that has isolated partitions.

In one embodiment of the inventive system and method, data is transferred directly to and/or from one or more computing environments to and/or from one or more second computing environment(s) in a manner that eliminates the possibility of transferring malicious code. In one embodiment, this methodological procedure may for example, include the use in a first computing environment of an ASIC or other logic circuit or logic means that has the ability to send and/or receive ASCII or extended ASCII, connected to a data line leading to a second computing environment. In some embodiments, the capabilities of the ASIC or logic means are specifically limited so that no additional processing can occur. Optionally the second computing environment may directly receive the ASCII data, or instead the data may be received by a second ASIC with the ability of receive and/or send ASCII or extended ASCII data. These ASICS may limit the amount of data, ASCII characters, and/or requests that may be made (for example, within a period of time) in order to, for example, prevent buffer overrun.

In one embodiment, some optional handling for ASCII filtered or stripped files or content may be provided. For example, if a file, data set, or Internet or World Wide Web content is not ASCII stripped or filtered, then files from outside world and files derived from it (or derived from its progeny or children) are marked as or identified as "unsecure" and potentially infected, while files or content that are striped or filtered to only include certain permitted ASCII characters may be identified as being "secure". This type of marking can be used for other predetermined files or content other than ASCII. Therefore in general, a file may optionally be treated as secure if it is known that it has not been exposed to infections, malicious, or simply unknown code that may be problematic; and may be marked as secure if it is known not to have been so exposed.

In one embodiment, a repair process may be conducted which may consist of or include, for example, one or more of the following: (a) making software in the CE identical and/or partially identical to all or part of a Master Template, (b) deleting and/or repairing the computing environment or portion thereof such as the computing environment storage ("explosion room"), and/or switching to a secondary CE, (c) reformatting and/or repairing one or more data storage devices, master boot records, partition tables, or the like, (d) running one and/or more other repair processes, or (e) any combination of these. A repair process may be run, for example, each time a user "quits" a document (and/or other criteria may be used for when it may run). Thus each new document may be opened in a clean environment which contains no viruses and/or hacker software or other malicious code.

In one embodiment, a Master Template may be stored on a Data Storage Device that optionally may be hidden, and/or may not be normally visible to the user and may be referred to as a Protected Master Template, and/or Master Template. Optionally, it may be "read-only", and/or locked, and/or turned off, and/or disabled until needed, and/or disconnected, and/or inactivated, and/or communication with it can be terminated and/or inactivated. These (and other) techniques can be used to protect the Protected Master Template from malicious code.

In one embodiment, Data Storage Device(s) and/or partition(s) may be used to temporarily store the user's personal data (documents made by the user, E-mail, address book, bookmarks, favorites, database components, etc). This Data Storage Area may be referred to as Temporary Storage. For example, when the user saves a document, it may be saved to the Temporary Storage. When the user saves a database, for example, it (and perhaps related components) may be saved to the Temporary Storage. When a user downloads e-mail, it may be saved to Temporary Storage. When items are created such as bookmarks and favorites, they may be saved to temporary storage when they are created, and/or when the application is quit. When a document is requested from Protected Storage (described elsewhere herein), it may be first copied to Temporary Storage. For example, if the user wants to open an Internet browser, then favorites/bookmarks, and other user information may be copied from Protected Storage to Temporary Storage. Please note that this is an optional step that is not essential to this process, but in some embodiments may be desirable.

A repair process may repair Temporary Storage, or replace it with a new copy that has been prepared in advance. For example, in one embodiment, multiple temporary storage areas may be prepared in isolation. Then, as they are needed, the old Temporary Storage Device(s) may be deleted and replaced with one or more new ones, that may for example have been created using RAM, a RAM disk, a shell, or the like.

In one embodiment, for example, the Protected Storage may be the storage area where the user's personal data is isolated from the Explosion Room except after a repair, or if the explosion process has been suspended. Temporary Storage may be the data storage area that may be used (optionally) when data is "shuttled" from Protected Storage to Temporary Storage, and back again after the document has been worked on, from Temporary Storage to Protected Storage. Temporary Storage may, in one embodiment, always be accessible to the computing environment (also referred to in this and some earlier related applications as an explosion room). In this example, the user may save data to the Temporary Storage while working, and then upon quitting, the document (or other file or data set) is copied from Temporary Storage to Protected Storage.

With reference to files and backups, optionally, in one embodiment, backup system(s) or archive may be used to keep successive backups of all user's personal date: for example, documents, E-mail, favorites, and the like. Optionally, if a file is damaged by a virus or corruption, the user can copy past versions from the backup system. Successive backups and/or archives may be time/date stamped so that the user can easily determine when backups were made. The frequency of backups may be pre-determined as a default from the manufacturer, but may be changeable by the user. Optionally, the backup system(s) may normally be hidden from the user. In one embodiment, when the backup system is made available to the user, it is kept in "read only" mode so that it can not be accidentally modified by the user. Optionally the backup may be on a separate data storage device (and in some embodiments, a partition,) and/or located elsewhere such as, for example, on a network. Please note that this is an optional step that is not essential to this process, but in some embodiments may be desirable.

Relative to the indication that a problem or error has occurred in a computing environment, various steps for recovery or repair may be taken. In one embodiment, the processor may be allowed to complete processing and/or may be "cleared" or reset, RAM may be cleared or reset, (optionally, a second isolated RAM that may optionally be unavailable and/or deactivated may be made available, for example communication with it can be established, and/or activated and utilized while the first RAM is cleared, but use of a second RAM is not required), and the processor and/or RAM may now be utilized in the repair process. One exemplary embodiment of a repair process to an explosion room or isolated processing environment is now described, though many alternative processes and/or a different processor and/or RAM or other memory or storage may be utilized. In one embodiment, repair of a CE may also be defined as replacement of the CE with another CE. One method of achieving this is to delete the first CE, and activate communication with the second CE. Alternatively, the first explosion room can be repaired while the second CE is in use.

Electronic mail or E-mail in-boxes and out-boxes are usually stored as large files containing many individual messages. For example one "in-box" may contain all messages that have been sent to a user. Thus, when one E-mail is read or sent, the entire E-mail file may be at risk from a virus or hacker. According to one embodiment of the invention, E-mail software may be modified so one E-mail at a time can be copied to the Temporary Storage or isolated computing environment to be opened for use. This would protect other E-mail from contamination. A repair may be run prior to opening the next E-mail.

In one embodiment, address books, and or other E-mail components could be stored in Protected Storage, and only the particular address(es) a user selects may be copied from Protected Storage to a work area to use. Thus, a virus would not have access to a users entire address book. Optionally, updating an address book could be restricted so that a repair process must be first conducted, thus protecting the address book from contamination.

Optionally, databases and other software may store multiple files as one large file or database—just as most E-mail programs treat individual Emails as one file. Such software may be modified so that individual files and/or discrete records can be copied to the Temporary Storage and worked on one at a time by the user, so entire databases are not put at risk. A repair may then be run prior to opening the next file or record. For example, each E-mail in an E-mail in box could be stored as separate file. Alternatively, the location of the data could be entered in a directory and/or database, and only that data could be copied, without to the Temporary Storage and/or CE without opening any file in protected storage.

In one embodiment computer program code may prevent user data from being opened in Protected Storage.

In one embodiment E-mail and/or databases may be copied from the Protected Storage Area to a CE and/or other data storage device, and one (or more in some cases) E-mail or file(s) can be opened to work on. Only that one Email (or database file) can be opened and worked on and the rest of the E-mail and/or database can be deleted (because it still resides on the Protected Storage Device).

In one embodiment, user and web site utilize proprietary inventive technology and methods. For example, in one embodiment, a system or device user decides to do an e-commerce transaction at a web site. Instead of entering data on the web site in a conventional manner, the user indicates that he/she wants to do an e-commerce transaction, which causes the web site software to pick up (or the users software to automatically provide) the users public encryption key. The web site moves the users key into an isolated computing environment, and encrypts using a stand alone application program or procedure that the user can use to enter their transaction or database information. Then the encrypted file may be moved into an isolated computing environment that is connected or can be connected or coupled with the network such as with the Internet, or the network can be connected to the isolated computing environment where the stand alone application has been encrypted. The encrypted application is then sent to the user. The user's computer receives the application, moves it to an isolated computing environment and un-encrypts the application in an isolated computing environment. Then the user enters their user data into the application. The application may create a database of what the user has entered, and then that database can be encrypted, then network connection established with that an isolated computing environment, or the encrypted database moved to a new an isolated computing environment, and the encrypted data is then sent back to the e-commerce site, moved to a new an isolated computing environment, and unencrypted. In this manner unencrypted database and e-commerce is never exposed to the network.

In one embodiment, the Ethernet cable (or other network connection communication link) may communicate in only one direction rather than in both directions and each of the receive and transmit cables are switched to communicate with the computing environment separately. In these embodiments, each line or direction of the Ethernet (or other network connection communication link) is switched separately with each communication link being coupled with a separate isolated computing environment. One computing environment sends and another computing environment receives and their activity is coordinated by the controlling computing environment, such as by the CSCE or CCE. In another embodiment, a pair or network interface cards or capabilities (NICs) or modems are also configured to only send or only receive with the pair providing send/receive capability. By providing a receive only capability in one computing environment and a transmit only capability in another isolated computing environment, even if a hacker or virus gains access to the receive computing environment, the hacker or virus cannot get out or be communicated elsewhere from the transmit only computing environment.

In one embodiment, an internal DHCP router or other router is optionally provided so that computing environments can have multiple network transactions, multiple NIC cards, or multiple I/O devices. In one embodiment, any number of peripherals coupled exclusively with any number of computing environments in an isolated manner. These devices may for example be USB devices, Firewire devices, SCSI devices, serial devices, or any other device types as are known in the art.

In one embodiment, rather than replacing the prior saved versions of files, the older files may be retained. For example, when the updated Netscape bookmarks and user data are copied back to Protected Storage, they may not replace the previous version of the Netscape bookmarks and history. Thus, the next time the data is used, if it is corrupt and does not operate properly, the method of control and/or user may run a repair, and switch back to using a prior version of the data.

In one embodiment, optionally, two or more CE's can be created, one that, for example, has a complete Master Template, and another that, for example contains only abbreviated set of frequently used applications and the operating system. Optionally, when software is needed, if the CE does not contain the software, the required software may be added to the CE, by copying it from a Master Template that may for example contain the full set of the users software and may optionally contain an operating system.

In one embodiment, optionally, prior to activating network communication: some or all E-mail to be sent can be encrypted using a method of safeguarding E-mail by performing encryption in an isolated computing environment prior to sending, then copying the Email to a second isolated computing environment where it will be sent (and exposed to a potential hacker). After being received the encrypted email is moved to an isolated computing environment prior to being unencrypted. Thus email is never exposed to the Internet in a non-encrypted form. Our software automatically triggers the encryption and/or decryption process without user involvement. Optionally, users public key can be provided with each email automatically.

Optionally, in one embodiment, Protected Storage can be read only and/or locked until the CSCE or CCE or other controlling environment receives a command to move data to an CE. Thus, in this example, if a user selects a document in the Protected Storage to open, code (that may for example be instructions in ROM and/or an operating system) could instruct the CSCE to conduct a repair. Then following a repair the CSCE could switch Protected Storage to read-write and/or unlocked. Data can be copied from the Protected Storage to the Temporary Storage and/or Explosion Room. These events may take place in other order, may contain additional and/or other steps, and/or may not contain some of these steps.

Optionally multiple CE may operate simultaneously, so that if one "crashes" and/or is quit and/or closed, and/or no longer needed, another CE is ready to take the place of the CE that was in use. For example, the CSCE may switch to a secondary CE, and/or activate communication with a secondary CE.

In one embodiment, code associated with Protected Storage may not permit data to execute and/or may not support execution of data in Protected Storage) Thus, in this embodiment, no user data can execute in Protected Storage. Optionally, communication with Protected Storage may never be established with a CE prior to a repair, and prior to a new network connection with that CE, and/or prior to the opening of any user document. Thus, Protected Storage is impervious to hacking, and the execution of viruses.

In one embodiment, computing environments (also referred to as x-rooms or explosion rooms) may each be identical to each other, and/or may have differences from each other, and/or act as "time delayed" mirrors. In one embodiment secondary CEs may be identical, but keystrokes and/or input may be sent to multiple CEs in a delayed manner. Thus, some CEs may be time delayed so that if a CE crashed, the control system could switch to a time delayed CE.

In one embodiment the method of control may utilize a process watcher and/or crash detection system to determine whether to switch to secondary system CEs, and optionally may diagnose problems so that problems may be avoided when switching to successively older CEs.

In one embodiment, data in volatile memory may be copied, and/or saved, and/or backed up to another memory area and/or logic device prior to executing a command. Successive backups of data prior to execution of commands may be stored. Then, when a command is executed, and if a problem such as a freeze occurs, a new secondary system and/or secondary self repairing user work area can be used, and/or optionally backups of volatile memory may be loaded into volatile memory. This may provide a good copy of volatile memory for use. If a problem or freeze occurred again, an older version of the saved volatile memory may be utilized. Optionally user(s) may be notified of the problem and asked to change what they input, and/or how they input data, and/or other behavior. Optionally a process watcher and/or error detection system may be used to identify problems. Optionally, when a secondary CE is used, the method of control may choose to utilize an earlier backup of volatile memory, and/or command the secondary system to treat the data differently to avoid a crash.

An alternative method of performing the repair, for example, is to prepare multiple CEs in isolation. These CEs could be in the form of RAM disks, RAM, shells, volatile memory, or other data storage and may have associated RAM, and/or processing, and/or computing, and could contain copies of all or part of one or more master templates. Isolation could be created for example by activating and/or deactivating communication to switch a CE from being an isolated backup, to being the current CE.

Optionally, in one embodiment, in the event that one or more unanticipated, and/or unidentified files appears in the Temporary Storage Area, (for example one or more files that do not appear in a protected database of information pertaining to what data should be in the Temporary Storage Area) the code, for example, in the Method of Control and/or operating system, and/or ROM may draw such files to the attention of the user. The user may be given the option of destroying and/or saving the file(s), and/or marking the file(s) to indicate that the file(s) is/are some way questionable, and/or may need further inspection and/or validation. In another embodiment the unidentified files may be deleted and/or saved to a data storage device and/or marked for further inspection, and/or may be automatically and/or manually sent somewhere for further examination, for example to a network administrator and/or a virus inspection entity.

In one embodiment, one or more data storage device(s) may be hardware and/or software switched between read only and read/write modes and/or locked and/or unlocked mode, and/or accessible and/or inaccessible mode. In one example, a user may open a file from a read only data storage device, does work on the file, and when the user saves the files is saved to a temporary storage area. Optionally, on closing some or all files, logic and/or method of control may perform one or more of the following steps, clear and/or reset RAM, clear/reset processor, and/or make one or more data storage devices unlocked and/or locked, and/or read/write and/or read only, move data from temporary storage to data storage device, close/lock/make read only one or more data storage device(s), optionally clear/reset temporary storage area, (optionally run repair process), wait for next user command. In one embodiment, Temporary Storage may consist of volatile and/or non-volatile memory. In one example: random access memory and/or flash ROM, and or other data storage may be used. In one embodiment, to copy data between documents, data to copy may be loaded into one or more specific address(es) in RAM and/or volatile memory. When receiving a paste command the data may be communicated by use of a copy process that does not allow data to execute. For example, the data could be simplified to only transmit ASCII text that cannot be executed.

In one embodiment, although files may not be opened in Protected Storage, they may be, for example but not limited to: copied, moved, deleted, flagged, backed up, archived, and other such functions, as long as these functions are performed from a "secure" interface, such as the Control Environment.

In one embodiment, in order to run commands that would change preferences, modify master templates, delete backups, or to provide other administrative events to the control environment, or the like, the administration must occur from a secure environment, such as for example, the control environment itself which may have its own user interface software. Herein the term isolation may be used to convey the concept that at times what is being described is isolated; at specific other times as described herein it may not be isolated. For example, an CE may be isolated when user data is executing, and until a repair process runs. Then, to run a repair process, communication may be established with, for example a read only Master Template, a repair may be conducted, and then other communication may be established with the CE, such as communication with a network. Isolation is utilized as needed and when needed to prevent hacking and the spread of viruses.

With reference to master templates, "disposable copies" of Master Templates used in the CE may be created in many ways and using a variety of criteria. In one embodiment a variety of Master Templates in CEs may be created. Criteria for creating Master Templates may be established. For example one criteria could be based on selecting programs commonly used on the computer/computing device. For example, assume that a computer user most commonly uses: (1) a word processing program, (2) an E-mail program, (3) two internet browsers and a utility that prevents pop-ups and a program that tracks on-line auctions; and to a lesser extent uses a variety of other applications, games, utilities and/or other programs. Using this example Master Template(s) could be created using each of these needs as criteria. Thus one Master Template may contain an operating system and a word processing program; another Master Template may contain an operating system and an E-mail program. Another Master Template may contain an operating system, two internet browsers and a utility that prevents pop-ups and a program that tracks on-line auctions; and yet another Master Template may contain all of the users software.

In another embodiment, one (or more) master templates may be created, and only the parts of the Master Template that are needed to meet a criteria may be copied to create one or more CE(s). For example, there could be one master template, but it could be used to create parts of a Master Template in one or more CEs. For example, using the criteria mentioned above, one Master Template may be used to create CEs that are readied for possible use by the user.

In one embodiment, the user may be able to select which CE(s) to utilize/open, and may copy data to the CE(s). Optionally, selection of CEs and/or copies of Master Templates to use may happen automatically, and may be orchestrated by code. For example if the user selects a word processing document to open, when the document is selected code may execute that searches for an CE containing the appropriate word processing software, and/or may check a database and/or directory to identify the location of the appropriate software, and/or use other means to identify the correct software, and/or CE to utilize.

In some embodiments of the invention, data from one, several, or all computing environments may be displayed on a single display device (or on a set of fewer display devices than there are operating computing environments) so that there is a desireability of sharing such display devices and subsystems without contamination.

In one embodiment, the Control Environment may utilize multiple modes of operation. For example, in a first mode of operation the Control Environment may not allow copying between user computing environments except for ASCII and extended ASCII, and/or might not allow file sharing on a network. In a second mode of operation the Control Environment may allow copying of unknown executable code and/or might allow file sharing on a network. The first mode might be classified as "immune to hacking and viruses" whereas the second mode of operation might be classified as "resistant to hacking and viruses" or "non-secure". Documents created in the second mode of operation may be labeled for example as "non-secure" documents. Additional modes of operation may be utilized. Switching modes may be done for example by the Control Environment, and/or by the user, and/or by an administrator. Switching may be automatic, and/or triggered by a manual switching process, or by some condition that is detected.

There are many other possible modes that may be implemented with an embodiment of the invention. For example there may be various administrative modes. In one example of an administrative mode, a user may have to utilize a key, or a password, or any means of verifying identity or authorization in order to conduct repairs and/or maintenance to one or more computing environments, such as the protected storage or control environments. In a second example of administrative mode and/or a repair mode, protected storage(s), control environment(s), may be automatically saved to one or more data stores, reformatted/reset/erased, and reloaded as needed to recreate their state in a pristine manner. A master template of various environments such as the control environment may be utilized, and with proper authorization and switching another environment may conduct repairs to the control environment during the maintenance process. In one embodiment this switching may occur on a schedule, and/or may be triggered by a user.

In another embodiment, the control environment may label each file saved to protected storage. If the file is unknown or untrusted it may be labeled for example "untrusted", whereas if the file was created from within in a pristine environment, the control environment may label the file as "trusted". In one example, in "immune to hacking and virus" mode, the Control Environment may allow copying of trusted data to a second User Computing Environment from a first User Computing Environment, but disallow copying of "untrusted" data to a second User Computing Environment. Switching to "less secure" mode may enable the Control Environment to allow the untrusted code to be copied from the first User Computing Environment, to the Second User Computing Environment, and the resulting file may now be labeled "untrusted".

In another embodiment, in one mode, linked data in two or more computing environments may be copied directly between those environments. In another embodiment, groups of trusted linked data may be copied or moved into a user environment and data copied between them and/or cross linked if all data is trusted. Thus, entire databases and sets of linked data may be moved or copied to User Computing Environments and worked on with cross copying and linking of data between the various documents and/or databases. If all of the data is trusted, then the data can all be worked on together in one User Computing Environment. (Or in more than one, such as a second, third, etc.) A User Computing Environment may be in direct communication with the first computing environment, because all of the code is trusted. In a different untrusted mode of operation, untrusted data can be merged with trusted or untrusted data resulting in untrusted data, and so labeled. In this manner entire databases of linked data and databases may be maintained and shared in a trusted environment.

In another embodiment, networks composed of computers using this new art may share and intermingle trusted data, databases, and linked data documents that is communicated over trusted/secure communication lines.

In one embodiment, the Control Computing Environment may, for example, never allow the intermingling of files labeled untrusted with files labeled trusted. This method advantageously enables entire networks of computers attached by trusted/secure network connections to share and co-mingle trusted files, databases, and linked data, while simultaneously having the ability to have untrusted files on their computers and use those untrusted files without endangering their trusted files.

In one embodiment, the server can be of the art described herein, and client nodes can be connected via a secure/trusted network connection, and the client nodes may be comprised of computers of the prior art. In this example the server may perform the following steps: (1) reformat a client computer hard drive and may clear memory; (2) provide the user computer with access to the desktop environment, after the user selects a file, in the desktop environment; (3) provide the requested file to the user environment and limit communication with the desktop environment to, for example, one bit, meaning "save" file, and more than one bit, save file and erase computing environment. There may also be the step: (4) in order to save the file in a manner that does not put the Control Environment at risk, the user file may be copied from the client computer by a User Computing Environment on the Server, and then saved in the usual manner of saving data located in a User Computing Environment. Then (5) when the client is done, the client computer may be reformatted and reset by the server. Optionally, the client may operate as a "thin client" so little or no data needs to be copied back to the client computer.

In one embodiment, files marked untrusted may be made trusted by means of a "stripping" process that removes any potentially executable code from, for example, a word processing document. For example untrusted file data may by copied as ASCII characters to a secure environment and classed as trusted.

In one embodiment, protected storage may be external and/or portable, and/or hot-swappable, and/or portable media.

In one embodiment a software and/or physical button and/or switch and/or combination can be used to trigger events such as resetting/repairing computing environments.

An internal or external backup system that may or may not be hidden, may be switched for example by the control environment, in order to backup protected storage, master templates, copies of the control environment, etc.

Attention is now directed to a description of how data from any selected one or a set of computing environments may be displayed and used. Such data may include but is not limited to the video output or representation of data or activities occurring in a computing environment as well as to actual input, output, and intermediate data sets or files that are used or generated by or within the computing environment during a processing episode.

In one embodiment involving a window based user interface, all (or selected) size, shape and location coordinates for all (or selected) windows, icons (and the names of the application programs or data such icons represent), and other relevant data and/or means of identification is sent from a computing environment (also referred to in some embodiments as an "explosion room" or "x-room" because any explosion of code is contained and not externally harmful) to the controlling entity within the system, normally a control computing environment (also referred to the "Brain" in some embodiments), such as the CSCE or CCE computing environments already described. This information may, for example, be provided to the control computing environment using the inventive procedures using computer program software instructions running in one or more of the various computing environments or on a temporally separated manner when single concurrent computing environment operation is supported. Alternatively, all or part of it may be created by or within the control computing environment.

This data, stored and tracked by the control computing environment, will be referred to herein as "computing environment data" or "x-room data".

Additionally, the control computing environment may also or alternatively track other data referred to as control data or "Brain data", such as, for example, data representing the order in which each "layer" or "process", was created, and the order in which each window was created. It may also maintain information on a selective or active window or process.

The control computing environment such as the CSCE or CCE described in some embodiments and also referred to as the system "Brain relative to other embodiments, may also track the mouse cursor's or other pointing device location and/or keyboard or other user input activity. Thus, the control computing environment can then determine the location of the mouse cursor (when a mouse or pointing device click occurs) relative to the locations of these open windows, icons, or the like, that is generated by each computing environment. It will be appreciated that although this specification primarily describes human user interaction using keyboard and mouse commands, in fact the inventive system and method may be applied to a variety of user interactions, such as but not limited to touch-screen interaction and command, voice interaction and command, drop down menus, hot spot selection interaction and command, function button presses, pens stylus interaction and command, and a variety of other user input and interaction methods and devices as are known in the art or may be expected to develop.

Thus, by calculating the mouse location "click" (or other "selection") and comparing that to the allocated computing environment's window location (and which window is "in front" or "active", it is then possible for the CSCE to determine specifically which window (or icon, or item, or computing environment process) was intended to be selected and receive that "click" input.

Thus, when the mouse button is clicked, the control computing environment can determine, for example, which layer to make "active and in front" in conventional windows terms, or which application to launch, or where to redirect the mouse and keyboard signals, based on the information collected by the control computing environment.

Direct connections from computing environments ("CE's") to the CSCE may by way of example but not limitation use a first (possibly dedicated) ASIC from a computing environment to a second (possibly dedicated) ASIC in the CSCE (or a filter) to prevent unintended activities or results. Such unintended results may for example be some code executing that causes a buffer or memory over-run intended to place or spread malicious code. The ASIC is merely one example of a logic circuit that provides a filtering or limiting operation so that only predetermined permitted processing can occur. For example, such logic whether in the form of an ASIC or otherwise implemented, operating as a "receiver" can only comprehend or interpret the received communication as "x, y" or "line, sample" coordinates, and nothing else. Note that in some embodiments a single ASIC or other logic positioned in a communication path between a computing environment and the CSCE may be sufficient to provide the desired limitation or filtering operation in the intended communication. Such ASIC or logic circuit (optionally using software and/or firmware) may be controllable to securely and safely select one function from an available set of possible permitted functions or operations or may be dynamically programmable (such as by downloading code from a protected or other secure storage or sending a control signal or signals) to accomplish such selection.

Examples of "x-room data" or user computing environment data which may be included in the data provided to the control computing environment may include none or any one or more of, but are not limited to: window locations and sizes (like a wire-frame); names of icons and what they represent; file size, file location, and the like file or data set references or identifiers. By way of further examples, these may include a B-tree, a master directory, a desktop database, and the like. It may also or alternatively include a list or other data structure or index of which application programs, drivers, or operating system components are "associated" or intended to interoperate, open, or have a processing capability with which files or file types or devices or device types.

Examples of control data or "Brain data" may include none or any one or more of: data identifying an order in which layers, windows, and/or processors were created, a current ordering or priority of such layers, windows, and or processes; a mouse or pointing device absolute, screen relative, window relative cursor location, and/or a combination of these or other data. It will be appreciated that in some embodiments, a plurality of the computing environments may have similar or identical attributes, some of this data or information may only need to be created once, and then modified or adapted to each computing environment for subsequent update, if and when there is a relevant change for that computing environment.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An information appliance comprising:
   at least one processing logic device for executing at least one instruction;
   a first storage for storing first data and first program code including said at least one instruction and including a user data;
   a second storage for storing second data;
   a switching system for selectably and independently coupling and decoupling the processing logic device with the first storage and/or the second storage under automated control, the switching system receiving at least one control signal from the processing logic device for selecting a condition of the switching system;
   the processing logic device operating in a control configuration and in a user data configuration according to the following conditions:
   (i) the processing logic device may be coupled with the first storage when the processing logic is loaded with a program instruction not capable of executing a data item that has untrusted content or that did not originate within a known controlled environment;
   (ii) the processing logic device may not be coupled or only restrictively coupled to communicate known information with the first storage when the processing logic is loaded with a program instruction that may be capable of executing a data item that has untrusted content or that did not originate within a known controlled environment;
   (iii) the processing logic device may be coupled with the second storage when the processing logic is loaded with a program instruction that may be capable of executing a data item that has untrusted content or that did not originate within a known controlled environment; and
   (iv) the processing logic device may be coupled with the first storage and the second storage when the processing logic is loaded with a program instruction that is only capable of copying a data item from the first storage to the second storage or from the second storage to the first storage.

2. An information appliance as in claim 1, wherein the switching system can couple or decouple the processing logic device with the first storage and the second storage in at least the following ways: (i) processing logic device coupled with the first storage only, (ii) processing logic device coupled with the second storage only, (iii) processing logic device coupled with the first and second storage concurrently, (iv) processing logic device coupled with neither the first storage nor the second storage.

3. An information appliance as in claim 1, wherein the processing logic device comprises a microprocessor.

4. An information appliance as in claim 1, wherein the processing logic device is selected from the set of processing logic circuits consisting of: a microprocessor, a central processing unit (CPU), a controller, a micro-controller, an ASIC, a logic circuit, a programmable logic circuit, and combinations of these.

5. An information appliance as in claim 1, wherein the information appliance is selected from the set of information appliances consisting of: a computer, a notebook computer, a personal data assistant, a personal data organizer, a cellular telephone, a mobile telephone, a radio receiver, a radio transmitter, a GPS receiver, a satellite telephone, an automobile on-board computer, an aircraft on-board computer, a navigation device, a home appliance, a printing device, a scanning device, a camera, an electronic camera, a television receiver, a broadcast control system, an electronic instrument, a medical monitoring device, a security device, an environmental control system, a electronic device, and combinations of these.

6. An information appliance as in claim 1, wherein the first data store and second data store are independently selectable and selected from the set of storage consisting of: a rotating magnetic hard disk drive, a rotating magnetic floppy disk drive, a CD, a DVD, a semiconductor memory, a solid state memory, a chemical memory, a magnetic memory, a molecular memory, a micro-drive, a flash memory, a compact flash card memory, a RAM memory, a ROM memory, and combinations thereof.

7. An information appliance as in claim 1, wherein said at least one processing logic device comprises a plurality of processing logic devices.

8. An information appliance as in claim 7, wherein at least one of said plurality of processing logic devices comprises at least one microprocessor and said at least one instruction comprises a plurality of computer program code segments from an operating system and a plurality of computer program code segments from an application program; and wherein said switching system is coupleable to said microprocessor for receiving switch control commands for altering the switch configuration to selectably couple and decouple the microprocessor with the first and second storage.

9. An information appliance as in claim 8, wherein the plurality of processing logic devices are intermittently sequentially isolated and communicatively restricted, by an automated control system executing one of the processing logic devices.

10. An information appliance as in claim 9, wherein the plurality of processing logic devices and at least said first and second storage are dynamically configurable to create computing environments having determined characteristics.

11. An information appliance as in claim 8, wherein the second storage is configured to perform as a temporary storage during a processing operation when it is coupled with the processing logic device and automatically erased after each processing has occurred independent if the processing completed with error condition or without error condition, where an error condition may include detection of a virus or other malicious code execution.

12. A method for operating an information appliance of the type having at least one processing logic device for executing at least one instruction, a first storage for storing first data and first program code including said at least one instruction and including a user data, and a second storage for storing second data; the method comprising:
   selectively and independently switching to couple and decouple the processing logic device with the first storage and/or the second storage under automated control upon receipt of at least one control signal from the processing logic device for selecting a condition of the switching system;
   operating the processing logic device in a control configuration and in a user data configuration according to the following conditions:
   (i) permitting coupling the processing logic device with the first storage when the processing logic is loaded with a program instruction not capable of executing a data item that has untrusted content or that did not originate within a known controlled environment;

(ii) not permitting coupling the processing logic device with the first storage or only restrictively permitting coupling the processing logic device with the first storage to communicate known information when the processing logic is loaded with a program instruction that may be capable of executing a data item that has intrusted content or that did not originate within a known controlled environment;

(iii) permitting coupling the processing logic device with the second storage when the processing logic is loaded with a program instruction that may be capable of executing a data item that has untrusted content or that did not originate within a known controlled environment; and (iv) permitting coupling the processing logic device with the first storage and the second storage when the processing logic is loaded with a program instruction that is only capable of copying a data item from the first storage to the second storage or from the second storage to the first storage.

13. A method for operating an information appliance as in claim 12, further comprising: erasing the second storage after any processing logic device has used said second storage to process a user data.

14. A method for operating an information appliance as in claim 12, wherein the information appliance is selected from the set of information appliances consisting of: a computer, a notebook computer, a personal data assistant, a personal data organizer, a cellular telephone, a mobile telephone, a radio receiver, a radio transmitter, a GPS receiver, a satellite telephone, an automobile on-board computer, an aircraft on-board computer, a navigation device, a home appliance, a printing device, a scanning device, a camera, an electronic camera, a television receiver, a broadcast control system, an electronic instrument, a medical monitoring device, a security device, an environmental control system, a electronic device, and combinations of these.

15. A method for operating an information appliance as in claim 12, wherein said at least one processing logic device comprises a plurality of processing logic devices.

16. A method for operating an information appliance as in claim 15, wherein at least one of said plurality of processing logic devices comprises at least one microprocessor and said at least one instruction comprises a plurality of computer program code segments from an operating system and a plurality of computer program code segments from an application program; and wherein said switching system is coupleable to said microprocessor for receiving switch control commands for altering the switch configuration to selectably couple and decouple the microprocessor with the first and second storage.

17. An information processing device comprising:
a housing having a form factor of a computer PC Card and a plurality of PCCardBus interface connections;
a plurality of processors disposed within said housing;
a plurality of data stores disposed within said housing or coupled thereto;
a protected data store portion selected from said plurality of data stores for storing at least a user data;
a data store switch system coupled with said plurality of data stores, said switch system coupled with a data store switch configuration for configuring communication with one or more data store disposed within said housing;
an I/O switch system coupled with at least one peripheral, said I/O system coupled with an I/O system configuration including a plurality of traits for configuring communication with said peripheral disposed within said housing;
a plurality of computing environments, each said computing environment including at least one processor and identified by at least one trait selected from said plurality of traits, including:
a data store switch communication path coupled with said data store switch, said data store switch communication path coupling at least one data store with said computing environment according to said data store switch configuration;
an I/O switch communication path coupled with said I/O switch system, said I/O switch communication path for coupling said peripheral with said computing environment according to said I/O switch system configuration;
said computing environment capable of performing a processing activity including receiving input from said I/O switch system and sending output to said I/O switch system, said processing activity performed independently of said processing activity of another computing environment;
a control computing environment selected from said plurality of computing environments for configuring said data store switch configuration, for configuring said I/O switch system configuration, said data store switch configuration supporting communication between said control computing environment and said protected data store; and
at least one user isolated computing environment selected from said plurality of computing environments;
wherein said I/O switch system configuration is configured to direct a received input to at least one of said computing environment, said I/O switch system configuration is configured to direct an output generated by one or more of said plurality of computing environments to said peripheral.

18. An information processing device as in claim 17, wherein:
the plurality of processors are independently selected from the set of processing logic circuits consisting of: a microprocessor, a central processing unit (CPU), a controller, a micro-controller, an ASIC, a logic circuit, a programmable logic circuit, and combinations of these; and
the plurality of data store are independently selectable and selected from the set of storage consisting of: a rotating magnetic hard disk drive, a rotating magnetic floppy disk drive, a CD, a DVD, a semiconductor memory, a solid state memory, a chemical memory, a magnetic memory, a molecular memory, a micro-drive, a flash memory, a compact flash card memory, a RAM memory, a ROM memory, and combinations thereof.

* * * * *